(12) United States Patent
Nishimura et al.

(10) Patent No.: US 7,833,656 B2
(45) Date of Patent: *Nov. 16, 2010

(54) ELECTROCHEMICAL DEVICE AND METHOD FOR PRODUCING THE SAME

(75) Inventors: Ken Nishimura, Moriguchi (JP); Naoto Arai, Ikoma (JP); Toru Oshima, Moriguchi (JP); Fumio Daio, Osaka (JP); Munehisa Ikoma, Shiki-gun (JP); Norio Saito, Nishinomiya (JP); Hideo Kaiya, Chigasaki (JP)

(73) Assignee: Panasonic Corporation, Osaka (JP)

( * ) Notice: Subject to any disclaimer, the term of this patent is extended or adjusted under 35 U.S.C. 154(b) by 1494 days.

This patent is subject to a terminal disclaimer.

(21) Appl. No.: 10/540,867

(22) PCT Filed: Dec. 9, 2003

(86) PCT No.: PCT/JP03/15755

§ 371 (c)(1),
(2), (4) Date: Jun. 27, 2005

(87) PCT Pub. No.: WO2004/062022

PCT Pub. Date: Jul. 22, 2004

(65) Prior Publication Data

US 2006/0035152 A1 Feb. 16, 2006

(30) Foreign Application Priority Data

Dec. 27, 2002 (JP) .............................. 2002-380939

(51) Int. Cl.
*H02M 6/46* (2006.01)
*H01M 2/18* (2006.01)
*H01M 6/42* (2006.01)

(52) U.S. Cl. ....................... 429/152; 429/122; 429/144; 429/149; 429/131

(58) Field of Classification Search ................. 429/179, 429/152, 246, 68, 113, 217, 218.1; 29/623.1–623.5; 427/115; 361/503–504, 512
See application file for complete search history.

(56) References Cited

U.S. PATENT DOCUMENTS 5,423,110 A 6/1995 Gauthier et al.
(Continued)

FOREIGN PATENT DOCUMENTS

JP 61-53857 4/1986
(Continued)

OTHER PUBLICATIONS

Japanese Office Action issued in Japanese Patent Application No. JP 2003-053841, dated Apr. 24, 2008.
(Continued)

*Primary Examiner*—Raymond Alejandro
*Assistant Examiner*—Claire L Rademaker
(74) *Attorney, Agent, or Firm*—McDermott Will & Emery LLP

(57) ABSTRACT

An electrochemical device having an electrode plate assembly. The electrode plate assembly includes (a) at least one first electrode, (b) at least one second electrode, and (c) a separator interposed between the first electrode and the second electrode. The first electrode includes a first current collector sheet and at least one first electrode mixture layer carried thereon. The second electrode includes a second current collector sheet and at least one second electrode mixture layer carried thereon. At least one of the first current collector sheet and the second current collector sheet has a conductive area and an insulating area.

32 Claims, 28 Drawing Sheets

U.S. PATENT DOCUMENTS

| | | | |
|---|---|---|---|
| 5,521,028 A | 5/1996 | Gauthier et al. | |
| 5,567,544 A * | 10/1996 | Lyman | 429/152 |
| 5,599,641 A * | 2/1997 | Ching et al. | 429/179 |
| 6,051,340 A * | 4/2000 | Kawakami et al. | 429/231.95 |
| 6,187,062 B1 | 2/2001 | Oweis et al. | |
| 6,287,720 B1 * | 9/2001 | Yamashita et al. | 429/131 |
| 6,475,664 B1 | 11/2002 | Kawakami et al. | |
| 6,726,733 B2 | 4/2004 | Lee et al. | |
| 6,923,837 B2 * | 8/2005 | Longhi et al. | 29/623.1 |
| 2002/0160258 A1 | 10/2002 | Lee et al. | |
| 2002/0197535 A1 * | 12/2002 | Dudley et al. | 429/246 |
| 2003/0104273 A1 * | 6/2003 | Lee et al. | 429/144 |
| 2003/0198867 A1 * | 10/2003 | Kim | 429/178 |

FOREIGN PATENT DOCUMENTS

| | | |
|---|---|---|
| JP | 05-314994 | 11/1993 |
| JP | 06-231796 | 8/1994 |
| JP | 06-243877 | 9/1994 |
| JP | 06-333553 | 12/1994 |
| JP | 10-302751 | 11/1998 |
| JP | 11-505958 | 5/1999 |
| JP | 11-274004 | 10/1999 |
| JP | 2000-030731 | 1/2000 |
| JP | 2000-294222 | 10/2000 |
| JP | 2000-294288 | 10/2000 |
| JP | 2001-093583 | 4/2001 |
| JP | 2001-126707 | 5/2001 |
| JP | 2001-148244 | 5/2001 |
| JP | 2001-210304 | 8/2001 |
| JP | 2003-151535 | 5/2003 |
| WO | WO 01/59870 A1 | 8/2001 |

OTHER PUBLICATIONS

European Search Report issued in Application No./Patent No. 03777422.1-1227/1596459 PCT/JP0315755 dated on Jul. 31, 2008.

Japanese Office Action issued in Japanese Patent Application No. JP 2003-024987 dated Jul. 30, 2009.

Japanese Office Action issued in Japanese Patent Application No. JP 2003-018924 dated Jul. 30, 2009.

Japanese Office Action issued in Japanese Patent Application No. JP 2003-023619 dated Jul. 30, 2009.

Japanese Office Action issued in Japanese Patent Application No. JP 2003-051253 dated Jul. 30, 2009.

Japanese Office Action issued in Japanese Patent Application No. JP 2003-023620 dated Feb. 21, 2009.

English translation of Japanese Office Action issued in Japanese Patent Application No. JP 2003-024987 dated Jul. 30, 2009.

English translation of Japanese Office Action issued in Japanese Patent Application No. JP 2003-018924 dated Jul. 30, 2009.

English translation of Japanese Office Action issued in Japanese Patent Application No. JP 2003-023619 dated Jul. 30, 2009.

English translation of Japanese Office Action issued in Japanese Patent Application No. JP 2003-051253 dated Jul. 30, 2009.

English translation of Japanese Office Action issued in Japanese Patent Application No. JP 2003-023620 dated Feb. 21, 2009.

* cited by examiner

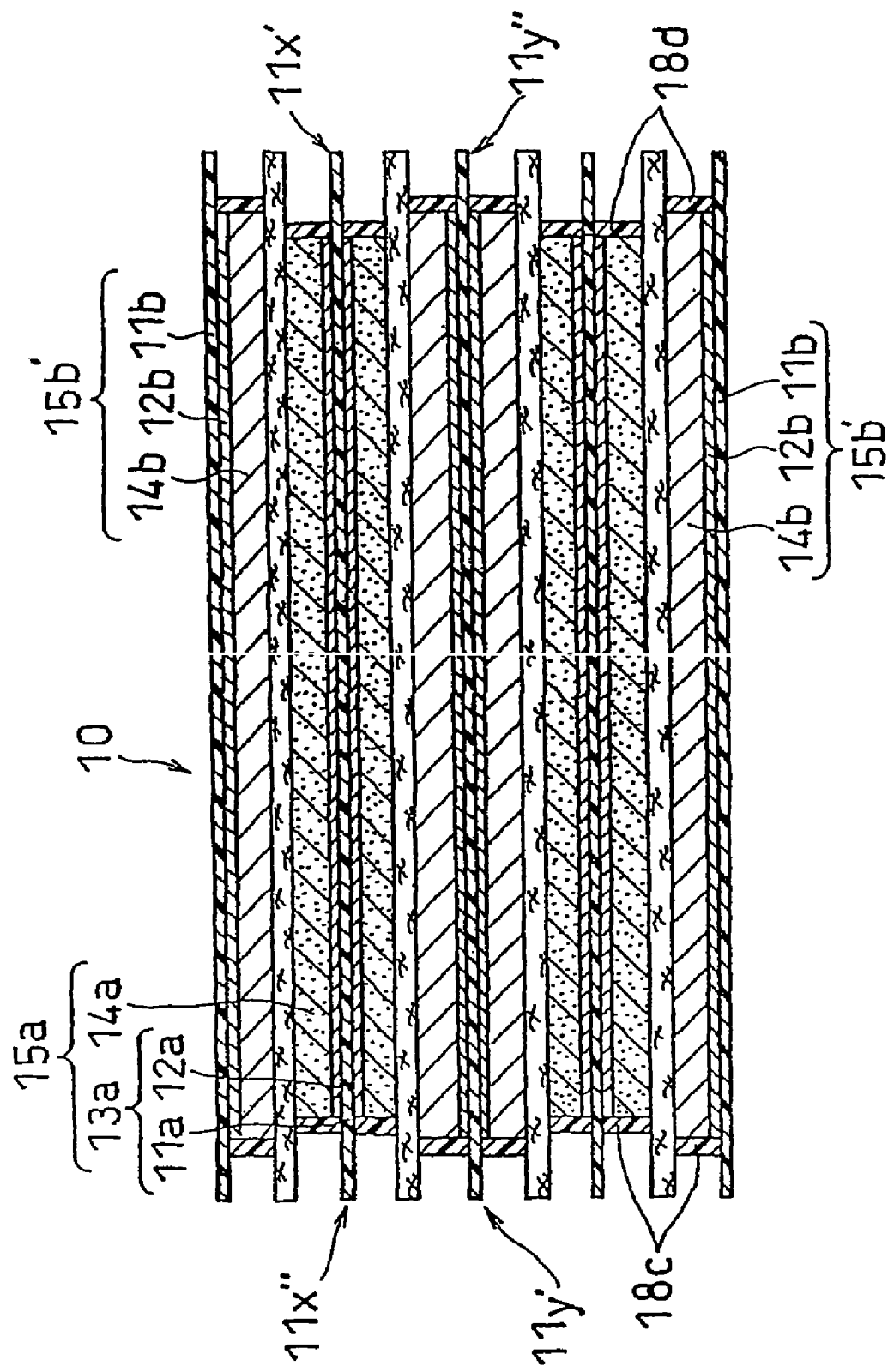

F I G. 8
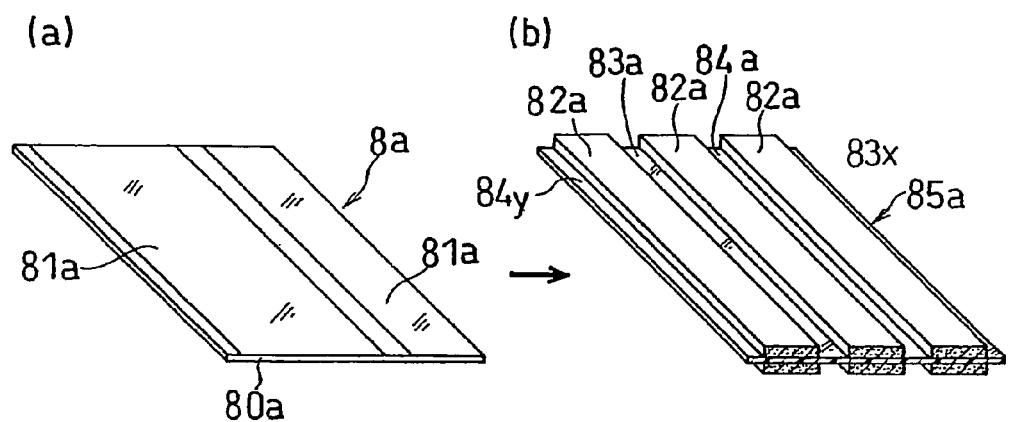
F I G. 9
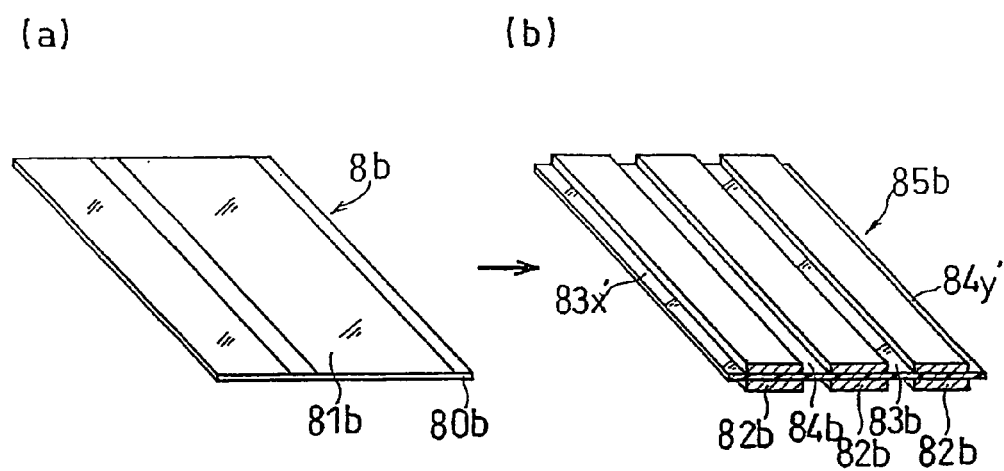

F I G. 3 3
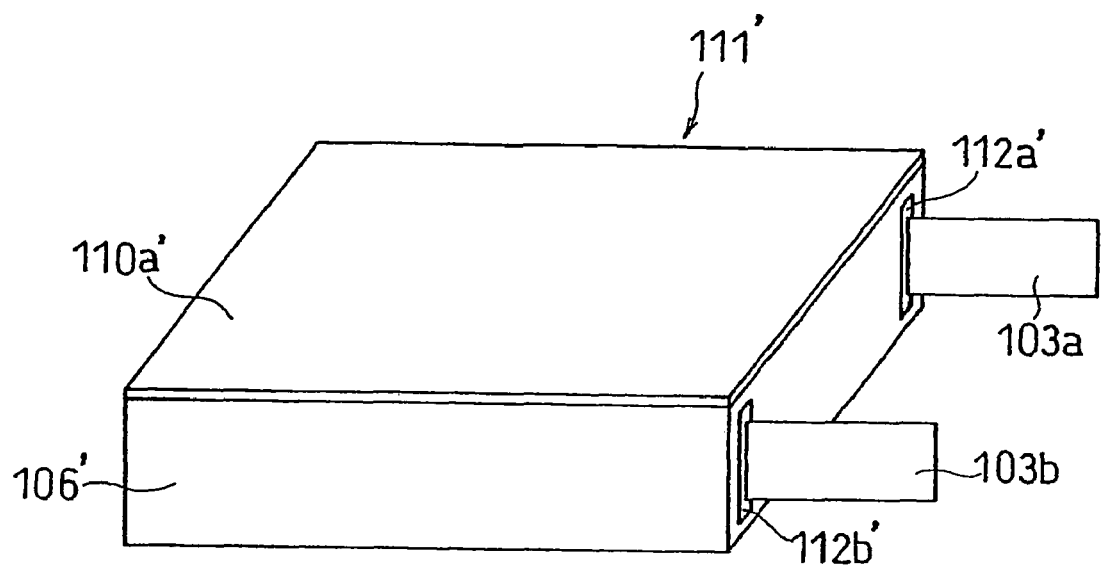

FIG. 35(a)
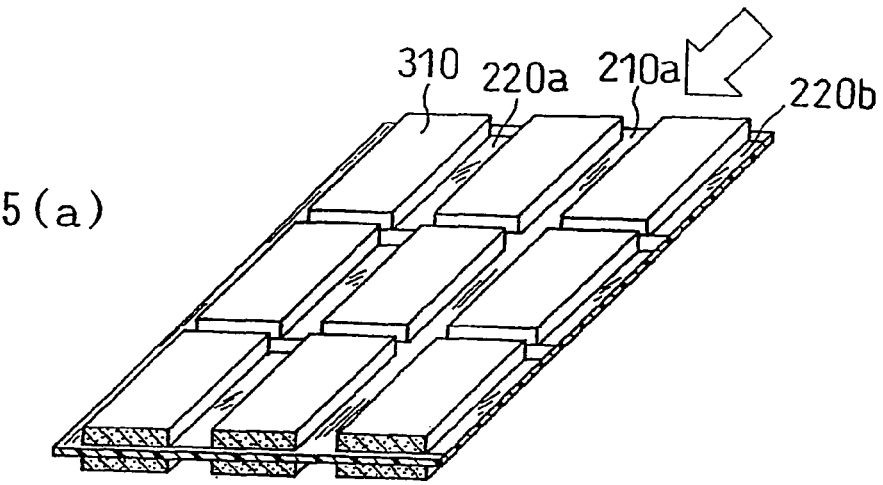
(b)
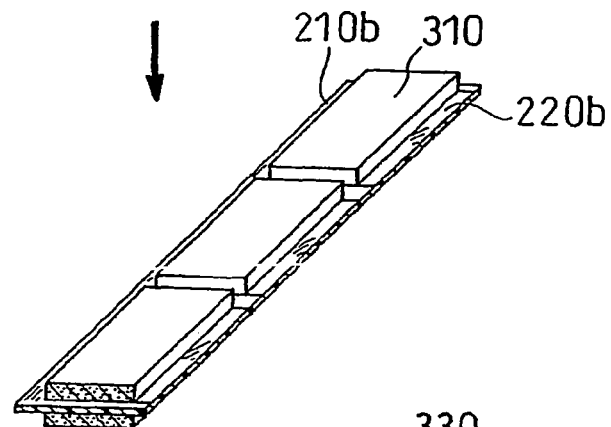
(c)
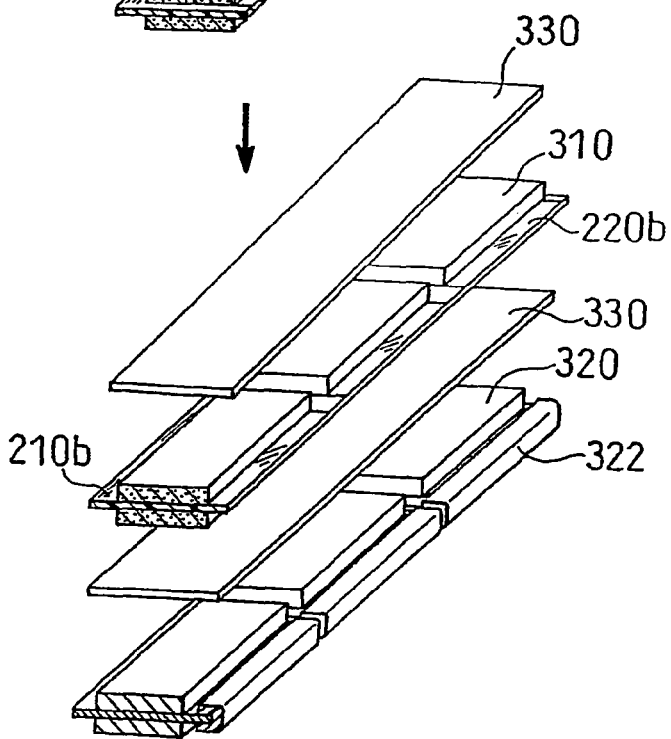

FIG. 36(a)
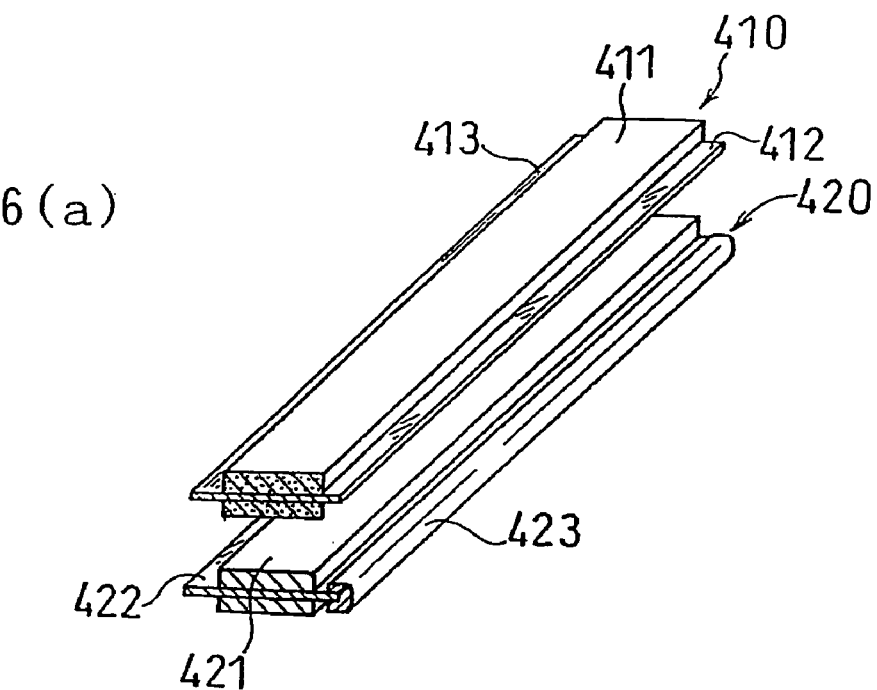
(b)
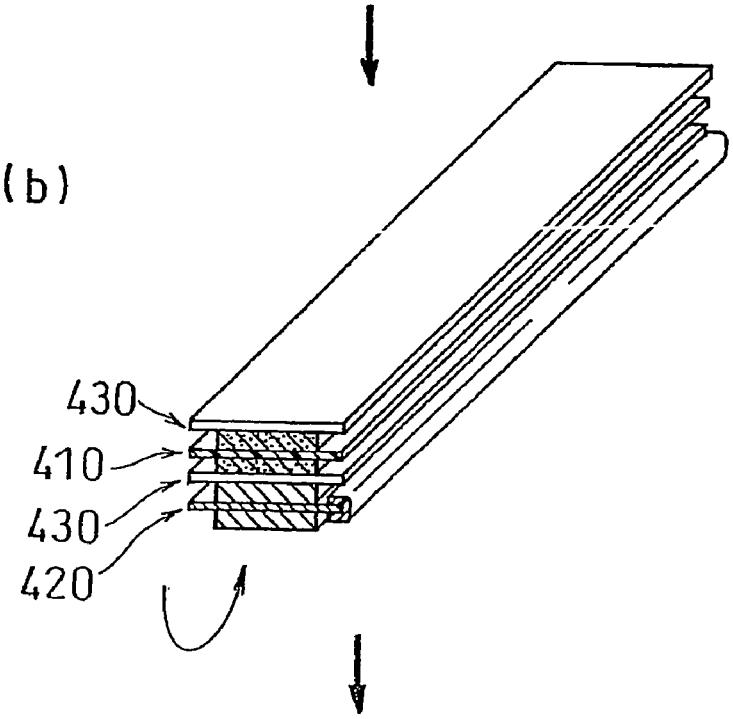
(c)
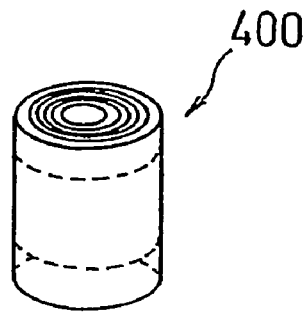

ELECTROCHEMICAL DEVICE AND METHOD FOR PRODUCING THE SAME

TECHNICAL FIELD

The present invention relates to electrochemical devices, and particularly, to improvements in the electrode plate assembly of high energy-density secondary batteries, such as lithium ion secondary batteries.

BACKGROUND ART

With the reduction in size and weight of electronic and electric devices, there is an increasing demand for reductions in size and weight of electrochemical devices, such as secondary batteries. However, currently available electrochemical devices have a complicated internal structure, so that there is a limit to improvements in electrical capacity per a given volume of a device.

Complicated structure prevents improvements in reliability of electrochemical devices in some aspects. For example, a current-collecting tab or lead connected to an electrode may interfere with a homogeneous electrode reaction in the plane of the electrode. In the event that a cut section of the lead has metallic burrs that are larger than usual, an internal short-circuit may occur.

Electrochemical devices usually have an electrode plate assembly including a positive electrode, a negative electrode and a separator. The electrode plate assembly is either of a layered type or a wound type. A layered type electrode plate assembly is obtained by alternately layering positive electrodes and negative electrodes with separators interposed between them. Also, a wound type electrode plate assembly is obtained by winding a long positive electrode and a long negative electrode with a separator between them. Current-collecting tabs or leads are necessary for taking electricity out of such an electrode plate assembly without causing a short-circuit.

From the viewpoint of simplifying the internal structure of electrochemical devices, it has been proposed to cause a positive electrode to protrude from one side face of an electrode plate assembly and cause a negative electrode to protrude from the side face opposite the above-mentioned side face, in order to directly take out electricity from each side face without using tabs or leads.

For example, for batteries with a layered type electrode plate assembly, a technique of integrally joining protruded electrode plates of the same polarity with a metal member has been proposed (Japanese Laid-Open Patent Publication No. 2001-126707). Also, for batteries with a wound type electrode plate assembly, a technique of joining the core material of a protruded electrode plate of the same polarity with a plate-shaped current collector plate has been proposed (Japanese Laid-Open Patent Publication No. 2000-294222).

However, in such cases where the positive electrode is caused to protrude from one side face of the electrode plate assembly and the negative electrode is caused to protrude from the side face opposite the above-mentioned side face, the manufacturing process of the electrode plate assembly becomes complicated. Accordingly, electrode plate assemblies need to be produced one by one, thereby having a problem of being unable to manufacture a plurality of electrode plate assemblies at the same time.

DISCLOSURE OF INVENTION

The present invention is achieved in view of the circumstances described above. The present invention can provide an electrochemical device with a simple structure, high reliability and high electrical capacity. Also, the present invention can efficiently manufacture a plurality of electrochemical devices at the same time.

That is, the present invention is directed to an electrochemical device including an electrode plate assembly. The electrode plate assembly includes (a) at least one first electrode, (b) at least one second electrode, and (c) a separator interposed between the first electrode and the second electrode. The first electrode comprises a first current collector sheet and at least one first electrode mixture layer carried thereon, and the second electrode comprises a second current collector sheet and at least one second electrode mixture layer carried thereon. At least one of the first current collector sheet and the second current collector sheet has a conductive area and an insulating area.

The electrochemical device further has a first terminal electrically connected to the first current collector sheet and a second terminal electrically connected to the second current collector sheet. The electrode plate assembly has a first side face on which the first terminal is provided and a second side face on which the second terminal is provided. When the first current collector sheet has a conductive area and an insulating area, it is preferred that the conductive area of the first current collector sheet be connected to the first terminal on the first side face, and that the insulating area of the first current collector sheet be positioned on the second side face. When the second current collector sheet has a conductive area and an insulating area, it is preferred that the conductive area of the second current collector sheet be connected to the second terminal on the second side face, and that the insulating area of the second current collector sheet be positioned on the first side face.

It is preferred that the first side face and the second side face be positioned on opposite sides of the electrode plate assembly.

It is preferred that the first side face have a first insulating material portion for insulating the first terminal from the second electrode, and that the second side face have a second insulating material portion for insulating the second terminal from the first electrode.

The side faces of the electrode plate assembly other than the first side face and the second side face may also be provided with the insulating area of the first current collector sheet and/or the insulating area of the second current collector sheet.

It is preferred that the current collector sheet with the conductive area and the insulating area comprise an insulating base material sheet and at least one conductive layer formed at least on one face thereof. It is preferred that the insulating area of the current collector sheet with the conductive area and the insulating area comprise one edge of the insulating base material, and that the conductive area comprise the conductive layer.

The first terminal and the second terminal can be formed, for example, by providing the first side face and the second side face with a conductive coating film such as metal.

When the first current collector sheet has an insulating area, the insulating area can be fixed to the second terminal. When the second current collector sheet has an insulating area, the insulating area can be fixed to the first terminal.

The present invention is also directed to an electrochemical device having an electrode plate assembly in which a first electrode and a second electrode are wound with a separator interposed therebetween. The first electrode comprises a first current collector sheet and at least one first electrode mixture layer carried thereon, and the second electrode comprises a second current collector sheet and at least one second electrode mixture layer carried thereon. At least one of the first current collector sheet and the second current sheet has a conductive area and an insulating area. When the first current collector sheet has a conductive area and an insulating area, the conductive area of the first current collector sheet is connected to a first terminal on a first bottom face of the electrode plate assembly, and the insulating area of the first current collector sheet is positioned on a second bottom face of the electrode plate assembly. When the second current collector sheet has a conductive area and an insulating area, the conductive area of the second current collector sheet is connected to a second terminal on the second bottom face of the electrode plate assembly, and the insulating area of the second current collector sheet is positioned on the first bottom face of the electrode plate assembly.

The present invention also relates to an electrochemical device having an electrode plate assembly in which a plurality of first electrodes and a plurality of second electrodes are alternately layered with separators interposed therebetween. The plurality of first electrodes each comprise a first current collector sheet and at least one first electrode mixture layer carried thereon. The plurality of second electrodes each comprise a second current collector sheet and at least one second electrode mixture layer carried thereon. At least one of the first current collector sheet and the second current collector sheet has a conductive area and an insulating area. When the first current collector sheet has a conductive area and an insulating area, the conductive area of the first current collector sheet is connected to a first terminal on a first side face of the electrode plate assembly, and the insulating area of the first current collector sheet is positioned on a second side face of the electrode plate assembly. When the second current collector sheet has a conductive area and an insulating area, the conductive area of the second current collector sheet is connected to a second terminal on the second side face of the electrode plate assembly, and the insulating area of the second current collector sheet is positioned on the first side face of the electrode plate assembly.

In the electrochemical device, it is preferred that the current collector sheet with the conductive area and the insulating area have a first edge that comprises a part of the conductive area and that does not carry the electrode mixture layer, that the conductive area be connected to the first terminal or the second terminal at the first edge, and that at least a part of the first edge be buried in the first terminal or the second terminal. This structure makes it possible to obtain high current collecting performance. On the other hand, in the case of a structure of using a current collector plate and connecting the edge of an electrode to the current collector plate, the contact area of the electrode and the edge becomes small, so that the current collecting performance tends to lower in comparison with the above structure. Further, when an electrode mixture layer of low conductivity is brought into contact with a current collector plate, the current collecting performance tends to become insufficient in comparison with the above structure.

It is also preferred that the current collector sheet with the conductive area and the insulating area have a second edge that comprises a part of the insulating area and that does not carry the electrode mixture layer, that the second edge be positioned on the first side face or the second side face, and that at least a part of the second edge be buried in the first terminal or the second terminal.

When the electrode plate assembly further has a third side face and a fourth side face, it is preferred that an edge of the first current collector sheet, an edge of the second current collector sheet, and an edge of the separator be substantially flush with one another on each of the first side face, the second side face, the third side face, and the fourth side face. It is also preferred that an area $S(1)$ per one side of the first current collector sheet, an area $S(2)$ per one side of the second current collector sheet, and an area $S(s)$ per one side of the separator satisfy the following relations:

$$S(1) \leqq S(s) \leqq S(1) \times 1.05, \text{ and}$$

$$S(2) \leqq S(s) \leqq S(2) \times 1.05.$$

This simple and balanced structure increases the volume efficiency of the electrochemical device, while enhancing its reliability.

In the electrochemical device, it is preferred that the first electrode mixture layer and the second electrode mixture layer each have an edge covered with an insulating material. It is preferred that the edge of the first electrode mixture layer covered with the insulating material be positioned on the second side face, and that the edge of the second electrode mixture layer covered with the insulating material be positioned on the first side face. When the first current collector sheet has a conductive area and an insulating area, it is preferred that the insulating area of the first current collector sheet be adjacent to the edge of the first electrode mixture layer covered with the insulating material. When the second current collector sheet has a conductive area and an insulating area, it is preferred that the insulating area of the second current collector sheet be adjacent to the edge of the second electrode mixture layer covered with the insulating material. This structure facilitates the prevention of a short-circuit in forming a terminal on a side face of the electrode plate assembly.

The present invention also pertains to an electrochemical device having a case accommodating the electrode plate assembly. It is preferred that an inner face of the case be in contact with the first side face and the second side face.

The case may be composed of a flame and two flat sheets. In this case, it is preferred that the flame surround the electrode plate assembly and be in contact with the first side face and the second side face, and that the two flat sheets cover two openings of the flame and be in contact with an upper face and a lower face of the electrode plate assembly.

The case may also be composed of a container with a bottom and a flat sheet. In this case, it is preferred that the container accommodate the electrode plate assembly and have side walls in contact with the first side face and the second side face and a bottom in contact with one of an upper face and a lower face of the electrode plate assembly, and that the flat sheet cover an opening of the container and be in contact with the other of the upper face and the lower face of the electrode plate assembly.

It is preferred that a lead piece be connected to at least one of the first terminal and the second terminal, and that when the lead piece is drawn out of the case, the lead piece be drawn out of the case through a slit provided in the flame or the side walls of the container.

In the electrochemical device, at least one of the first terminal and the second terminal may be:

(a) a porous metal film comprising metal particles jointed continuously, (b) a conductive paste, or (c) a low melting-point metal having a melting point of 250° C. or lower.

It is preferred that the conductive paste comprise a resin and a conductive material dispersed in the resin, and that the conductive material be in the form of fine particles and/or fiber.

In the electrochemical device, when at least a part of the first edge of the current collector sheet that comprises a part of the conductive area and that carries no electrode mixture layer is buried in the first terminal or the second terminal to which a metal lead is welded, it is preferred that the first edge of the current collector sheet be in contact with the metal lead.

When at least one of the current collector sheets of outermost two electrodes has a conductive area on both sides and has an electrode mixture layer only on one side facing the inner electrode, the conductive area on the other side can be electrically connected to the first terminal or the second terminal and serve as an extended part of the terminal.

In the electrochemical device in accordance with the present invention, when the electrode plate assembly has a third side face and a fourth side face, it is preferred that at least one of the third side face and fourth side face be covered with an electronically insulating porous material. The porous material preferably comprises at least one selected from the group consisting of polyolefin, polyalkylene oxide, fluoropolymer and ceramics. Also, the porous material preferably comprises a film-shaped member or a coating film of paste. On the side face of the electrode plate assembly covered with the porous material, the edge of the separator is preferably joined to the porous material. When the edge of the separator is joined to the porous material, it is preferred that the porous material and the separator be composed of the same material.

When the edge of the electrode mixture layer is covered with an insulating material, it is preferred that the insulating material comprise at least one selected from the group consisting of a resin coating film and a resin tape.

The resin coating film can be formed by applying a solution or dispersion containing an insulating resin onto an edge of the electrode mixture layer and drying it. It is preferred to use, as the insulating resin, at least one selected from the group consisting of polyethylene oxide, polypropylene oxide, polyacrylonitrile, polyvinylidene fluoride, polymethyl methacrylate, and a copolymer, polymer alloy or polymer blend including at least one of these.

Also, the resin coating film can be formed by applying a solution or dispersion containing a polymerizable compound onto an edge of the electrode mixture layer and polymerizing the polymerizable compound. It is preferred to use, as the polymerizable compound, a compound having at least one functional group selected from the group consisting of an acrylate group and a methacrylate group.

The resin tape preferably comprises an insulating base material and an insulating adhesive carried on the insulating base material. It is preferred that the insulating base material comprise at least one selected from the group consisting of polyethylene, polypropylene, polyethylene terephthalate, polyethylene naphthalate, polyphenylene sulfide, polyimide, aramid resin, and a copolymer, polymer alloy or polymer blend including at least one of these.

The present invention also relates to a method for producing an electrochemical device (production method A), including the steps of: (a) forming conductive layers on both sides of two insulating base material sheets, to obtain a first current collector sheet and a second current collector sheet, (b) forming a plurality of first electrode mixture layers and a plurality of second electrode mixture layers on each of the conductive layers of the first current collector sheet and the second current collector sheet, respectively, in the form of parallel strips, with a gap therebetween, to obtain a group of first electrodes and a group of second electrodes, (c) feeding the group of first electrodes and the group of second electrodes, with a separator therebetween, in the direction of length of the first electrode mixture layers and the second electrode mixture layers, and winding them concentrically, to obtain a wound body, and (d) cutting the wound body at the gap, to obtain a plurality of wound-type electrode plate assemblies.

The production method A can further include the step of forming an insulating material portion on the conductive layer at the gap after the step (b) and before the step (c). Also, the production method A can further include the step of coating a first bottom face and a second bottom face of the wound-type electrode plate assembly with metal, to form a first terminal and a second terminal.

The present invention further pertains to a method for producing an electrochemical device (production method B), including the steps of: layering a long group of first electrodes and a long group of second electrodes with a separator interposed therebetween and feeding the resultant layered body continuously; winding the layered body on a bobbin that is shaped like a flat plate; and cutting the layered body wound on the bobbin, to obtain a plurality of layered-type electrode plate assemblies.

In the production method B, it is preferred to obtain the first electrodes and the second electrodes by the steps of: forming conductive layers on both sides of two insulating base material sheets, based on a predetermined pattern, to form a first current collector sheet and a second current collector sheet; and forming first electrode mixture layers and second electrode mixture layers on each of the conductive layers, based on the pattern, with a gap therebetween.

The production method B can further include the step of forming an insulating material portion at the gap on the conductive layer at a position sandwiching each of the first electrode mixture layers and the second electrode mixture layers. Also, the production method B can further include the step of coating opposite first and second side faces of the layered-type electrode plate assembly with metal, to form a first terminal and a second terminal.

The present invention also relates to a method for producing an electrochemical device (production method C), including the steps of: (a) forming conductive layers on both sides of two insulating base material sheets, based on a predetermined pattern, to obtain a first current collector sheet and a second current collector sheet; (b) forming a plurality of first electrode mixture layers and a plurality of second electrode mixture layers on each of the conductive layers, based on the pattern, with a gap therebetween, to obtain a group of first electrodes and a group of second electrodes; (c) layering the group of first electrodes and the group of second electrodes, with a separator therebetween, to obtain a layered body; and (d) cutting the layered body at the gap, to obtain a plurality of layered-type electrode plate assemblies.

In the production methods B and C, the predetermined pattern is preferably shaped like a matrix or parallel strips.

The production method C can further include the step of forming an insulating material portion at the gap on the conductive layer at a position sandwiching each of the first electrode mixture layers and the second electrode mixture layers, after the step (b) and before the step (c). Further, the production method C can further include the step of coating opposite first and second side faces of the layered-type electrode plate assembly with metal, to form a first terminal and a second terminal.

The present invention encompasses, for example, the following modes:

An electrochemical device including a wound-type electrode plate assembly in which a first electrode and a second electrode are wound with a separator interposed therebetween, wherein the first electrode comprises a first current collector sheet with a conductive area and an insulating area and at least one first electrode mixture layer carried thereon, the second electrode comprises a second current collector sheet with a conductive area and an insulating area and at least one second electrode mixture layer carried thereon, the conductive area of the first current collector sheet is connected to a first terminal on a first bottom face of the electrode plate assembly, the conductive area of the second current collector sheet is connected to a second terminal on a second bottom face of the electrode plate assembly, the insulating area of the first current collector sheet is positioned on the second bottom face, and the insulating area of the second current collector sheet is positioned on the first bottom face.

An electrochemical device including a wound-type electrode plate assembly in which a first electrode and a second electrode are wound with a separator interposed therebetween, the first electrode comprises a first current collector sheet with a conductive area and an insulating area and at least one first electrode mixture layer carried thereon, the second electrode comprises a second current collector sheet with a conductive area and an insulating area and at least one second electrode mixture layer carried thereon, the conductive area of the first current collector sheet is connected to a first terminal on a first bottom face of the electrode plate assembly, the conductive area of the second current collector sheet is connected to a second terminal on a second bottom face of the electrode plate assembly, the insulating area of the first current collector sheet is positioned on the second bottom face, and the insulating area of the second current collector sheet is positioned on the first bottom face, the first bottom face is provided with a first insulating material portion for insulating the first terminal from the second electrode, and the second bottom face is provided with a second insulating material portion for insulating the second terminal from the first electrode.

An electrochemical device including an electrode plate assembly in which a plurality of first electrodes and a plurality of second electrodes are alternately layered with separators interposed therebetween, wherein the plurality of first electrodes each comprise a first current collector sheet with a conductive area and an insulating area and at least one first electrode mixture layer carried thereon, the plurality of second electrodes each comprise a second current collector sheet with a conductive area and an insulating area and at least one second electrode mixture layer carried thereon, the conductive area of the first current collector sheet is connected to a first terminal on a first side face of the electrode plate assembly, the conductive area of the second current collector sheet is connected to a second terminal on a second side face of the electrode plate assembly, the insulating area of the first current collector sheet is positioned on the second side face, and the insulating area of the second current collector sheet is positioned on the first side face.

An electrochemical device including an electrode plate assembly in which a plurality of first electrodes and a plurality of second electrodes are alternately layered with separators interposed therebetween, wherein the plurality of first electrodes each comprise a first current collector sheet with a conductive area and an insulating area and at least one first electrode mixture layer carried thereon, the plurality of second electrodes each comprise a second current collector sheet with a conductive area and an insulating area and at least one second electrode mixture layer carried thereon, the conductive area of the first current collector sheet is connected to a first terminal on a first side face of the electrode plate assembly, the conductive area of the second current collector sheet is connected to a second terminal on a second side face of the electrode plate assembly, the insulating area of the first current collector sheet is positioned on the second side face, the insulating area of the second current collector sheet is positioned on the first side face, the first side face is provided with first insulating material portions for insulating the first terminal from the second electrodes, and the second side face is provided with second insulating material portions for insulating the second terminal from the first electrodes.

An electrochemical device including an electrode plate assembly in which a plurality of first electrodes and a plurality of second electrodes are alternately layered with separators interposed therebetween, wherein the plurality of first electrodes each comprise a first current collector sheet with a conductive area and an insulating area and at least one first electrode mixture layer carried thereon, the plurality of second electrodes each comprise a second current collector sheet with a conductive area and an insulating area and at least one second electrode mixture layer carried thereon, the conductive area of the first current collector sheet is connected to a first terminal on a first side face of the electrode plate assembly, the conductive area of the second current collector sheet is connected to a second terminal on a second side face of the electrode plate assembly, the insulating area of the first current collector sheet is provided on all the side faces other than the first side face of the electrode plate assembly, and the insulating area of the second current collector sheet is provided on all the side faces other than the second side face.

An electrochemical device including an electrode plate assembly in which a plurality of first electrodes and a plurality of second electrodes are alternately layered with separators interposed therebetween, wherein the plurality of first electrodes each comprise a first current collector sheet with a conductive area and an insulating area and at least one first electrode mixture layer carried thereon, the plurality of second electrodes each comprise a second current collector sheet with a conductive area and an insulating area and at least one second electrode mixture layer carried thereon, the conductive area of the first current collector sheet is connected to a first terminal on a first side face of the electrode plate assembly, the conductive area of the second current collector sheet is connected to a second terminal on a second side face of the electrode plate assembly, the insulating area of the first current collector sheet is provided on all the side faces other than the first side face, the insulating area of the second current collector sheet is provided on all the side faces other than the second side face, the first side face is provided with first insulating material portions for insulating the first terminal from the second electrodes, and the second side face is provided with second insulating material portions for insulating the second terminal from the first electrodes.

An electrochemical device including an electrode plate assembly in which a first electrode and a second electrode are wound with a separator interposed therebetween, wherein the first electrode comprises a first current collector sheet having a conductive area and an insulating area on the surface and at least one first electrode mixture layer carried thereon, the second electrode comprises a second current collector sheet and at least one second electrode mixture layer carried thereon, the first current collector sheet comprises an insulating sheet, the conductive area comprises a conductive layer formed on the surface of the insulating sheet, the insulating area comprises the exposed part of the insulating sheet which is left on the surface, the second current collector sheet comprises a conductive sheet, the conductive area of the first current collector sheet is connected to a first terminal on a first bottom face of the electrode plate assembly, the second current collector sheet is connected to a second terminal on a second bottom face of the electrode plate assembly, the insulating area of the first current collector sheet is positioned on the second bottom face, and the edge of the second current collector sheet positioned on the first bottom face is covered with an insulating material.

An electrochemical device including an electrode plate assembly in which a plurality of first electrodes and a plurality of second electrodes are alternately layered with separators interposed therebetween, wherein the plurality of first electrodes each comprise a first current collector sheet having a conductive area and an insulating area on the surface and at least one first electrode mixture layer carried thereon, the plurality of second electrodes each comprise a second current collector sheet and at least one second electrode mixture layer carried thereon, the conductive area of the first current collector sheet is connected to a first terminal on a first side face of the electrode plate assembly, the second current collector sheet is connected to a second terminal on a second side face of the electrode plate assembly, the insulating area of the first current collector sheet is positioned on the second side face, the edge of the second current collector sheet positioned on the first side face is covered with an insulating material.

An electrochemical device including an electrode plate assembly in which a first electrode and a second electrode are wound with a separator interposed therebetween, wherein the first electrode comprises a first current collector sheet with a conductive area and an insulating area and at least one first electrode mixture layer carried thereon, the second electrode comprises a second current collector sheet with a conductive area and an insulating area and at least one second electrode mixture layer carried thereon, a first edge and a second edge of each current collector sheet are portions to which the electrode mixture layer has not been applied, the conductive area and the insulating area are exposed at the first edge and the second edge, respectively, the exposed conductive area of the first current collector sheet is connected to a first terminal on a first bottom face of the electrode plate assembly, the exposed conductive area of the second current collector sheet is connected to a second terminal on a second bottom face of the electrode plate assembly, the exposed insulating area of the first current collector sheet is positioned on the second bottom face, the exposed insulating area of the second current collector sheet is positioned on the first bottom face, at least a part of the exposed conductive area of the first current collector sheet is buried in the first terminal, and at least a part of the exposed conductive area of the second current collector sheet is buried in the second terminal.

An electrochemical device including an electrode plate assembly in which a first electrode and a second electrode are wound with a separator interposed therebetween, wherein the first electrode comprises a first current collector sheet with a conductive area and an insulating area and at least one first electrode mixture layer carried thereon, the second electrode comprises a second current collector sheet with a conductive area and an insulating area and at least one second electrode mixture layer carried thereon, a first edge and a second edge of each current collector sheet are portions to which the electrode mixture layer has not been applied, the conductive area and the insulating area are exposed at the first edge and the second edge, respectively, the exposed conductive area of the first current collector sheet is connected to a first terminal on a first bottom face of the electrode plate assembly, the exposed conductive area of the second current collector sheet is connected to a second terminal on a second bottom face of the electrode plate assembly, the exposed insulating area of the first current collector sheet is positioned on the second bottom face, the exposed insulating area of the second current collector sheet is positioned on the first bottom face, the first bottom face is provided with a first insulating material portion for insulating the first terminal from the second electrode, the second bottom face is provided with a second insulating material portion for insulating the second terminal from the first electrode, at least a part of the exposed conductive area of the first current collector sheet is buried in the first terminal, and at least a part of the exposed conductive area of the second current collector sheet is buried in the second terminal.

An electrochemical device including an electrode plate assembly in which a plurality of first electrodes and a plurality of second electrodes are alternately layered with separators interposed therebetween, wherein the plurality of first electrodes each comprise a first current collector sheet with a conductive area and an insulating area and at least one first electrode mixture layer carried thereon, the plurality of second electrodes each comprise a second current collector sheet with a conductive area and an insulating area and at least one second electrode mixture layer carried thereon, a first edge and a second edge of each current collector sheet are portions to which the electrode mixture layer has not been applied, the conductive area and the insulating area are exposed at the first edge and the second edge, respectively, the exposed conductive area of the first current collector sheet is connected to a first terminal on a first side face of the electrode plate assembly, the exposed conductive area of the second current collector sheet is connected to a second terminal on a second side face of the electrode plate assembly, the exposed insulating area of the first current collector sheet is positioned on the second side face, the exposed insulating area of the second current collector sheet is positioned on the first side face, at least a part of the exposed conductive area of the first current collector sheet is buried in the first terminal, and at least a part of the exposed conductive area of the second current collector sheet is buried in the second terminal.

An electrochemical device including an electrode plate assembly in which a plurality of first electrodes and a plurality of second electrodes are alternately layered with separators interposed therebetween, wherein the plurality of first electrodes each comprise a first current collector sheet with a conductive area and an insulating area and at least one first electrode mixture layer carried thereon, the plurality of second electrodes each comprise a second current collector sheet with a conductive area and an insulating area and at least one second electrode mixture layer carried thereon, a first edge and a second edge of each current collector sheet are portions to which the electrode mixture layer has not been applied, the conductive area and the insulating area are exposed at the first edge and the second edge, respectively, the exposed conductive area of the first current collector sheet is connected to a first terminal on a first side face of the electrode plate assembly, the exposed conductive area of the second current collector sheet is connected to a second terminal on a second side face of the electrode plate assembly, the exposed insulating area of the first current collector sheet is positioned on the second side face, the exposed insulating area of the second current collector sheet is positioned on the first side face, the first side face is provided with first insulating material portions for insulating the first terminal from the second electrodes, the second side face is provided with second insulating material portions for insulating the second terminal from the first electrodes, at least a part of the exposed conductive area of the first current collector sheet is buried in the first terminal, and at least a part of the exposed conductive area of the second current collector sheet is buried in the second terminal.

An electrochemical device including an electrode plate assembly in which a plurality of first electrodes and a plurality of second electrodes are alternately layered with separators interposed therebetween, wherein the plurality of first electrodes each comprise a first current collector sheet with a conductive area and an insulating area and at least one first electrode mixture layer carried thereon, the plurality of second electrodes each comprise a second current collector sheet with a conductive area and an insulating area and at least one second electrode mixture layer carried thereon, the periphery of each current collector sheet including a first edge and a second edge are portions to which the electrode mixture layer has not been applied, the conductive area is exposed at the first edge, and the insulating area is exposed at the edges other than the first edge, the exposed conductive area of the first current collector sheet is connected to a first terminal on a first side face of the electrode plate assembly, the exposed conductive area of the second current collector sheet is connected to a second terminal on a second side face of the electrode plate assembly, the exposed insulating area of the first current collector sheet is provided on all the side faces of the electrode plate assembly other than the first side face, the exposed insulating area of the second current collector sheet is provided on all the side faces of the electrode plate assembly other than the second side face, at least a part of the exposed conductive area of the first current collector sheet is buried in the first terminal, and at least a part of the exposed conductive area of the second current collector sheet is buried in the second terminal.

An electrochemical device including an electrode plate assembly in which a plurality of first electrodes and a plurality of second electrodes are alternately layered with separators interposed therebetween, wherein the plurality of first electrodes each comprise a first current collector sheet with a conductive area and an insulating area and at least one first electrode mixture layer carried thereon, the plurality of second electrodes each comprise a second current collector sheet with a conductive area and an insulating area and at least one second electrode mixture layer carried thereon, the periphery of each current collector sheet including a first edge and a second edge are portions to which the electrode mixture layer has not been applied, the conductive area is exposed at the first edge, the insulating area is exposed at the edges other than the first edge, the exposed conductive area of the first current collector sheet is connected to a first terminal on a first side face of the electrode plate assembly, the exposed conductive area of the second current collector sheet is connected to a second terminal on a second side face of the electrode plate assembly, the exposed insulating area of the first current collector sheet is provided on all the side faces of the electrode plate assembly other than the first side face, the exposed insulating area of the second current collector sheet is provided on all the side faces of the electrode plate assembly other than the second side face, the first side face is provided with first insulating material portions for insulating the first terminal from the second electrodes, the second side face is provided with second insulating material portions for insulating the second terminal from the first electrodes, at least a part of the exposed conductive area of the first current collector sheet is buried in the first terminal, and at least a part of the exposed conductive area of the second current collector sheet is buried in the second terminal.

An electrochemical device including an electrode plate assembly in which a plurality of first electrodes and a plurality of second electrodes are alternately layered with separators interposed therebetween, wherein the plurality of first electrodes each comprise a first current collector sheet and at least one first electrode mixture layer carried thereon, the plurality of second electrodes each comprise a second current collector sheet and at least one second electrode mixture layer carried thereon, the first current collector sheet and the second current collector sheet each have a conductive area and an insulating area, the conductive area of the first current collector sheet is connected to a first terminal on a first side face of the electrode plate assembly, the conductive area of the second current collector sheet is connected to a second terminal on a second side face of the electrode plate assembly, the first electrode mixture layer and the second electrode mixture layer each have an edge covered with an insulating material, the edge of the first electrode mixture layer covered with the insulating material is adjacent to the insulating area of the first current collector sheet, the edge of the second electrode mixture layer covered with the insulating material is adjacent to the insulating area of the second current collector sheet, and the first terminal and the second terminal are positioned on opposite sides of the electrode plate assembly.

An electrochemical device having an electrode plate assembly that includes (a) at least one first electrode, (b) at least one second electrode, and (c) a separator interposed between the first electrode and the second electrode, wherein the first electrode (a) comprises a first current collector sheet with a conductive area and an insulating area and at least one first electrode mixture layer carried thereon, the second electrode (b) comprises a second current collector sheet with a conductive area and an insulating area and at least one second electrode mixture layer carried thereon, a first edge and a second edge of each current collector sheet are portions to which the electrode mixture layer has not been applied, the conductive area and the insulating area are exposed at the first edge and the second edge, respectively, the exposed conductive area of the first current collector sheet is connected to a first terminal on a first side face of the electrode plate assembly, the exposed conductive area of the second current collector sheet is connected to a second terminal on a second side face of the electrode plate assembly, at least a part of the exposed conductive area of the first current collector sheet is buried in the first terminal, and at least a part of the exposed conductive area of the second current collector sheet is buried in the second terminal.

BRIEF DESCRIPTION OF DRAWINGS

FIG. 3 is another a-a line sectional view of the electrode plate assembly of FIG. 1;

FIG. 8 illustrates the step of forming conductive layers and first electrode mixture layers on a insulating base material sheet in a predetermined pattern, to obtain a group of first electrodes;

FIG. 9 illustrates the step of forming conductive layers and second electrode mixture layers on an insulating base material sheet in a predetermined pattern, to obtain a group of second electrodes;

FIG. 33 is an exemplary perspective view of a battery equipped with a case consisting of two members;

FIG. 35 is a flow chart illustrating the production steps of the electrode plate assembly of FIG. 34; and FIG. 36 is a flow chart illustrating the production steps of a wound-type electrode plate assembly according to Embodiment 9.

BEST MODE FOR CARRYING OUT THE INVENTION

Embodiment 1

Figure 1:
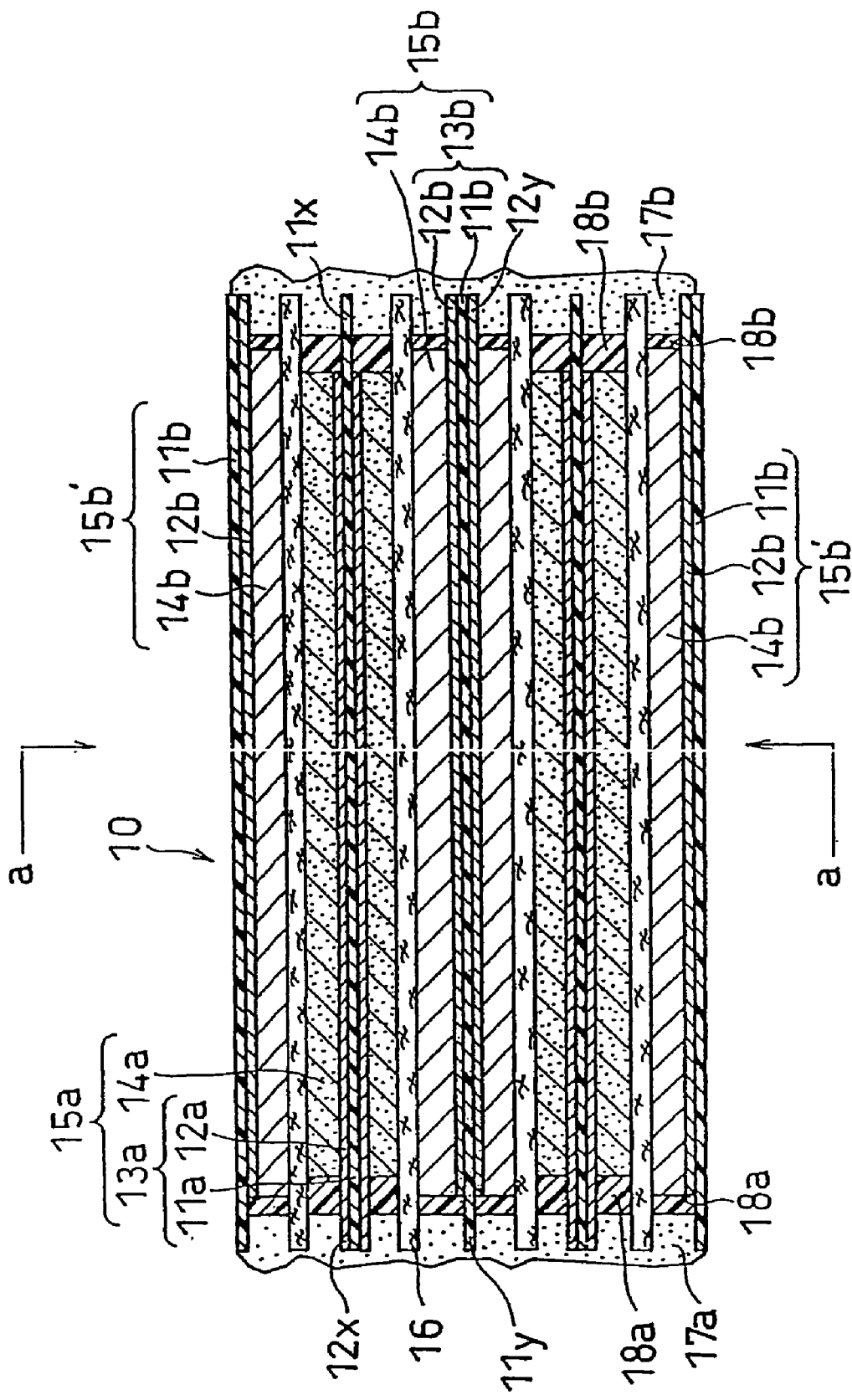
FIG. 1 is a longitudinal sectional view of a layered-type electrode plate assembly according to Embodiment 1.
Figure 2:
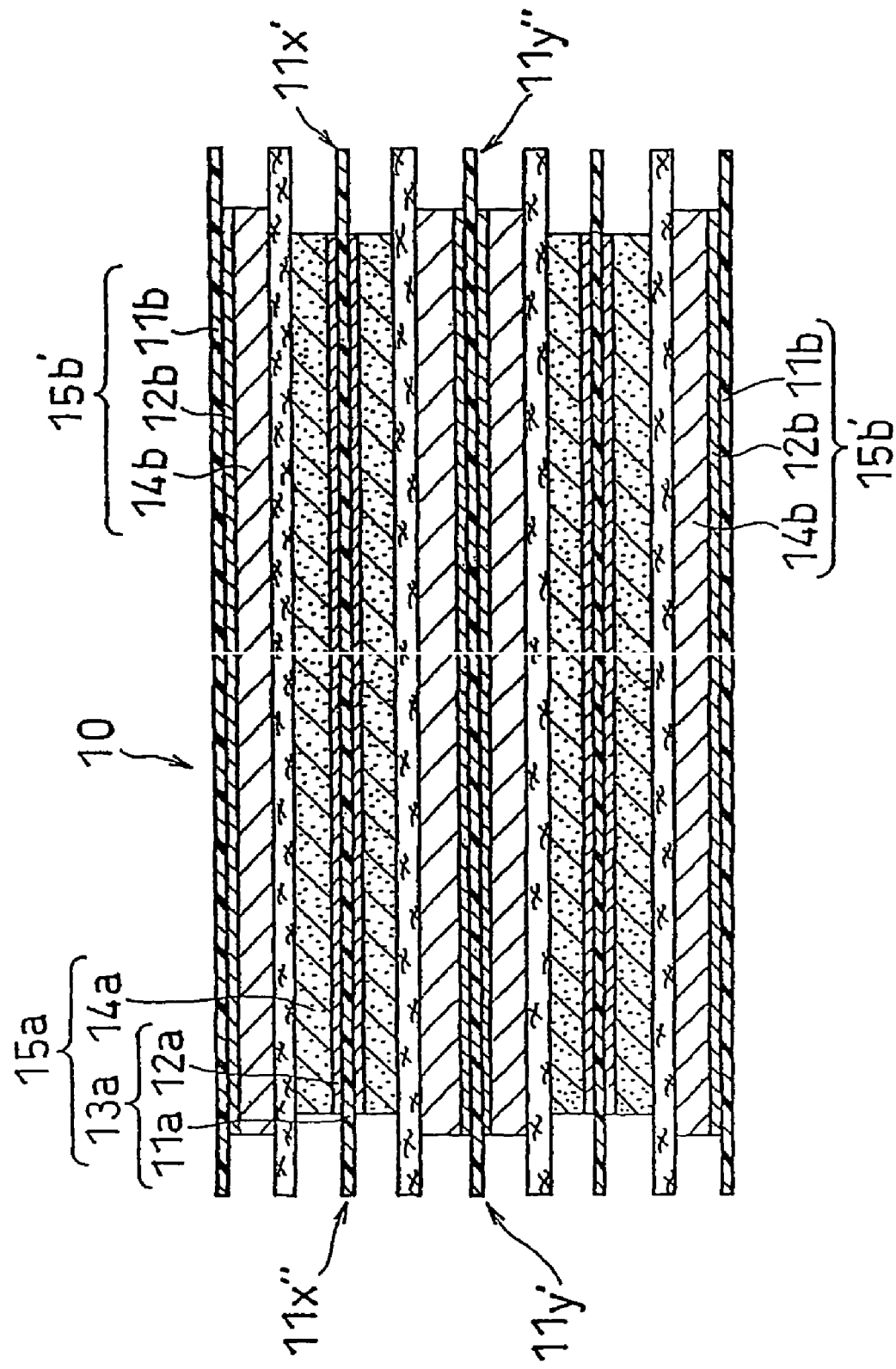
FIG. 2 is an a-a line sectional view of the electrode plate assembly of FIG. 1.

FIG. 1 shows a longitudinal sectional view of an exemplary layered-type electrode plate assembly according to the present invention. FIG. 2 shows an a-a line sectional view of the electrode plate assembly. An electrode plate assembly 10 includes a plurality of first electrodes 15a and a plurality of second electrodes 15b which are layered alternately, with a separator 16 interposed between each first electrode 15a and each second electrode 15b.

The first electrode 15a comprises a first current collector sheet 13a and two first electrode mixture layers 14a, and the first current collector sheet 13a is composed of a resin sheet 11a and a conductive layer 12a of a predetermined pattern formed on each side of the resin sheet 11a. The surface of the conductive layer 12a is a conductive area of the first current collector sheet, while the exposed part of the resin sheet 11a is an insulating area.

The conductive layer 12a is provided on the whole surface of the first current collector sheet except its edges 11x, 11x' and 11x''. Since the surface of the conductive layer 12a is a conductive area, the first electrode mixture layer 14a is provided thereon. The edges 11x, 11x' and 11x'' of the first current collector sheet, where there is no conductive layer 12a, serve as insulating areas. At an edge 12x located opposite the edge 11x, there is left an exposed part of the conductive layer 12a, which is used for collecting current.

The electrode plate assembly 10 includes two kinds of second electrodes 15b and 15b'. The inner second electrode 15b, which is sandwiched between two first electrodes 15a, has the same structure as that of the first electrode 15a, except that its orientation is reversed in the electrode plate assembly. That is, the inner second electrode 15b comprises a second current collector sheet 13b and two second electrode mixture layers 14b, and the second current collector sheet 13b is composed of a resin sheet 11b and a conductive layer 12b of a predetermined pattern formed on each side of the resin sheet 11b. The outermost two second electrodes 15b' have the same structure as that of the inner second electrode, except that the conductive layer 12b and the second electrode mixture layer 14b are provided on one side of the resin sheet 11b, not on both sides thereof.

The conductive layer 12b is provided on the whole surface of the second current collector sheet except its edges 11y, 11y' and 11y'''. Since the surface of the conductive layer 12b is a conductive area, the second electrode mixture layer 14b is provided thereon. The edges 11y, 11y' and 11y''' of the second current collector sheet, where there is no conductive layer 12b, serve as insulating areas. At an edge 12y located opposite the edge 11y, there is an exposed part of the conductive layer 12b, which is used for collecting current.

In FIGS. 1 and 2, on each side face of the electrode plate assembly 10, the edge of each current collector sheet and the edge of each separator are provided so as to be flush with one another. In FIG. 2, on each side face of the electrode plate assembly 10, the edge of each current collector sheet and the edge of each separator are also provided so as to be flush with one another.

On each side face, the edge of each current collector sheet and the edge of each separator need not to be completely flush with one another, but it is preferred that they be substantially flush with one another.

When the edge of each current collector sheet and the edge of each separator are completely flush with one another on each side face, the area S(1) per one side of the first current collector sheet, the area S(2) per one side of the second current collector sheet and the area S(s) per one side of the separator are equal, so that S(1)=S(s)=S(2).

On the other hand, when $S(1) \leqq S(s) \leqq S(1) \times 1.05$ and $S(2) \leqq S(s) \leqq S(2) \times 1.05$, it can be considered that the edge of each current collector sheet and the edge of the separator are substantially flush with one another on each side face.

In such an electrode plate assembly, the edges of the separators and the electrode plates do not protrude from its side faces, thereby making it possible to obtain high volume efficiency and high capacity. Since such an electrode plate assembly has a balanced, simple structure, it is easy to ensure reliability. In addition, a large number of electrode plate assemblies can be manufactured at the same time, so that reduction of the manufacturing cost becomes possible.

The exposed part (edge 12x) of the conductive layer 12a of the first current collector sheet 13a is positioned on a first side face (left side in FIG. 1) of the electrode plate assembly 10, whereas the insulating area (edge 11x), which is at the opposite end, is positioned on a second side face (right side in FIG. 1) of the electrode plate assembly 10. In contrast, the exposed part (edge 12y) of the conductive layer 12b of the second current collector sheet 13b is positioned on the second side face of the electrode plate assembly 10, whereas the insulating area (edge 11y), which is at the opposite end, is positioned on the first side face of the electrode plate assembly 10. In FIG. 1, the first side face and the second side face are arranged on the opposite sides of the electrode plate assembly, but this arrangement is not particularly limited.

As described above, when the orientations of the first electrode and the second electrode are opposite to each other, the exposed part (edge 12x) of the conductive layer 12a of the first current collector sheet 13a is adjacent to the insulating area (edge 11y) of the second current collector sheet 13b, with the edge of the separator 16 interposed therebetween. The exposed part (edge 12y) of the conductive layer 12b of the second current collector sheet 13b is adjacent to the insulating area (edge 11x) of the first current collector sheet 13a, with the edge of the separator 16 interposed therebetween. In such an arrangement, the first electrode and the second electrode can be easily prevented from short-circuiting, and also, the exposed parts of the conductive layers of a plurality of first current collector sheets or second current collector sheets can be easily connected in parallel, to obtain an electrode plate assembly with a high capacity.

From the viewpoint of reliable prevention of a short-circuit, it is preferred that the insulating area (edge 11y) of the second current collector sheet adjacent to the exposed part (edge 12x) of the conductive layer 12a of the first current collector sheet 13a, and the insulating area (edge 11x) of the first current collector sheet 13a adjacent to the exposed part (edge 12y) of the conductive layer 12b of the second current collector sheet 13b have a width of 0.001 mm or more, and further, 0.1 mm or more.

As in FIG. 1, when the exposed parts of the conductive layers 12a or 12b of a plurality of the first current collector sheets 13a or the second current collector sheets 13b are connected in parallel to obtain an electrode plate assembly with a high capacity, the exposed parts may be connected to one another by any method; however, for example, a method of coating the first side face and the second side face with a conductive material film can be used. With respect to the thickness of the conductive material film, for example, approximately 0.01 to 1 mm is sufficient. The conductive material films thus obtained can be used as a first terminal 17a and a second terminal 17b, respectively, for collecting current.

In order to obtain a good current-collecting state, the larger the contact area of the exposed part of the conductive layer 12a or 12b with the conductive material film, the more preferable. The exposed part of the conductive layer 12a or 12b is preferably buried in the conductive material film (terminal 17a or 17b) to a depth of 0.001 to 1 mm, and more preferably to a depth of 0.01 to 1 mm.

Since the exposed part of each current collector sheet is buried in each terminal, high current-collecting performance can be obtained, regardless of the conductivity of the electrode mixture layer and the thickness of the current collector sheet, for example, unlike conventional electrochemical devices whose electrode plate itself is buried in a terminal. In addition, unlike the case of connecting the core members of protruded electrode plates of the same polarity with a plate-shaped current collector plate, a problem of being unable to secure sufficient contact area of the core members with the current collector plate does not arise.

It is preferred in one embodiment that at least one of the first terminal and the second terminal, made of a conductive material film, comprise a porous metal film composed of metal particles joined continuously. Such a porous metal film can be obtained by jetting molten metal or half-molten metal particles from a nozzle by means of compressed air, and spraying them to a predetermined side face of an electrode plate assembly. For example, the so-called metalikon (metalikon) can be employed.

When the first terminal or the second terminal serves as the positive electrode terminal, the porous metal film is preferably made of aluminum, an aluminum alloy, or the like. When the first terminal or the second terminal serves as the negative electrode terminal, the porous metal film is preferably made of copper, a copper alloy, or the like.

It is preferred in another embodiment that at least one of the first terminal and the second terminal, made of a conductive material film, comprise a conductive paste. The conductive paste that may be used comprises: a resin; and at least one selected from the group consisting of conductive fine particles and conductive fibers dispersed in the resin. Since the conductive paste can be easily applied onto a predetermined side face of the electrode plate assembly, the use of the conductive paste makes it possible to simplify the manufacturing process of the electrode plate assembly. It is preferred that the conductive paste applied onto the predetermined side face of the electrode plate assembly be cured by heating or light irradiation. By curing the conductive paste, the strength of the first terminal or the second terminal can be improved.

The resin may be a thermoplastic resin or may be a thermosetting resin.

When the first terminal or the second terminal serves as the positive electrode terminal, polyamide imide or the like may be preferably used as the resin of the conductive paste. Also, for the positive electrode terminal, conductive fine particles or conductive fibers comprising carbon, aluminum or the like are preferably used. When the first terminal or the second terminal serves as the negative electrode terminal, polyamide imide or the like may also be used preferably as the resin of the conductive paste. Further, for the negative electrode terminal, conductive fine particles or conductive fibers comprising copper, silver, silver-plated copper, nickel, carbon or the like are preferably used.

The mean particle size of the conductive particles is preferably 1 to 100 μm. Also, the diameter of the conductive fibers is preferably 1 to 100 μm, and the length of the fibers are not particularly limited.

The content of the conductive fine particles and/or the conductive fibers in the conductive paste is preferably 50 to 90% by weight. To increase the conductivity, larger contents of the conductive fine particles and/or the conductive fibers are preferred; however, if the resin content becomes too small, preparation and application of the conductive paste become difficult.

It is preferred in a still another embodiment that at least one of the first terminal and the second terminal, made of a conductive material film, comprise a low melting-point metal having a melting point of 250° C. or lower, preferably 180° C. or lower. For example, adding a resin to a low melting-point metal as flux produces solder. Solder is easy to handle and, in addition, the use of solder makes it possible to form a terminal having good conductivity, compared with the use of a porous metal film or a conductive paste. However, if the melting point of a low melting-point alloy exceeds 250° C., the electrochemical device may be damaged when a terminal comprising the low melting-point metal is formed on a predetermined side face of the electrode plate assembly.

Known examples of the low melting-point metal include Pb—Sn system alloys, Pb—Sn—Bi system alloys, Pb—Sn—Sb system alloys, Sn—Ag—Cu system alloys, and Sn—Zn—Bi system alloys, but metals of other compositions may also be used.

The electrode plate assembly 10 having terminals on their side faces requires no tabs or leads for collecting current, so it can easily have a balanced, simple structure.

In FIGS. 1 and 2, the edges of the first electrode mixture layers 14a and the second electrode mixture layers 14b are recessed from a third side face and a fourth side face; however, the edge of each electrode mixture layer may be provided so as to be flush with the edge of the conductive area or the insulating area of each current collector sheet and the edge of each separator. In such a structure, it is also possible to sufficiently prevent a short-circuit by covering the third side face and the fourth side face with an insulating material.

The thickness of the resin sheets 11a and 11b are, for example, 0.5 to 500 μm. Common resin sheets having a flat surface may be used, and perforated material, lath, porous material, net, foamed material, woven fabric, non-woven fabric and the like may be used. Also, resin sheets having an uneven surface may also be used.

Examples of the materials which may be used for the resin sheets 11a and 11b include: olefin polymers such as polyethylene, polypropylene and polymethylpentene; ester polymers such as polyethylene terephthalate, polybutylene terephthalate, polycyclohexylene dimethylene terephthalate, and polyarylate; thioether polymers such as polyphenylene sulfide; aromatic vinyl polymers such as polystyrene; nitrogen containing polymers such as polyimide and aramid resin; and fluoropolymers such as polytetrafluoroethylene and polyvinylidene fluoride. They may be used singly, or may be used in combination of two or more of them in the form of a copolymer, polymer alloy, polymer blend or the like.

The thickness of the conductive layers 12a and 12b is, for example, 0.01 to 100 μm.

The conductive layers 12a and 12b may be made of an electronic conductor that causes no chemical change in the resultant battery, without any particular limitation. When the first electrode or the second electrode is the positive electrode, for example, stainless steel, aluminum, an aluminum alloy, titanium, or carbon may be used, and aluminum, an aluminum alloy or the like is particularly preferred. When the first electrode or the second electrode is the negative electrode, for example, stainless steel, nickel, copper, a copper alloy, or titanium is used, and copper, a copper alloy or the like is particularly preferred.

The method for forming the conductive layers 12a and 12b is not particularly limited; however, for example, a conductive material may be vapor-deposited onto the surfaces of the resin sheets 11a and 11b, to obtain conductive layers. In order to form a deposited film of a predetermined pattern, vapor deposition is performed after a mask with an opening of a predetermined shape is fitted to the resin sheet.

The first side face of the electrode plate assembly 10 can be provided with first insulating material portions 18a for insulating the first terminal 17a from the second electrodes 15b and 15b'. The second side face can be provided with second insulating material portions 18b for insulating the second terminal 17b from the first electrodes 15a. The first side face is provided with the insulating areas (edges 11y) of the second current collector sheets 13b, while the second side face is provided with the insulating areas (edges 11x) of the first current collector sheets 13a. Therefore, the prevention of a short-circuit is possible even without providing the insulating material portions. However, further providing the insulating material portions 18a and 18b greatly reduces the risk of a short-circuit. Although the thickness of the insulating material portions 18a and 18b is not particularly limited, it is preferably 0.001 mm or more, and further, 0.01 mm or more.

The method for forming the insulating material portion 18a or 18b is not particularly limited; however, a method of applying a paste-like or liquid insulating material on the current collector sheet 13a or 13b around the electrode mixture layer 14a or 14b by screen printing or the like in the manufacturing process of an electrode plate can be employed. Also, an insulating material in the form of a film or tape may be affixed to the current collector sheet 13a or 13b around the electrode mixture layer 14a or 14b, to form an insulating material portion.

In FIG. 2, the third side face and the fourth side face of the electrode plate assembly 10 are not provided with the insulating material portions; however, as in FIG. 3, it is also possible to cover the edges of the electrode mixture layers disposed on the third side face (left side in FIG. 3) and the fourth side face (right side in FIG. 3) with a third insulating material portion 18c and a fourth insulating material portion 18d, respectively. Such a structure enables reliable prevention of a short-circuit.

Examples of the insulating material used for the insulating material portions 18a and 18b include resin, glass compositions, and ceramics. Composite materials made of resin-impregnated woven fabric or non-woven fabric may also be used. The resin may be a thermoplastic resin or a thermosetting resin. When a thermosetting resin is used, a step of curing resin coating film by heating is necessary.

Examples of the resin which may be used for the insulating material portions 18a and 18b include; olefin polymers such as polyethylene, polypropylene and polymethylpentene; ester polymers such as polyethylene terephthalate, polybutylene terephthalate, polycyclohexylene dimethylene terephthalate, polyarylate, and polycarbonate; ether polymers such as polyethylene oxide, polypropylene oxide, polyacetal, polyphenylene ether, polyether ether ketone, and polyetherimide; sulfone polymers such as polysulfone and polyether sulfone; acrylonitrile polymers such as polyacrylonitrile, AS resin, and ABS resin; thioether polymers such as polyphenylene sulfide; aromatic vinyl polymers such as polystyrene; nitrogen containing polymers such as polyimide and aramid resin; fluoropolymers such as polytetrafluoroethylene and polyvinylidene fluoride; and acryl polymers such as polymethyl methacrylate. They may be used singly, or may be used in combination of two or more of them in the form of a copolymer, polymer alloy, a polymer blend or the like. Polymers obtained by polymerization and curing due to heating and UV radiation may also be used.

More specifically, a resin coating film or a resin tape may be used as the insulating material portion.

The resin coating film can be formed by applying a solution or dispersion containing an insulating resin onto the edge of the electrode mixture layer and drying it. Although the application method is not particularly limited, for example, screen printing and die coating may be used to apply a solution or dispersion onto the current collector sheet around the electrode mixture layer. The solution or dispersion may be liquid or a paste, and the viscosity thereof may be controlled arbitrarily.

Examples of the insulating resin to be contained in the solution or dispersion include: ether resins such as polyethylene oxide, polypropylene oxide, polyacetal, polyphenylene ether, polyether ether ketone, and polyetherimide; acrylonitrile resins such as polyacrylonitrile, AS resin, and ABS resin: fluorocarbon resins such as polyvinylidene fluoride; acrylic resins such as polymethyl methacrylate; and copolymers, polymer alloys or polymer blends including such polymers. They may be used singly or in combination of two or more of them. Among them, polyethylene oxide, polypropylene oxide, polyacrylonitrile, polyvinylidene fluoride, polymethyl methacrylate, copolymers, polymer alloys or polymer blends including such polymers, and the like are particularly preferred.

The resin coating film may also be formed by applying a solution or dispersion containing a polymerizable compound to the edge of the electrode mixture layer and polymerizing the polymerizable compound. Although the application method is not particularly limited, for example, screen printing may be used. The solution or dispersion may be liquid or a paste, and the viscosity thereof may be controlled arbitrarily. It is preferred that the polymerizable compound be polymerized by means of at least one selected from the group consisting of heat, ultraviolet rays and electron beams.

The polymerizable compound has, for example, one to three polymerizable functional groups in its molecules. It is preferred that the polymerizable functional group be at least one selected from the group consisting of an acrylate group and a methacrylate group. Also, the portion other than the polymerizable functional group(s) is not particularly limited, but it may be, for example, polyalkylene oxide chains.

When the polymerizable compound is polymerized by heat, a polymerization initiator such as azobis(isobutyronitrile), benzoyl peroxide or acetyl peroxide is used. When the polymerizable compound is polymerized by ultraviolet rays, a polymerization initiator such as benzyldimethylketal or benzoin isopropyl ether is used. When the polymerizable compound is polymerized by electron beams, a polymerization initiator is not particularly necessary.

The insulating material portion may also be formed by affixing a resin tape to the current collector sheet around the electrode mixture layer. The resin tape may be made of an insulating base material and an insulating adhesive carried thereon.

Examples of the insulating base material that may be used include: olefin resins such as polyethylene, polypropylene, and polymethylpentene; ester resins such as polyethylene terephthalate, polyethylene naphthalate, polycyclohexylene dimethylene terephthalate, polyarylate, and polycarbonate; ether resins such as polyethylene oxide, polypropylene oxide, polyacetal, polyphenylene ether, polyether ether ketone, and polyetherimide; sulfone resins such as polysulfone and polyether sulfone; acrylonitrile resins such as polyacrylonitrile, AS resin and ABS resin; thioether resins such as polyphenylene sulfide; aromatic vinyl resins such as polystyrene; nitrogen containing resins such as polyimide and aramid resin; fluorocarbon resins such as polytetrafluoroethylene and polyvinylidene fluoride; acrylic resins such as polymethyl methacrylate; and copolymers, polymer alloys or polymer blends including such polymers. They may be used singly or in combination of two or more of them. Among them, polyethylene, polypropylene, polyethylene terephthalate, polyethylene naphthalate, polyphenylene sulfide, polyimide, aramid resin, copolymers, polymer alloys or polymer blends including such polymers, and the like are particularly preferred.

The insulating adhesive is not particularly limited; however, for example, an acrylic resin, a butyl rubber resin, or the like may be used.

The thickness of the insulating base material is, for example, 1 to 1000 µm, and the thickness of the insulating adhesive is, for example, 0.1 to 100 µm. The insulating adhesive may be provided only on one side of the base material, or may be provided on both sides thereof.

In FIG. 1, the second electrode mixture layer 14b has a larger area than the first electrode mixture layer 14a. This structure is suitable for the electrode plate assembly of a lithium ion secondary battery in which the first electrode mixture layer 14a is the positive electrode and the second electrode mixture layer 14b is the negative electrode. If the first electrode mixture layer 14a is the negative electrode and the second electrode mixture layer 14b is the positive electrode, the area of the first electrode mixture layer 14a is made larger than that of the second electrode mixture layer 14b.

The thickness of the electrode mixture layers 14a and 14b is, for example, 1 to 1000 µm, but there is no particular limitation with respect to the thickness thereof.

The electrode mixture contains an electrode active material, and it may optionally contain a conductive agent, a binder, and the like. When the first electrode or the second electrode is the positive electrode of a lithium ion secondary battery, for example, a lithium-containing transition metal oxide is preferably used as an active material. Examples of the lithium-containing transition metal oxide include $Li_xCoO_z$, $Li_xNiO_z$, $Li_xMnO_z$, $Li_xCo_yNi_{1-y}O_z$, $Li_xCo_fV_{1-f}O_z$, $Li_xNi_{1-y}M_yO_z$ (M=Ti, V, Mn, Fe), $Li_xCo_aNi_bM_cO_z$ (M=Ti, Mn, Al, Mg, Fe, Zr), $Li_xMn_2O_4$, and $Li_xMn_{2(1-y)}M_{2y}O_4$ (M=Na, Mg, Sc, Y, Fe, Co, Ni, Ti, Zr, Cu, Zn, Al, Pb, Sb). They may be used singly or in combination of two or more of them. However, due to the charge and discharge of the battery, the value x varies in the following range of $0 \leq x \leq 1.2$. Also, $0 \leq y \leq 1$, $0.9 \leq f \leq 0.98$, $1.9 \leq z \leq 2.3$, $a+b+c=1$, $0 \leq a \leq 1$, $0 \leq b \leq 1$, and $0 \leq c \leq 1$.

When the first electrode or the second electrode is the negative electrode of a lithium ion secondary battery, for example, lithium, a lithium alloy, an intermetallic compound, carbon material, an organic or inorganic compound capable of absorbing and desorbing lithium ions, a metal complex, an organic polymer compound, or the like may be preferably used as an active material. They may be used singly or in combination of two or more of them. Examples of the carbon material include coke, thermally decomposed carbon, natural graphite, artificial graphite, mesocarbon microbeads, graphitized mesophase microspheres, vapor-deposited carbon, glassy carbon, carbon fibers (polyacrylonitrile-based, pitch-based, cellulose-based, vapor-deposition type), amorphous carbon, and baked organic compounds. Among them, natural graphite and artificial graphite are particularly preferred.

As the conductive material, for example, carbon black, such as acetylene black, or graphite is used.

Examples of the binder that can be used include fluorocarbon resins such as polyvinylidene fluoride and polytetrafluoroethylene, acrylic resins, styrene butadiene rubber, and ethylene-propylene terpolymers.

As the separator, woven fabric or non-woven fabric made of an olefin polymer, such as polyethylene or polypropylene, or glass fibers may be used. A solid electrolyte or gel electrolyte may also be used as the separator. For the solid electrolyte, for example, polyethylene oxide or polypropylene oxide may be used as a matrix material. As the gel electrolyte, for example, a non-aqueous electrolyte that is described below and retained by a matrix of a polymer material may be used. Examples of the matrix-forming polymer material that may be used include polyethylene oxide, polypropylene oxide, polyvinylidene fluoride, and a copolymer of vinylidene fluoride and hexafluoropropylene. They may be used singly or in combination of two or more of them. Among them, the use of a copolymer of vinylidene fluoride and hexafluoropropylene and a mixture of polyvinylidene fluoride and polyethylene oxide is particularly preferred.

The electrode plate assembly is generally accommodated with the electrolyte in a predetermined case when it is used. The composition of the electrolyte varies depending on the kind of the electrochemical device. With respect to the shape, material and the like of the case, there is no particular limitation.

When the electrochemical device is, for example, a lithium ion secondary battery, an electrolyte composed of a non-aqueous solvent and a lithium salt dissolved therein is used. The lithium salt concentration in the electrolyte is preferably, for example, 0.5 to 1.5 mol/L.

Examples of the non-aqueous solvent which may be used include: cyclic carbonates such as ethylene carbonate, propylene carbonate, butylene carbonate, and vinylene carbonate; non-cyclic carbonates such as dimethyl carbonate, diethyl carbonate, ethylmethyl carbonate, ethylpropyl carbonate, methylpropyl carbonate, methyl isopropyl carbonate, and dipropyl carbonate; aliphatic carboxylic acid ester such as methyl formate, methyl acetate, methyl propionate, and ethyl propionate; γ-lactones such as γ-butyrolactone and γ-valerolactone; non-cyclic ethers such as 1,2-dimethoxyethane, 1,2-diethoxyethane, and ethoxymethoxyethane; cyclic ethers such as tetrahydrofuran and 2-methyl-tetrahydrofuran; alkylphosphoric acid esters such as dimethyl sulfoxide, 1,3-dioxolane, trimethyl phosphate, triethyl phosphate, and trioctyl phosphate; and fluorides thereof. It is preferred to combine two or more of them for use. Particularly, a mixture containing a cyclic carbonate and a non-cyclic carbonate, a mixture containing a cyclic carbonate, a non-cyclic carbonate and an aliphatic carboxylic acid ester, and the like are preferred.

Examples of the lithium salt that may be used include $LiPF_6$, $LiBF_4$, $LiClO_4$, $LiAlCl_4$, $LiSbF_6$, LiSCN, LiCl, $LiCF_3SO_3$, $LiCF_3CO_2$, $LiAsF_6$, $LiN(CF_3SO_2)_2$, $Li_2B_{10}Cl_{10}$, $LiN(C_2F_5SO_2)_2$, $LiPF_3(CF_3)_3$, and $LiPF_3(C_2F_5)_3$. They may be used singly or in combination of two or more of them. However, it is preferred that the electrolyte contain at least $LiPF_6$.

Embodiment 2

Figure 4:
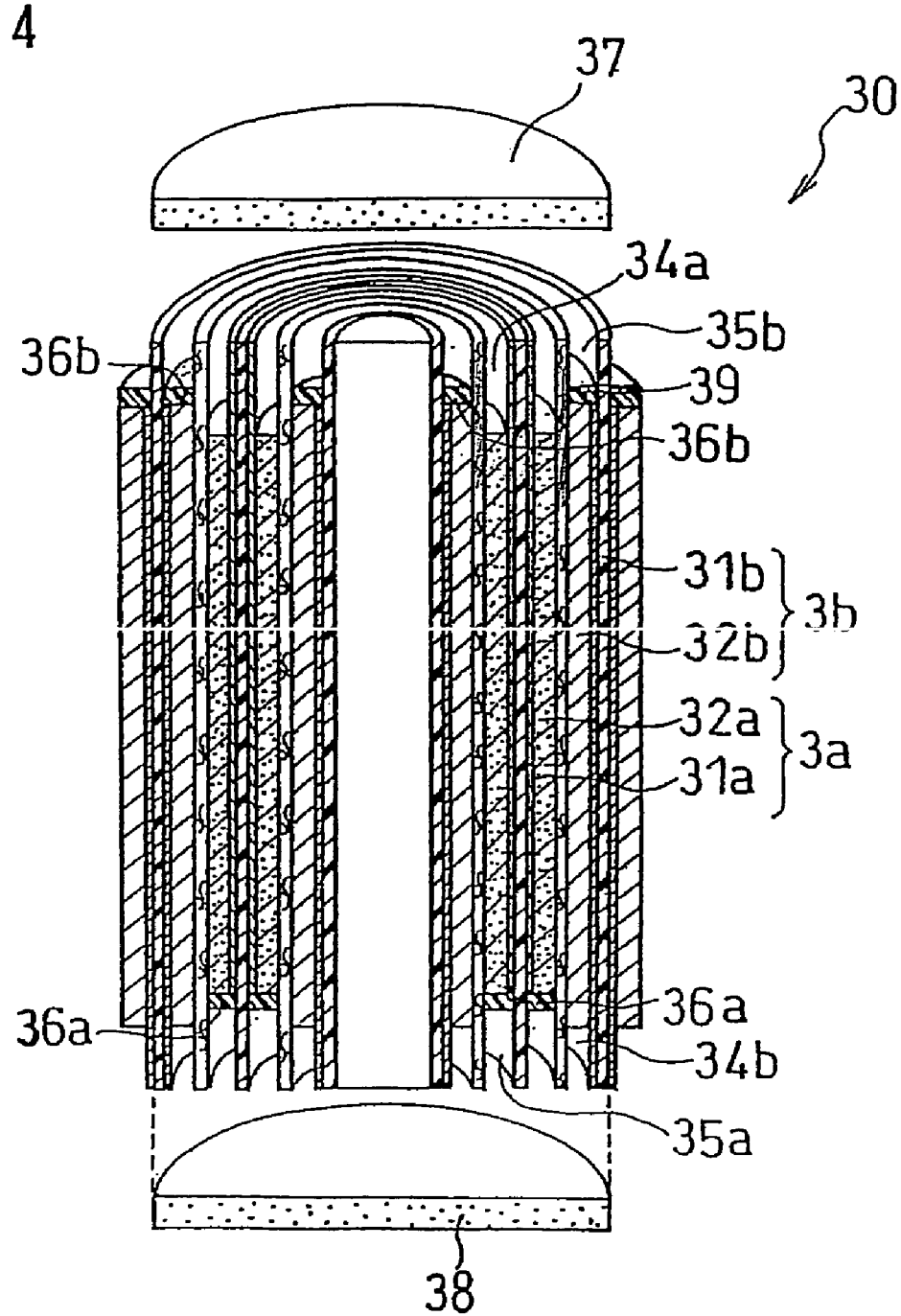
FIG. 4 is a schematic longitudinal sectional view of a wound-type electrode plate assembly according to Embodiment 2.

An exemplary wound-type electrode plate assembly is described. FIG. 4 is a schematic longitudinal sectional view of a part of a wound-type electrode plate assembly 30, featuring a first electrode. The material mixture layer and the current collector sheet that are located outside are omitted.

The wound-type electrode plate assembly 30 includes a first electrode 3a and a second electrode 3b that are layered and wound with a separator 39 interposed between the first electrode 3a and the second electrode 3b.

The first electrode 3a comprises a first current collector sheet 31a and two first electrode mixture layers 32a on both sides of the first current collector sheet 31a, and the first current collector sheet 31a is composed of a resin sheet and a conductive layer formed on each side of the resin sheet. The surface of the conductive layer is a conductive area of the first current collector sheet, while the exposed part of the resin sheet is an insulating area.

The conductive layer is provided on the whole surface of the first current collector sheet except its edge 35a. The surface of the conductive layer is a conductive area, so the first electrode mixture layer 32a is provided thereon. The edge 35a of the first current collector sheet, where there is no conductive layer, serves as an insulating area. At an edge 34a located opposite the edge 35a, there is an exposed part of the conductive layer, which is used for collecting current.

The second electrode 3b has the same structure as that of the first electrode 3a, except that its orientation is reversed in the electrode plate assembly. That is, the inner second electrode 3b comprises a second current collector sheet 31b and two second electrode mixture layers 32b formed on both sides of the second current collector sheet 31b, and the second current collector sheet 31b is composed of a resin sheet and a conductive layer formed on each side of the resin sheet.

The conductive layer is provided on the whole surface of the second current collector sheet except its edge 35b. The surface of the conductive layer is a conductive area, so the second electrode mixture layer 32b is provided thereon. The edge 35b of the second current collector sheet, where there is no conductive layer, serves as an insulating area. At an edge 34b located opposite the edge 35b, there is an exposed part of the conductive layer, which is used for collecting current.

In FIG. 4, on each bottom face of the electrode plate assembly, the edge of each current collector sheet and the edge of each separator are provided so as to be substantially flush with one another.

The exposed part (edge 34a) of the conductive layer of the first current collector sheet 31a is positioned on a first bottom face (upper side in FIG. 4) of the electrode plate assembly, whereas the insulating area (edge 35a), which is at the opposite end thereof, is positioned on a second bottom face (lower side in FIG. 1) of the electrode plate assembly. In contrast, the exposed part (edge 34b) of the conductive layer of the second current collector sheet 31b is positioned on the second bottom face of the electrode plate assembly, whereas the insulating area (edge 35b), which is at the opposite end, is positioned on the first bottom face of the electrode plate assembly.

The insulating area of each current collector sheet provided on each bottom face preferably has a width of 0.001 mm or more, and more preferably 0.1 mm or more, in the same manner as the electrode plate assembly of Embodiment 1.

It is preferred to integrally connect the exposed part of the conductive layer of the first current collector sheet 31a or the second current collector sheet 31b. Although any method may be employed for connection, it is preferred to coat the first bottom face and the second bottom face with a conductive material film of, for example, approximately 0.01 to 1 mm in thickness, as shown in FIG. 4. The conductive material films thus obtained can be used as a first terminal 37 and a second terminal 38, respectively, for collecting current. The conductive material film can be formed in the same manner as the electrode plate assembly of Embodiment 1.

The larger the contact area of the exposed part of the conductive layer with the conductive material film, the more preferable. In the same manner as the electrode plate assembly of Embodiment 1, the exposed part of the conductive layer is preferably buried in the conductive material film (terminal 37 or 38) to a depth of 0.001 to 1 mm.

The first bottom face of the electrode plate assembly can be provided with a first insulating material portion 36b for insulating the first terminal 37 from the second electrode 3b. The second bottom face can be provided with a second insulating material portion 36a for insulating the second terminal 38 from the first electrode 3a.

The first bottom face is provided with the insulating area (edge 35b) of the second current collector sheet, while the second bottom face is provided with the insulating area (edge 35a) of the first current collector sheet. Thus, the prevention of a short-circuit is possible even without providing the insulating material portions. However, further providing the insulating material portions 36a and 36b greatly reduces the risk of a short-circuit.

The insulating material portion can be provided in the same manner as the electrode plate assembly of Embodiment 1. Although the thickness of the insulating material portion is not particularly limited, it is preferably 0.001 mm or more, and more preferably 0.01 mm or more, in the same manner as the electrode plate assembly of Embodiment 1.

Since such an electrode plate assembly needs no tabs or leads for collecting current, it has a balanced, simple structure, so that it is easy to ensure reliability. Also, it is possible to obtain high volume efficiency and high capacity. In addition, a large number of such electrode plate assemblies can be manufactured at one time, thereby enabling reductions in manufacturing costs.

Embodiment 3

Figure 5:
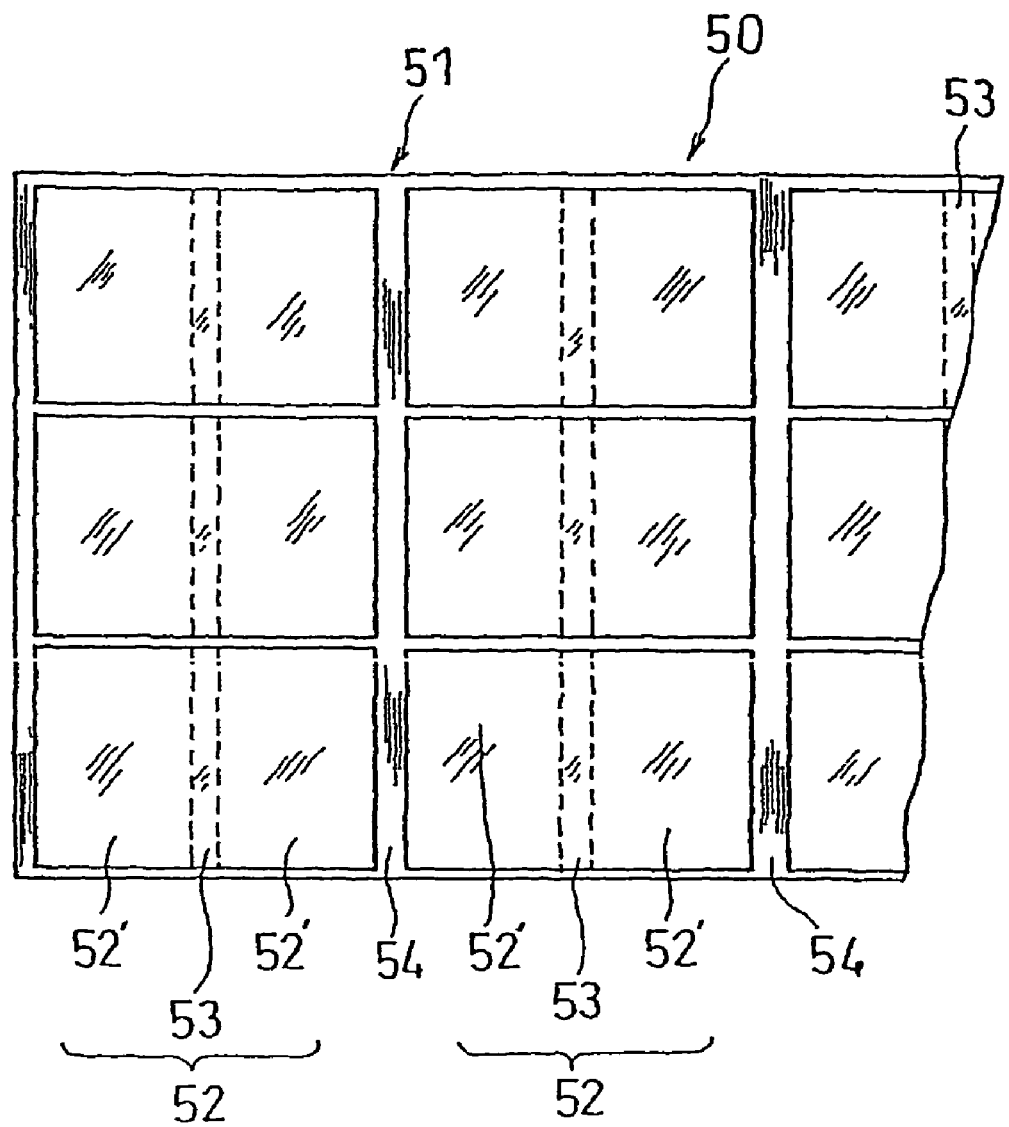
FIG. 5 is an exemplary top view of a current collector sheet.

Referring now to FIG. 5, an exemplary method for producing a plurality of layered-type electrode plate assemblies at the same time is described. According to the following method, it is possible to efficiently produce electrode plate assemblies that are, for example, 1 to 300 mm in length, 1 to 300 mm in width, and 0.01 to 20 mm in thickness.

The production method of this embodiment includes the steps of:

(a) forming conductive layers on both sides of two insulating base material sheets, based on a predetermined pattern, to obtain a first current collector sheet and a second current collector sheet;

(b) forming a plurality of first electrode mixture layers and a plurality of second electrode mixture layers on each of the conductive layers of the first current collector sheet and the second current collector sheet, respectively, with a gap therebetween, based on the above-mentioned pattern, to obtain a group of first electrodes and a group of second electrodes;

(c) layering the group of first electrodes and the group of second electrodes, with a separator therebetween, to obtain a layered body; and (d) cutting the layered body at the gap, to obtain a plurality of layered-type electrode plate assemblies.

In the following, steps (a) to (d) will be explained in the order of the steps. Also, other steps will be explained, where appropriate. It is noted that other steps may be selected or combined, as appropriate, by one with ordinary skill in the art, according to the structure and use of the electrochemical device. Further, the method of producing layered-type electrode plate assemblies is not to be limited to the one described below.

Step (a)

In step (a), conductive layers are formed on both sides of two insulating base material sheets, based on a predetermined pattern, to obtain a first current collector sheet and a second current collector sheet.

As the predetermined pattern, a matrix pattern consisting of a plurality of rows and a plurality of columns, as illustrated in FIG. 5, is explained.

First, a resin sheet 51 large enough to provide a desired number of current collector sheets 50 is prepared as an insulating base material sheet, and a plurality of conductive layers of a predetermined pattern are formed at the same positions on both sides of the resin sheet 51.

In the case of FIG. 5, on the resin sheet 51 are a plurality of conductive layers 52, each of which is as large as two electrodes. To obtain 2n electrodes, n conductive layers are formed per one side of the resin sheet. Specifically, two current collector sheets 52', which are as large as two electrodes, and a middle part 53 located therebetween, are formed integrally. By a step that will be described later, the middle part 53 will become the exposed part of the conductive layer where no electrode mixture layer is carried. In this way, the first current collector sheet 50 is obtained. The second current collector sheet is produced in the same manner.

Such conductive layers can be obtained by a method of covering the resin sheet with a matrix-like mask and vapor-depositing metal on the parts of the resin sheet exposed from the mask. At the parts covered by the mask, exposed parts 54 of the resin sheet are left.

The mask may be a sheet with matrix-like openings, oil that is applied in matrix form to a resin sheet to prevent adhesion of deposited metal, and the like. Also, a method of printing ink in matrix form on a resin sheet, depositing metal, and then washing away the ink and the deposited metal on the ink may be employed. Further, a method of depositing-metal on a resin sheet and obtaining conductive layers of predetermined pattern using a metal-removing means, such as laser, may be employed, for example. However, there is no particular limitation to these methods.

Step (b)

Next, a plurality of first electrode mixture layers or second electrode mixture layers are formed on each conductive layer, with a gap therebetween, based on the above-mentioned pattern, to obtain a group 60a of first electrodes and a group 60b of second electrodes.

Figure 6:
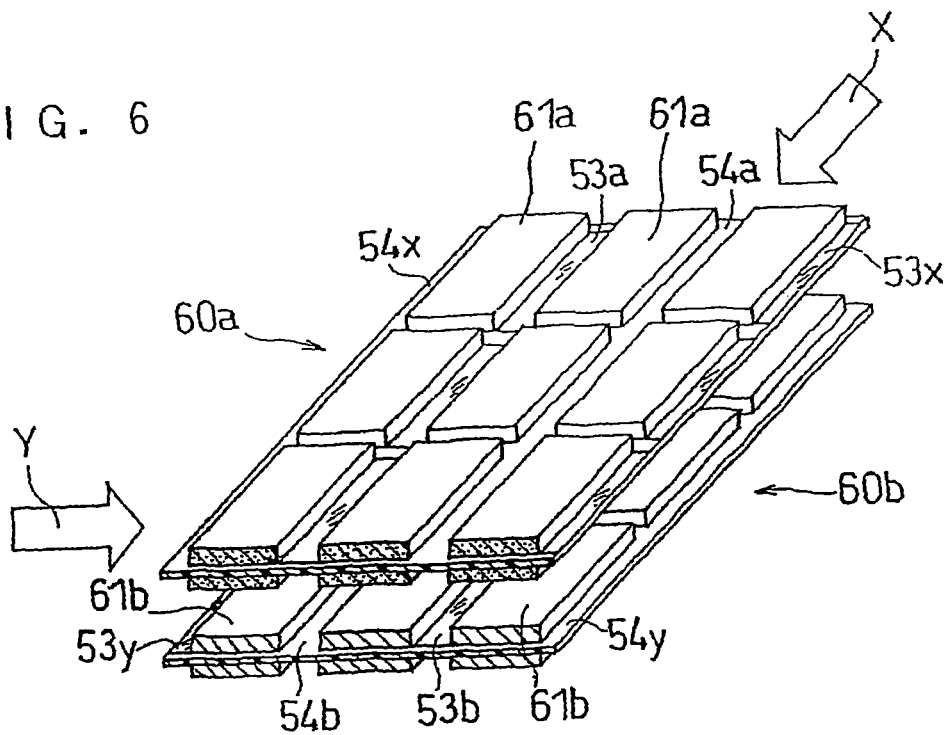
FIG. 6 is a perspective view of a group of first electrodes and a group of second electrodes.

In the case of FIG. 6, two first electrode mixture layers 61a are formed on each conductive layer of the first current collector sheet. Between the two first electrode mixture layers 61a is a gap, where there is left an exposed part 53a of the conductive layer which carries no material mixture. Also, there is left an exposed part 54a of the resin sheet which has no conductive layer.

The first electrode mixture layers are formed by applying a first electrode mixture paste onto the whole surfaces of the conductive layers except the middle parts 53. Although the application method is not particularly limited, the use of screen printing, pattern application or the like is preferable. The exposed part 53a of each conductive layer, to which the paste has not been applied, serves as a part 53x to be connected to a first terminal, after the production of an electrode plate assembly. Also, the exposed part 54*a* of the resin sheet, to which the paste has not been applied, serves as an insulating area 54*x* to be provided on a second terminal to prevent a short-circuit, after the production of an electrode plate assembly.

Although FIG. 6 illustrates electrode mixture layers in three rows and three columns, more conductive layers and more electrode mixture layers are usually formed on a larger resin sheet.

The first electrode mixture paste is prepared by mixing an active material of the first electrode, a conductive agent, a binder and the like with a dispersing medium. Thereafter, the coating film of the paste is dried, and the dried film is rolled with rollers in order to heighten the material mixture density.

After step (b), and before step (c) which will be described later, it is preferred to perform a step of forming an insulating material portion at positions covering the edges of the first electrode mixture layers or the second electrode mixture layers.

Specifically, an insulating material is applied onto the part of the edge of each first electrode mixture layer that will be adjacent to the exposed part of the conductive layer of the second current collector sheet when an electrode plate assembly is formed. It is also preferred to perform pattern application.

Other parts of the edge of the first electrode mixture layer may also be covered with an insulating material. However, care should be taken not to cover the whole exposed part of the conductive layer of the first current collector sheet.

In order to obtain an electrode plate assembly as illustrated in FIG. 6, an insulating material is applied onto at least the part of the edge of the first electrode mixture layer adjacent to the exposed part 54*a* of the resin sheet. It is noted, however, that the application of an insulating material is not always necessary, and may be performed optionally. The applied insulating resin constitutes a first insulating material portion in the electrode plate assembly.

The group of second electrodes can also be produced in the same manner as the group of first electrodes.

In the case of FIG. 6, two second electrode mixture layers 61*b* are formed on each conductive layer of the second current collector sheet. Between the two second electrode mixture layers 61*b* is a gap, where there is left an exposed part 53*b* of the conductive layer which carries no material mixture. Also, there is left an exposed part 54*b* of the resin sheet that has no conductive layer.

The exposed part 53*b* of the conductive layer, to which the second electrode mixture paste has not been applied, serves as a part 53*y* to be connected to the second terminal, after the production of the electrode plate assembly. Also, the exposed part 54*b* of the resin sheet, to which the paste has not been applied, serves as an insulating area 54*y* to be provided on the first terminal to prevent a short-circuit, after the production of the electrode plate assembly.

A group of first electrodes with first electrode mixture layers only on one side, or a group of second electrodes with second electrode mixture layers only on one side may be produced as electrode plates to be disposed on both ends of a layered body. These groups of electrodes are used so as not to expose the electrode mixture layer at the outermost layer. In this case, the conductive layer may be exposed at the outermost layer of the layered body, but the resin sheet may be exposed without forming the conductive layer.

Step (c)

Next, the group 60*a* of first electrodes and the group 60*b* of second electrodes are layered, with a separator interposed therebetween, to obtain a layered body.

The group of first electrodes and the group of second electrodes, produced by step (b), are layered with a separator interposed therebetween. At this time, they are layered such that the first electrode mixture layers 61*a* included in the group of first electrodes face the second electrode mixture layers 61*b* included in the group of second electrodes.

Both electrode plates are arranged such that the exposed parts 53*a* of the conductive layers in the group of first electrodes face the exposed parts 54*b* of the resin sheet in the group of second electrodes, and such that the exposed parts 54*a* of the resin sheet in the group of first electrodes face the exposed parts 53*b* of the conductive layers in the group of second electrodes. A pair of electrode groups, each having the electrode mixture layers only on one side, is then disposed on both outermost sides so as to sandwich the inner electrode groups, and the whole is pressed. This produces a layered body including a plurality of layered-type electrode plate assemblies.

Step (d)

The layered body is cut at the gaps between the electrode mixture layers, to obtain a plurality of layered-type electrode plate assemblies.

In the case of FIG. 6, the group of first electrodes and the group of second electrodes are cut at the gaps along the directions of arrows X and Y. The cut sections of the current collector sheets corresponding to the exposed parts of the conductive layers at the gaps serve as the connecting parts 53*x* and 53*y* to a terminal. The cut sections on the opposite side corresponding to the exposed parts of the resin sheets serve as the insulating areas 54*x* and 54*y*.

In the case of conventionally-used current collectors made of metal foil, a problem of metallic burrs arises when they are cut. Metallic burrs penetrate the separator and become a large cause of internal short-circuits. Thus, preventing the occurrence of metallic burrs becomes important, but cutting metal foil without producing metallic burrs is extremely difficult.

On the other hand, when a current collector sheet made of a resin sheet is used, metallic burrs do not occur since most of the cut section is composed of resin. Thus, the reliability of the electrochemical device can be significantly improved.

Subsequently, a step of coating the opposing first and second side faces of the layered-type electrode plate assembly with a conductive material is preferably performed to form a first terminal and a second terminal.

The first side face, where the exposed part of the conductive layer (connecting part 53*x*) of the first current collector sheet and the insulating area 54*y* of the second current collector sheet align alternately, is coated with a conductive material film, to obtain the first terminal. The metal film thus obtained is electrically connected only to the exposed part of the conductive layer of the first current collector sheet. On the first side face, when the edge of the second electrode mixture layer is coated with an insulating material, a short-circuit between the conductive material film and the second electrode is prevented in a reliable manner.

In the same manner as the above, the second side face, where the exposed part of the conductive layer (connecting part 53*y*) of the second current collector sheet and the insulating area 54*x* of the first current collector sheet alternately align, is also coated with a conductive material, to obtain the second terminal.

Although the side faces of the electrode plate assembly on which no terminal is formed may be as it is, they are preferably coated with a porous insulating material.

Figure 7:
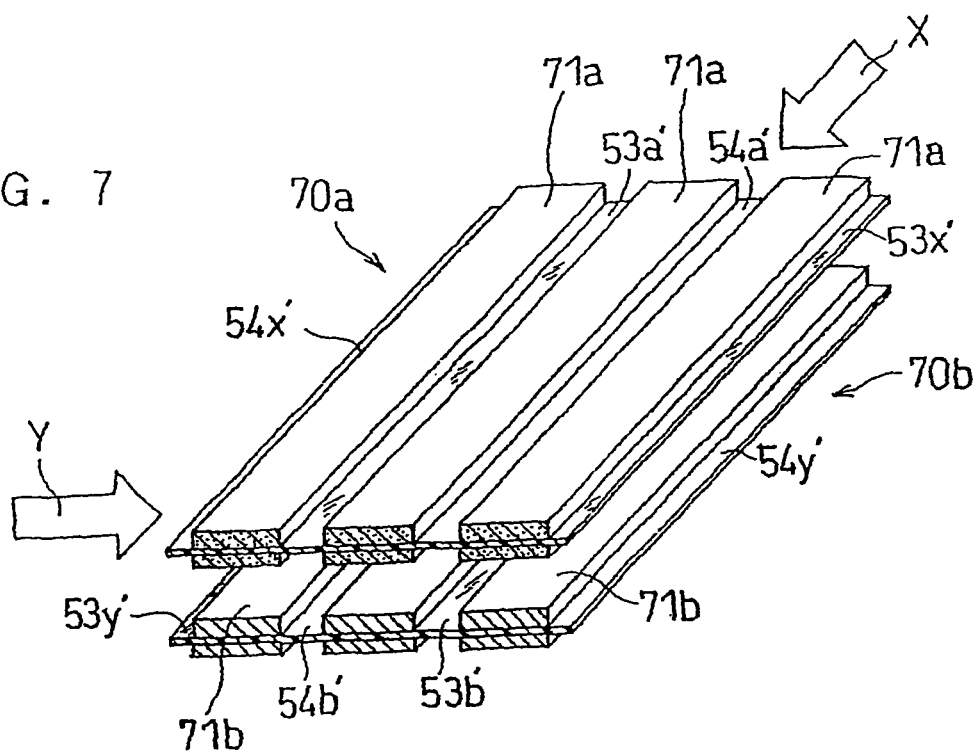
FIG. 7 is a perspective view of another group of first electrodes and another group of second electrodes.

Referring now to FIG. 7, the case of the predetermined pattern in step (a) being in the form of parallel strips (strip) is described.

First, a group 70a of first electrodes and a group 70b of second electrodes are prepared.

To obtain the group 70a of first electrodes, a plurality of strip-shaped conductive layers are formed at the same positions on both sides of a resin sheet that is large enough to provide a desired number of current collector sheets. Such conductive layers can be obtained, for example, by covering the resin sheet with a strip-shaped mask and depositing metal on the parts of the resin sheet exposed from the mask. In this case also, one strip-shaped conductive layer is formed so as to cover a current collector sheet that is as large as two strip-shaped electrode mixture layers. Specifically, in the case of using a resin sheet that is large enough to provide 2n strip-shaped current collector sheets, n strip-shaped conductive layers are formed per one side of the resin sheet.

Next, two strip-shaped first electrode mixture layers 71a are formed on each strip-shaped conductive layer. Between the two strip-shaped first electrode mixture layers 71a is a gap, where there is left an exposed part 53a' of conductive layer which carries no material mixture. The strip-shaped first electrode mixture layers 71a are prepared by applying the same first electrode mixture paste as the above to the whole surfaces of the conductive layers except the middle parts. The application method is the same as the above case. The exposed part 53a' of each conductive layer, to which no paste has been applied, serves as a part 53x' to be connected to a first terminal.

Also, to obtain the group 70b of second electrodes, a plurality of strip-shaped conductive layers are formed at the same positions on both sides of a resin sheet that is large enough to provide a desired number of current collector sheets, and two strip-shaped second electrode mixture layers 71b are formed on each conductive layer. Between the two strip-shaped second electrode mixture layers0, there is left an exposed part 53b' of the conductive layer which carries no material mixture. The exposed part 53b' of the conductive layer, to which no paste has been applied, serves as a part 53y' to be connected to a second terminal, after the production of an electrode plate assembly.

A layered body consisting of such groups of electrode plate assemblies is divided into individual layered-type electrode plate assemblies along the directions of arrows X and Y as illustrated in FIG. 7. Then, the cut sections corresponding to the exposed parts of the resin sheets constitute insulating areas 54x' and 54y'.

At the other cut sections, sections of the electrode mixture layers are exposed. It is preferred to seal the side faces of the electrode plate assembly where sections of the electrode mixture layer are exposed with a porous insulating material.

Embodiment 4

Referring now to FIGS. 8 to 16, another method for producing a plurality of layered-type electrode plate assemblies at the same time is described.

The production method of this embodiment includes the steps of:

(C) layering a group of long first electrodes and a group of long second electrodes, with a separator interposed therebetween, and feeding the resultant layered body continuously, (D) winding the layered body on a bobbin that is shaped like a flat plate, and (E) cutting the layered body wound on the bobbin to obtain a plurality of layered-type electrode plate assemblies.

It is also preferred to obtain first electrodes and second electrodes by step (A) of forming conductive layers on both sides of two insulating base material sheets, based on a predetermined pattern, to obtain a first current collector sheet and a second current collector sheet and step (B) of forming first electrode mixture layers and second electrode mixture layers on each of the conductive layers, with a gap therebetween, based on the above-mentioned pattern.

In the following, steps (A) to (E) will be explained in the order of the steps. Also, other steps will be explained, where appropriate. It is noted that other steps may be selected or combined, as appropriate, by one with ordinary skill in the art, according to the structure and use of the electrochemical device.

Step (A)

In step (A), as illustrated in FIG. 1(a), conductive layers 81a are formed on both sides of a resin sheet 80a, which is an insulating base material sheet, based on a predetermined pattern, to obtain a first current collector sheet 8a. Also, as illustrated in FIG. 2(a), conductive layers 81b are formed on both sides of a resin sheet 80b, which is an insulating base material sheet, based on a predetermined pattern, to obtain a second current collector sheet 8b.

Figure 16:
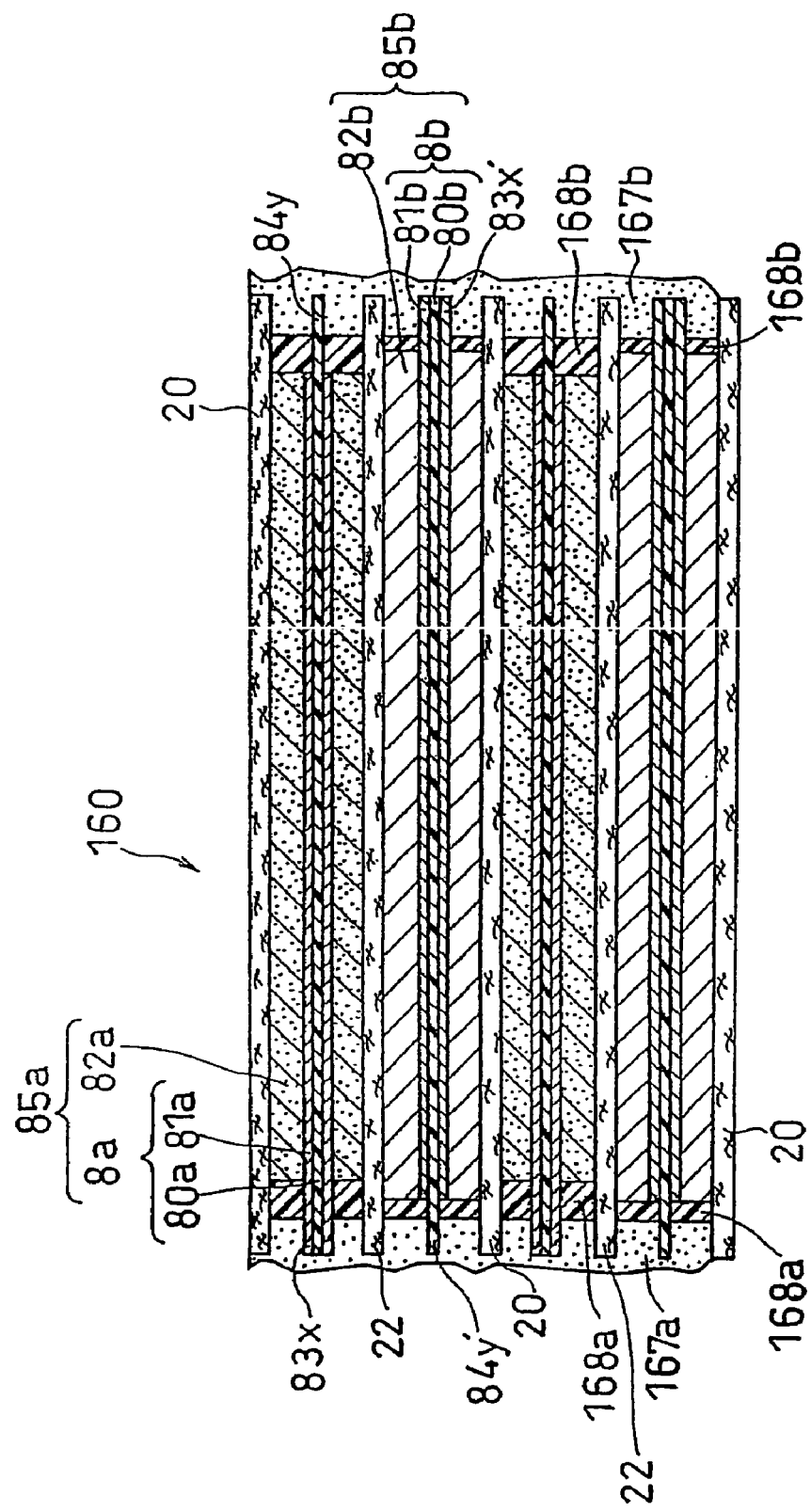
FIG. 16 is a longitudinal sectional view of a layered-type electrode plate assembly according to Embodiment 4.

At this time, the predetermined pattern is determined such that when a layered-type electrode plate assembly 160 is finally obtained, only the conductive layers 81a of the first current collector sheet 8a are exposed to a first side face and only the conductive layers 81b of the second current collector sheet 8b are exposed to a second side face, as illustrated in FIG. 16, which will be described later.

It should be noted that in FIGS. 8 and 9, the resin sheets 80a and 80b are illustrated as sheets of a certain length for convenience sake, but they are actually very long. If they are very long, they can be continuously fed, for example, from a hoop-like roll. Therefore, metal can be continuously vapor-deposited on the sheets, thereby resulting in an improvement in productivity.

In this case also, at least one strip-shaped conductive layer is formed so as to cover two strip-shaped current collector sheets. The formation of the conductive layer may be performed in the same manner as in Embodiment 3. Also, the predetermined pattern may be adjusted as appropriate, depending on the number of layered-type electrode plate assemblies to be produced, as described above.

Step (B)

Next, as illustrated in FIG. 1(b) and FIG. 2(b), a plurality of first electrode mixture layers 82a and a plurality of second electrode mixture layers 82b are formed on each of the conductive layers of the first current collector sheet 8a and the second current collector sheet 8b, respectively, in the shape of parallel strips, with gaps 83a and 83b therebetween, to obtain a group 14 of first electrodes and a group 15 of second electrodes.

The exposed parts 83a and 83b of the conductive layers, where there is no electrode mixture layer, serve as a part 83x to be connected to a first terminal and a part 83x' to be connected to a second terminal, respectively, after the production of an electrode plate assembly. Also, exposed parts 84a and 84b of the resin sheets serve as an insulating area 84y and an insulating area 84y' provided on the first terminal and the second terminal, respectively, for preventing a short-circuit, after the production of the electrode plate assembly (See FIG. 16).

Since the current collector sheets are very long, an electrode mixture can be applied continuously from their edges, so that it is possible to improve productivity. The current collector sheets may be fed in the form of a hoop.

It is also possible to use a group of first electrodes having first electrode mixture layers only on one side, or a group of second electrodes having second electrode mixture layers only on one side.

Figure 10:
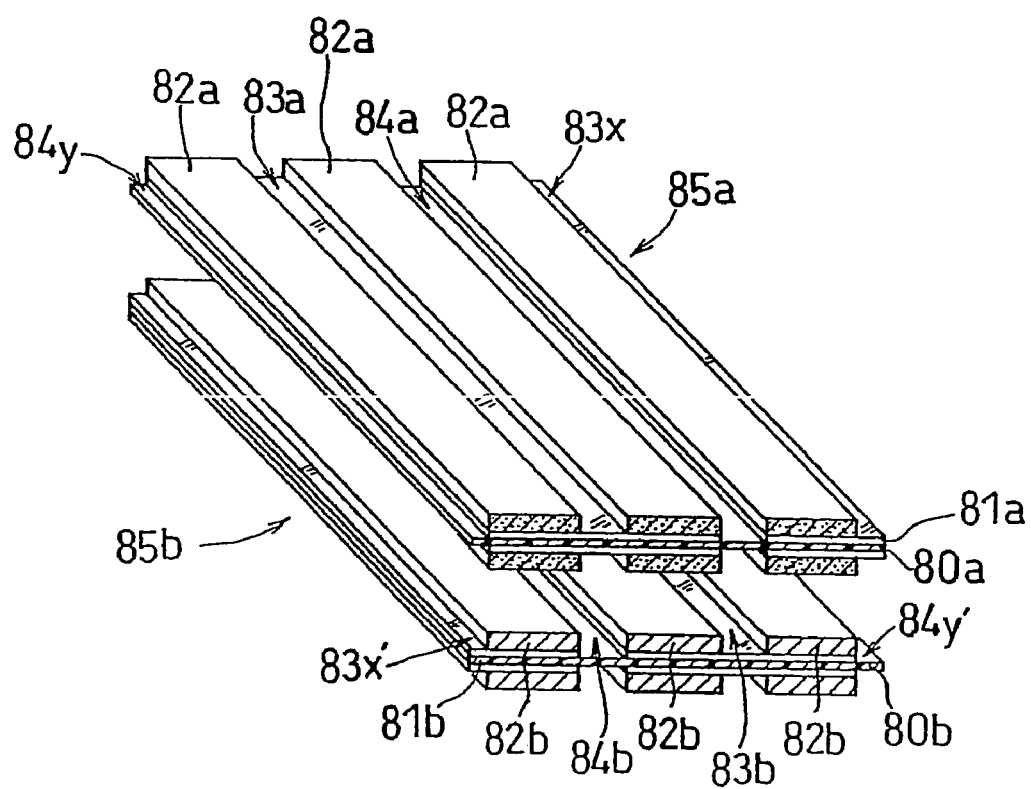
FIG. 10 is a diagram more specifically illustrating the group of first electrodes and the group of second electrodes as illustrated in FIG. 1(b) and FIG. 2(b)

FIG. 10 is a diagram that more specifically illustrates the group 85a of first electrodes and the group 85b of second electrodes of FIG. 8(b) and FIG. 9(b). In the case of FIG. 10, three strip-shaped first electrode mixture layers 82a and three strip-shaped second electrode mixture layers 82b are formed on the strip-shaped conductive layers 81a and 81b produced in step (A), respectively.

Prior to step (C), an insulating material may be applied onto the edges of the first electrode mixture layers 82a and the second electrode mixture layers 82b, to form insulating material portions 168a and 168b (See FIG. 16). This makes it possible to effectively prevent the first electrode and the second electrode from short-circuiting on the side faces of the resultant electrode plate assembly. It should be noted that in FIGS. 8 to 10, the insulating material portions are omitted. The application of the insulating material is not always necessary, but may be performed optionally.

Step (C)

Figure 11:
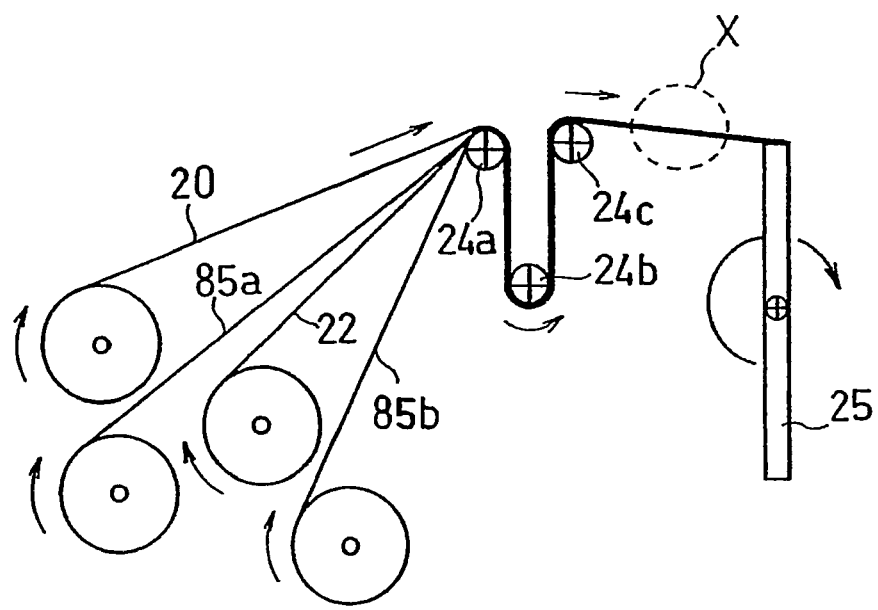
FIG. 11 is an explanatory diagram of the step of layering a long group of first electrodes and a long group of second electrodes with a separator interposed therebetween and feeding the resultant layered body continuously.

Next, the long group of first electrodes and the long group of second electrodes, thus obtained, are layered with a separator interposed therebetween, while being continuously fed as a layered body. FIG. 11 is an explanatory diagram of this step.

A separator 20, the group 85a of first electrodes, a separator 22, and the group 85b of second electrodes are fed, for example, from a hoop-like roll. While being layered via rollers 24a, 24b and 24c, they are fed continuously. At this time, they are layered such that the first electrode mixture layers 82a of the group 85a of first electrodes and the second electrode mixture layers 82b of the group 85b of second electrodes face one another. Also, the groups of both electrodes are arranged such that the exposed parts 83a of the conductive layers of the group 85a of first electrodes face the exposed parts 84b of the resin sheet of the group 85b of second electrodes, and that the exposed parts 84a of the resin sheet of the group 85a of first electrodes face the exposed parts 83b of the conductive layers of the group 85b of second electrodes.

Although the method of feeding the separators, the group of first electrodes and the group of second electrodes is not particularly limited, the structure of the layered-type electrode plate assembly to be produced should be considered. It is preferred to feed them such that they are easily wound by a bobbin 25 that is shaped like a flat plate in step (D).

Figure 12:
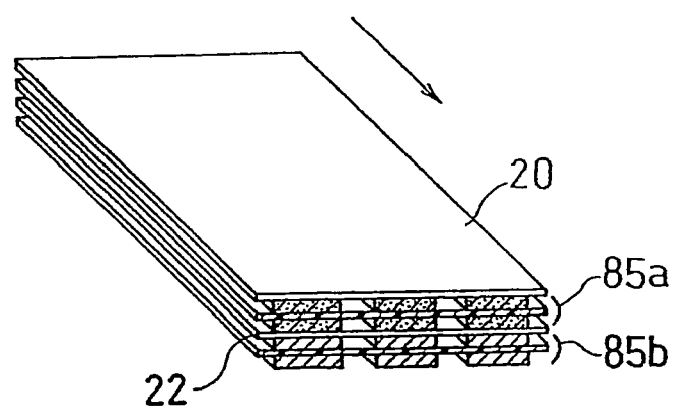
FIG. 12 is an enlarged diagram of the portion of FIG. 4 surrounded by the broken line X.

FIG. 12 is an enlarged view of the portion of FIG. 11 encircled by the broken line X. The layered body fed to the flat-plate-shaped bobbin 25 consists of the separator 20, the group 85a of first electrodes, the separator 22, and the group 85b of second electrodes, and the first electrode mixture layers and the second electrode mixture layers have a mutually opposing positional relation.

Step (D)

Figure 13:
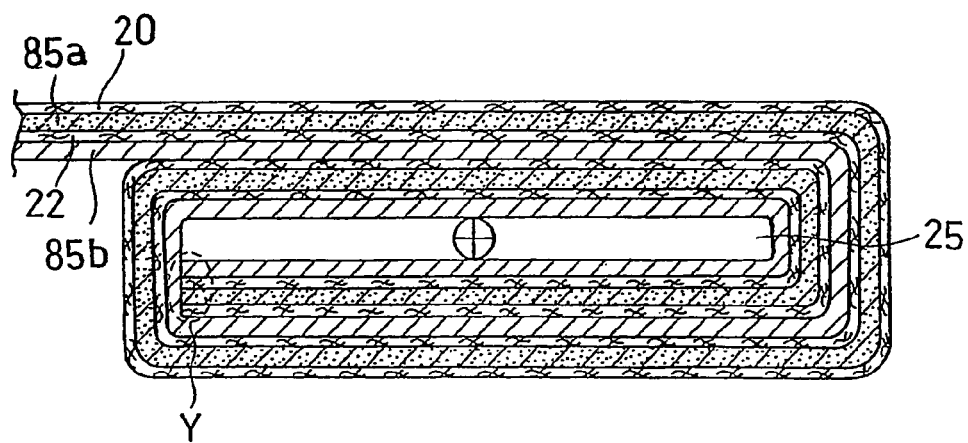
FIG. 13 is a diagram illustrating a layered body, consisting of a separator, a group of first electrodes, a separator, and a group of second electrodes, wound on a bobbin.

As illustrated in FIG. 13, the layered body fed in step (C) is wound on the flat-plate-shaped bobbin 25, as mentioned above. At this time, the layered body is wound on the bobbin 25 in the direction of length of the first electrode mixture layers and the second electrode mixture layers (the arrow in FIG. 12).

It is preferred that the tip of the layered body that is wound first, i.e., the portion surrounded by the broken line Y in FIG. 13, be caused to protrude slightly outward from the end of the bobbin 25 (left side in FIG. 13). This is because, as explained in step (E), the folded parts at both ends of the layered body wound on the bobbin 25 are cut off and discarded. This can prevent the first electrode and the second electrode from short-circuiting in the portion Y.

Step (E)

Figure 14:
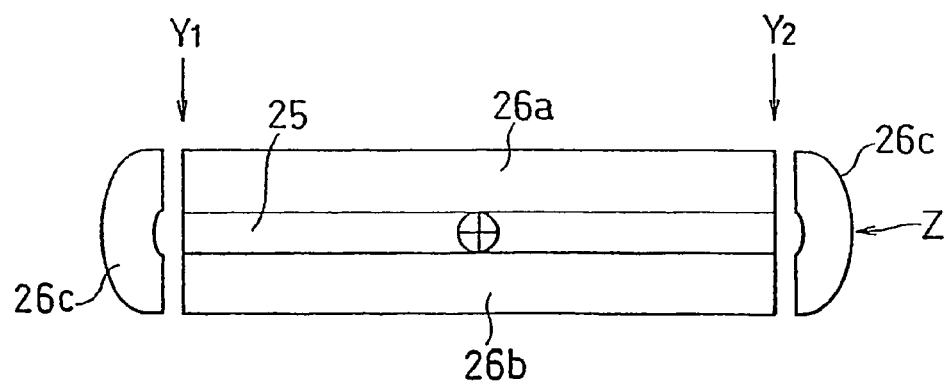
FIG. 14 is an explanatory diagram of the step of cutting both ends of the layered body wound on the bobbin.

Subsequently, the layered body wound on the bobbin is cut to obtain a plurality of layered-type electrode plate assemblies. As illustrated in FIG. 14, since layered portions 26a and 26b of the layered body wound on the bobbin 25 have a regularly layered structure, they can be used effectively. However, at folded portions 26c, which are opposite ends to be cut along arrows $Y_1$ and $Y_2$, the respective constituents are curved or folded, so it is preferred to cut them and discard them. It should be noted that in FIG. 14, the details of the layering structure are omitted.

Figure 15:
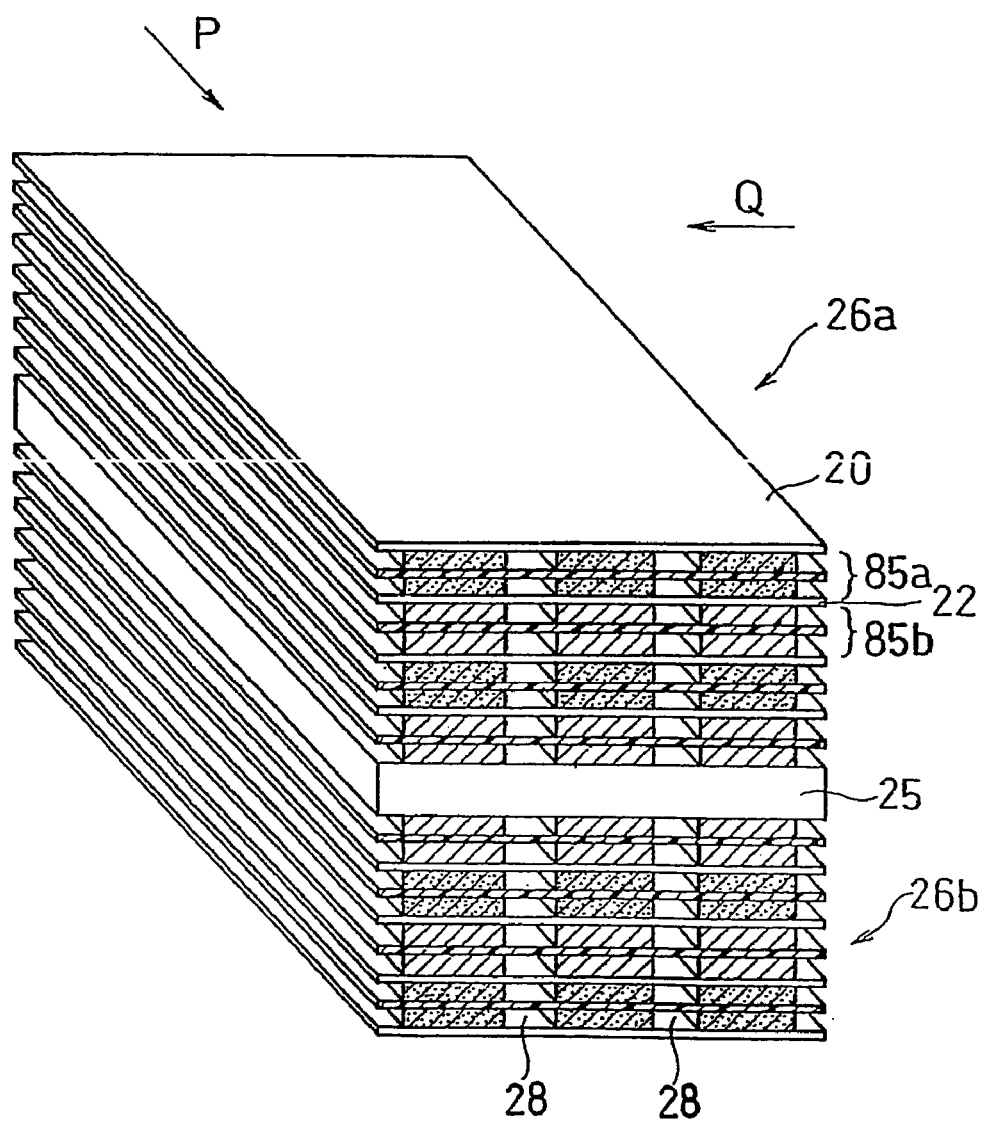
FIG. 15 is a diagram illustrating the layered body after the cutting of both ends thereof.

FIG. 15 illustrates the appearance of the layered portions 26a and 26b. The layered portions 26a and 26b are provided on the bobbin 25. As illustrated in FIG. 15, this layered body has gaps 28 that align at the same positions in the layering direction. At the gaps 28, the layered body is cut in the direction of length of the electrode mixture layers (P direction), to obtain a precursor of a layered-type electrode plate assembly 160 that is shown in FIG. 16.

Also, depending on the dimensions and capacity of a desired layered-type electrode plate assembly, the layered body may be cut at a predetermined position in the Q direction shown in FIG. 15. Although this cutting step may be performed after the layered portions 26a and 26b are separated from the bobbin 25, it may also be done on the bobbin 25.

The layered portions 26a and 26b are groups each including a plurality of layered-type electrode plate assemblies. These groups are divided into individual layered-type electrode plate assemblies. Then, the cut section of the current collector sheet corresponding to the exposed part of the conductive layer at the gap serves as the connecting part to a terminal, whereas the cut section on the opposite side corresponding to the exposed part of the resin sheet serves as the insulating area.

Step (F)

Following the cutting step, it is preferred to perform a step of coating the opposite first and second side faces of the layered-type electrode plate assembly with a conductive material to form a first terminal 167a and a second terminal 167b, as illustrated in FIG. 16. Although the side faces of the electrode plate assembly on which no terminal is formed may be as it is, they are preferably coated with a porous insulating material.

It should be noted that although the above description has been made on the case of the predetermined pattern being in the form of strips, the above method is applicable to the matrix pattern as described in Embodiment 3.

Embodiment 5

Figure 17:
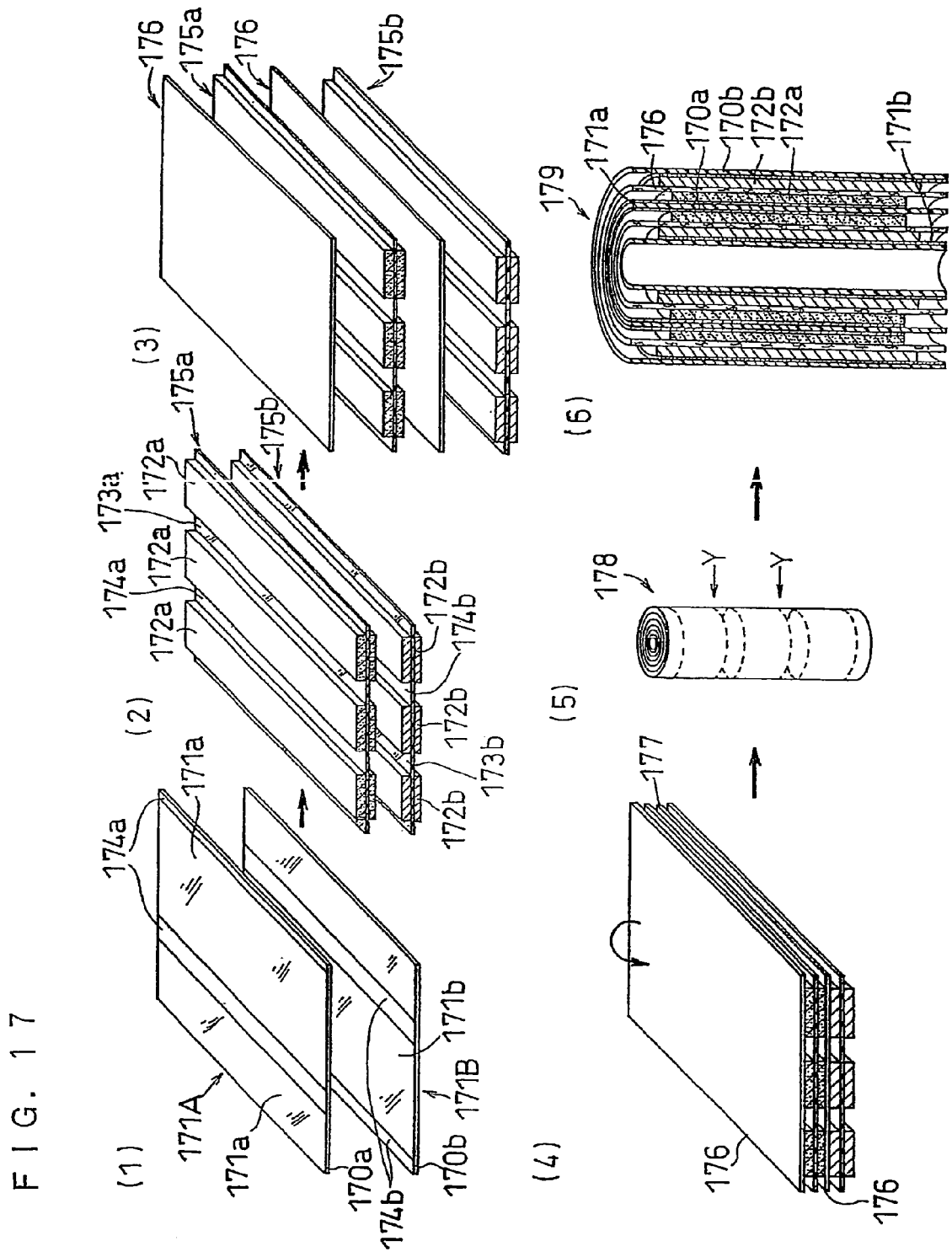
FIG. 17 is a flow chart illustrating the production steps of a wound-type electrode plate assembly according to Embodiment 5.

Referring now to FIG. 17, an exemplary method for producing a plurality of wound-type electrode plate assemblies at the same time is described.

The production method according to this embodiment includes the steps of:

(a) forming conductive layers on both sides of two insulating base material sheets, to form a first current collector sheet and a second current collector sheet, (b) forming a plurality of first electrode mixture layers and a plurality of second electrode mixture layers on each of the conductive layers of the first current collector sheet and the second current collector sheet, respectively, in the form of parallel strips, with a gap therebetween, to obtain a group of first electrodes and a group of second electrodes, (c) feeding the group of first electrodes and the group of second electrodes, with a separator interposed therebetween, in the direction of length of the first electrode mixture layers and the second electrode mixture layers, and winding them concentrically, to obtain a wound body, and (d) cutting the wound body at said gap, to obtain a plurality of wound-type electrode plate assemblies.

In the following, steps (a) to (d) will be explained in the order of the steps. Also, other steps will be explained, where appropriate. It is noted that other steps may be selected or combined, as appropriate, by one with ordinary skill in the art, according to the structure and use of the electrochemical device. Further, the method for producing wound-type electrode plate assemblies is not to be limited to the one as described below.

Figure 18:
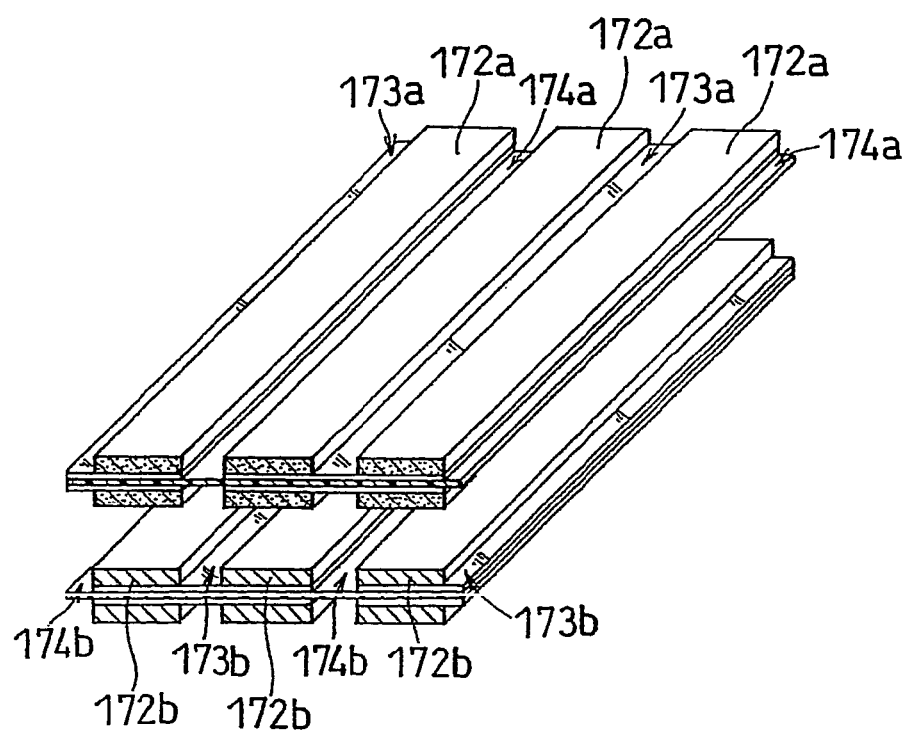
FIG. 18 is a diagram more specifically illustrating the group of first electrodes and the group of second electrodes as illustrated in FIG. 17(2)

FIG. 17 is a flow chart showing the production method of this embodiment. FIG. 18 is a schematic perspective view of a group of first electrodes, a separator, and a group of second electrodes, used in this production method. FIG. 4 corresponds to a sectional view of an electrochemical device obtained by the production method of this embodiment.

Step (a)

As illustrated in FIG. 17(1), first, conductive layers 171a and 171b are formed on both sides of resin sheets 170a and 170b, respectively, based on a predetermined pattern, to obtain a first current collector sheet 171A and a second current collector sheet 171B.

The production method of the first current collector sheet 171A and the second current collector sheet 171B is the same as that described in Embodiments 3 and 4.

The predetermined pattern may be determined such that only the conductive layers of the first current collector sheet are exposed to a first bottom face, and that only the conductive layers of the second current collector sheet are exposed to a second bottom face, in FIG. 17(6). Therein, the conductive layers are formed so as to leave exposed parts 174a and 174b of the resin sheets.

It should be noted that in FIG. 17, the current collector sheets 171A and 171B are illustrated as having a certain length for convenience sake, but they are actually very long. If they are very long, they can be continuously fed, for example, from a hoop-like roll.

Step (b)

Next, as illustrated in FIG. 17(2), a plurality of first electrode mixture layers 172a and a plurality of second electrode mixture layers 172b are formed on each of the conductive layers of the first current collector sheet 171A and the second current collector sheet 171B, respectively, in the form of parallel strips, with gaps 173a and 173b interposed therebetween, to obtain a group 175a of first electrodes and a group 175b of second electrodes.

Therein, it is preferred to apply an insulating material onto the edges of the first electrode mixture layers 172a and 172b to form insulating material portions. It should be noted that in FIGS. 17 and 18, the insulating material portions are not illustrated. This makes it possible to prevent the first electrode and the second electrode from short-circuiting in coating the bottom faces of the resultant wound-type electrode plate assembly with a conductive material. The formation of the insulating material portions may be done in the same manner as in Embodiments 3 and 4.

Step (c)

Subsequently, as illustrated in FIG. 17(3), the group 175a of first electrodes and the group 175b of second electrode are layered with a separator 176 interposed therebetween. A layered body 177 is then wound in the direction of an arrow X, as illustrated in FIG. 17(4). This produces a wound body 178 as illustrated in FIG. 17(5). The wound body 178 includes wound-type electrode plate assemblies, the number of which corresponds to the number of the first electrode mixture layers 172a or the second electrode mixture layers 172b. The respective electrode plate assemblies alternately align in opposite orientations.

The use of the group of first electrodes, the separators and the group of second electrodes, which are very long, makes it possible to continuously produce a plurality of wound bodies 178, by continuously feeding, layering, and winding them and cutting them at suitable positions.

Step (d)

The wound body 178 is cut at the position where the gaps 173a and 174b align and at the position where the gaps 173b and 174a align, as shown by arrows Y. This produces a plurality of wound-type electrode plate assemblies 179 as shown by FIG. 17(6). In FIG. 17(6), the first bottom face (upper side) of the wound-type electrode plate assembly 179 is provided with the exposed part of the conductive layer of the first current collector sheet, while the second bottom face (lower side) is provided with the exposed part of the conductive layer of the second current collector sheet. By coating these bottom faces with a conductive material, a first terminal and a second terminal can be formed.

Embodiment 6

Figure 19:
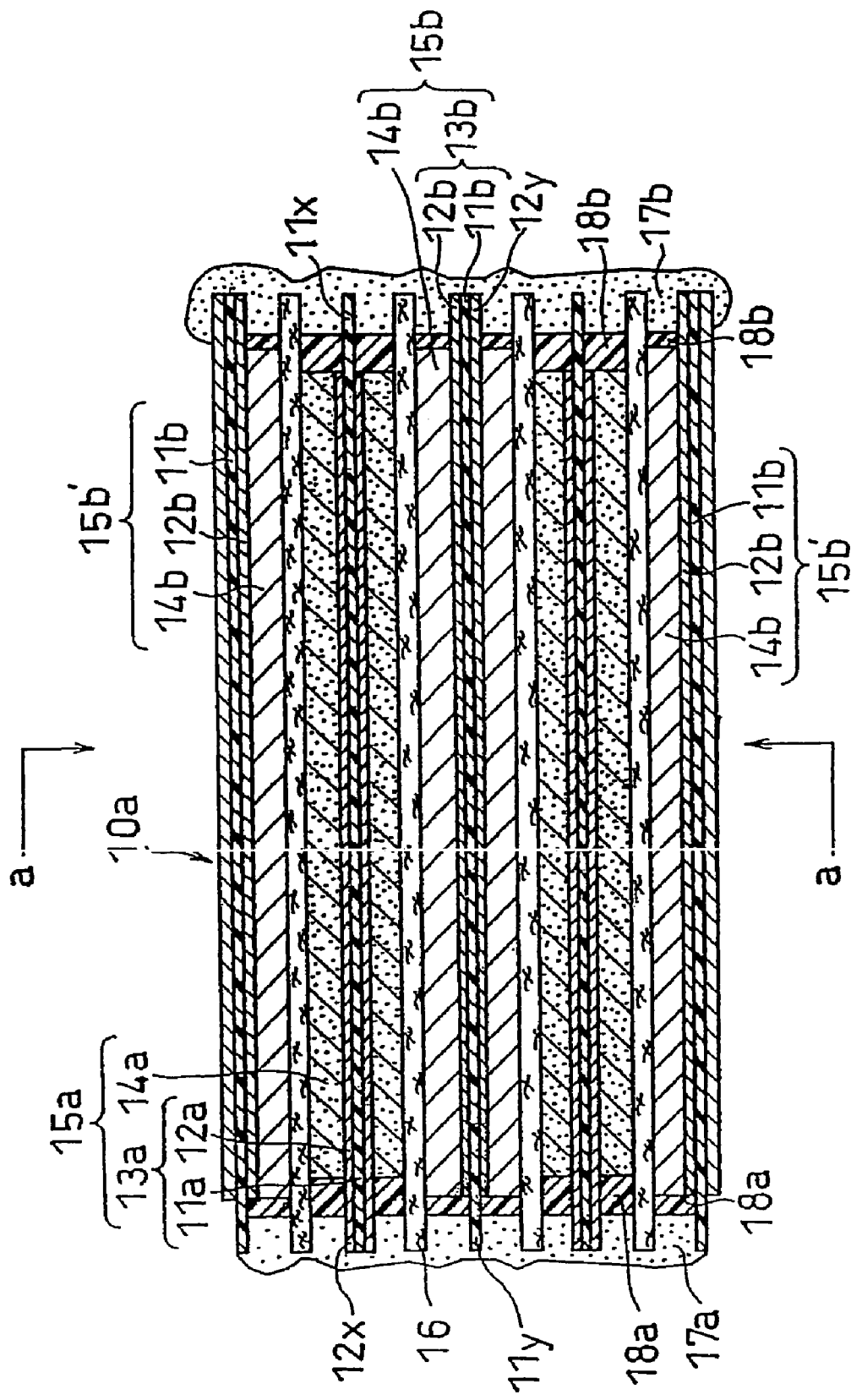
FIG. 19 is a longitudinal sectional view of a layered-type electrode plate assembly according to Embodiment 6.
Figure 20:
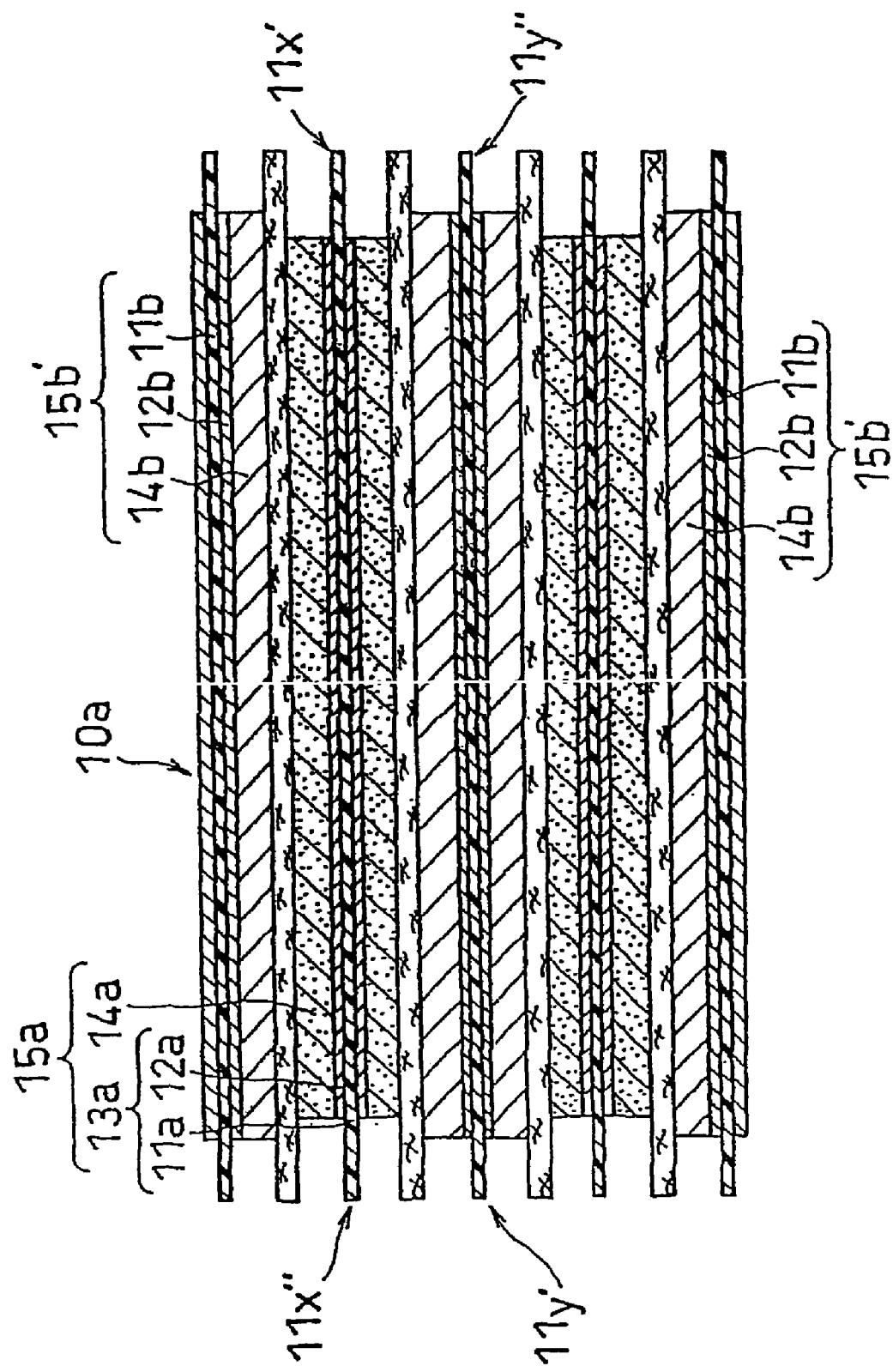
FIG. 20 is an exemplary a-a line sectional view of the electrode plate assembly of FIG. 19.

FIG. 19 is a longitudinal sectional view of a layered-type electrode plate assembly 10a according to this embodiment. FIG. 20 is an a-a line sectional view of the electrode plate assembly 10a.

Therein, the outermost two second electrodes 15b' have a conductive layer 12b on both sides of a resin sheet 11b, but only the conductive layer 12b facing the inner electrode carries an electrode mixture layer. The outer conductive layer 12b carries no electrode mixture layer, so the conductive layer 12b is exposed. If this part is connected to an edge 12y of another conductive layer, a second terminal is extended, so that current can be collected not only from the side face of the electrode plate assembly but also from the upper and lower faces.

The electrode plate assembly 10a has the same structure as that of the electrode plate assembly 10 as described in Embodiment 1, except for the outermost two electrodes.

Figure 21:
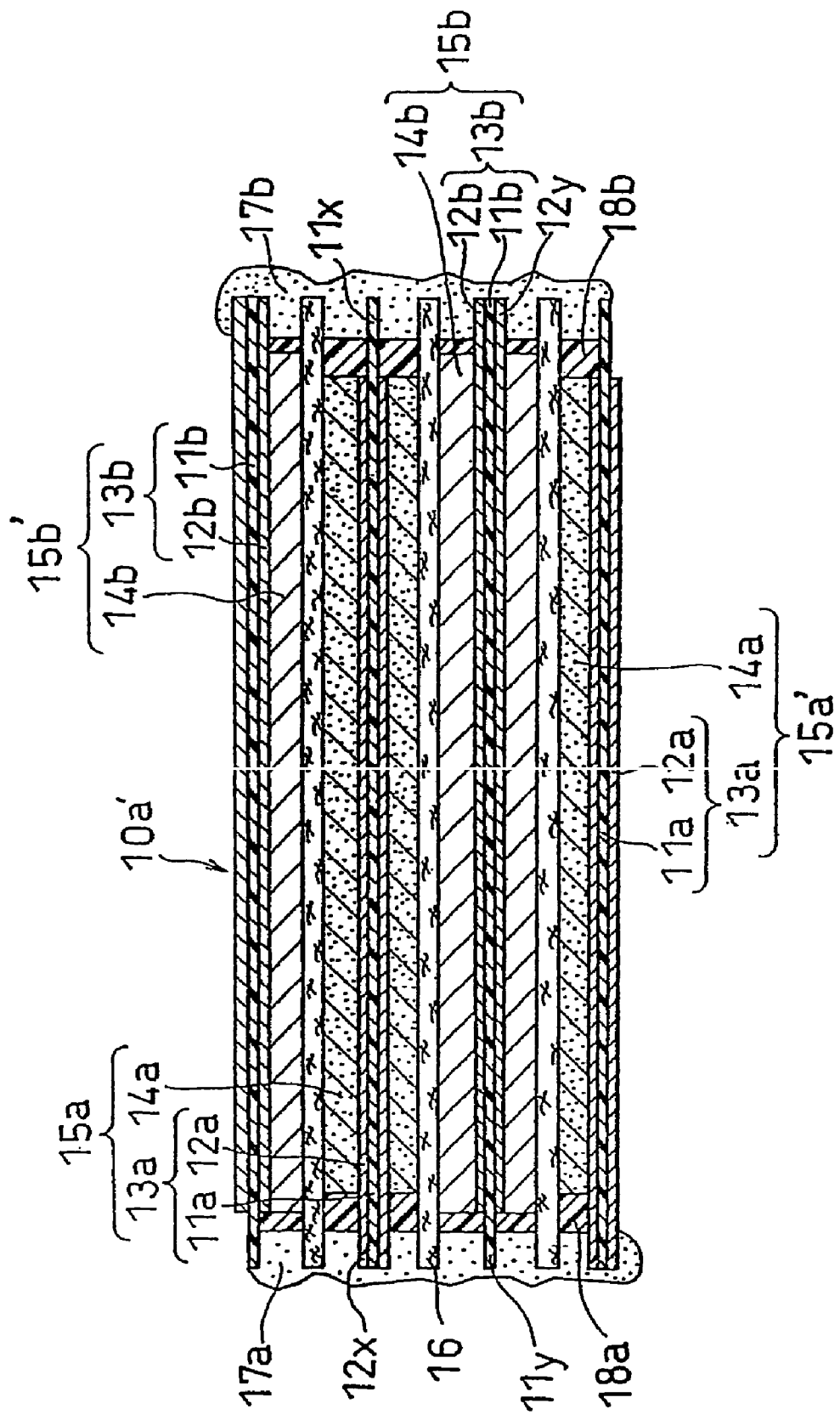
FIG. 21 is a longitudinal sectional view of another layered-type electrode plate assembly according to Embodiment 6.

As in an electrode plate assembly 10a' illustrated in FIG. 21, the outermost two electrodes may be electrodes having different polarities. Although the electrode plate assembly 10a' has substantially the same structure as that of the aforementioned electrode plate assembly 10a, one of the outermost electrodes is a first electrode 15a' in which a conductive layer 12a is provided on both sides but only the conductive layer 12a facing the inner electrode carries a first electrode mixture layer 14a.

If the conductive layer 12a carrying no first electrode mixture layer is connected to a first terminal, the first terminal is extended, and if the conductive layer 12b carrying no second electrode mixture layer is connected to the second terminal, the second terminal is extended.

Embodiment 7

Figure 22:
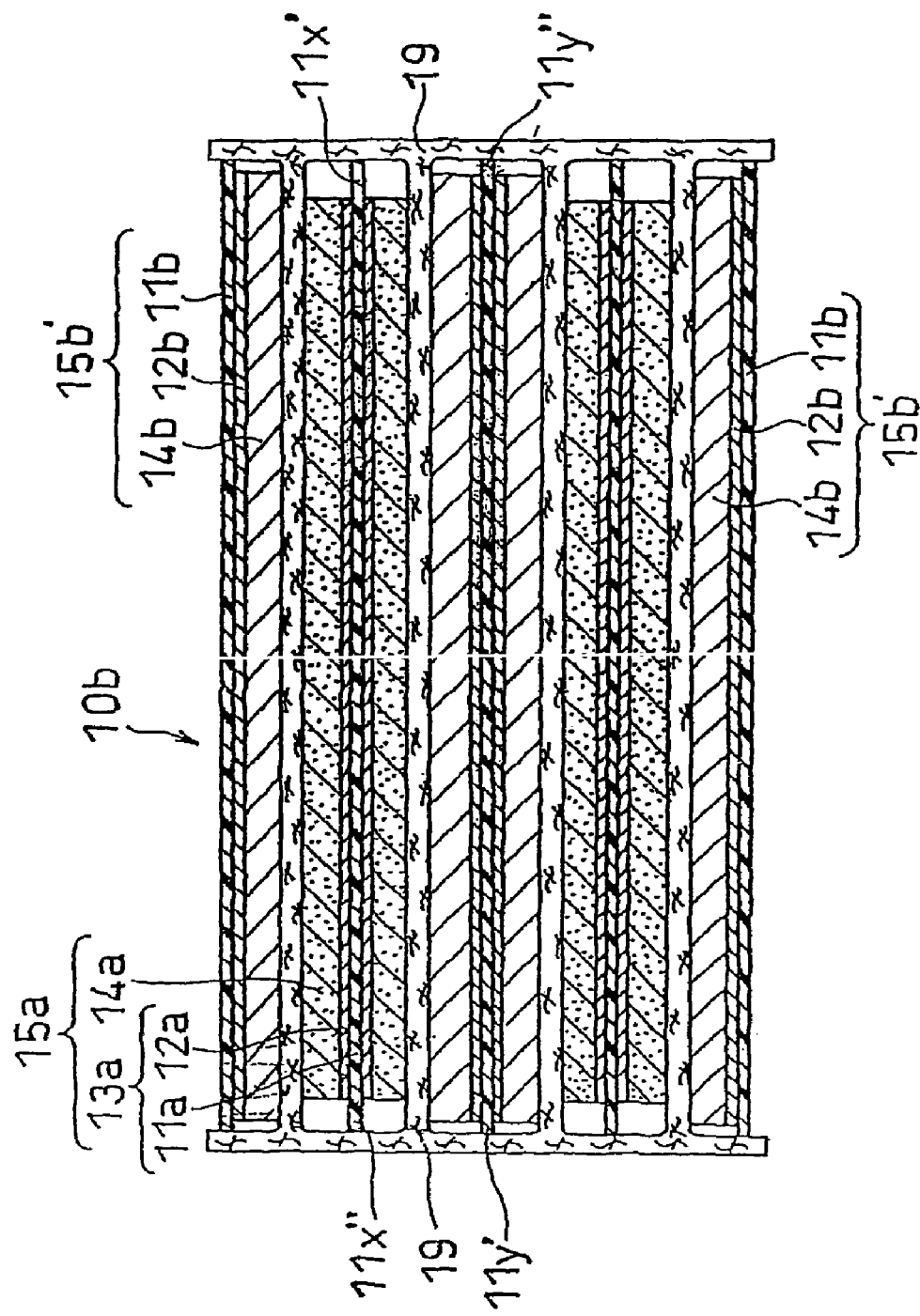
FIG. 22 is an a-a line sectional view of the electrode plate assembly of FIG. 1 according to Embodiment 7.

FIG. 22 shows another exemplary a-a line sectional view of the layered-type electrode plate assembly 10 according to Embodiment 1.

On a third side face (left side in FIG. 22) of an electrode plate assembly 10b, insulating areas (edges 11x'') of first current collector sheets 13a and insulating areas (edges 11y') of second current collector sheets 13b are provided so as to be flush with one another. On a fourth side face (right side in FIG. 22), insulating areas (edges 11x') of the first current collector sheets 13a and insulating areas (edges 11y'') of the second current collector sheets 13b are provided so as to be flush with one another.

As described above, such a structure can effectively prevent the first electrode and the second electrode from short-circuiting. However, in order to prevent a short-circuit in a reliable manner, it is effective to cover the third side face and the fourth side face with an electronically insulating material. Also, in order to improve the reliability of the electrochemical device and prevent the manufacturing process from getting complicated, it is extremely effective to cover the third side face and the fourth side face of the electrode plate assembly with an electronically insulating material. Further, in order to easily perform the step of impregnating the electrode plate assembly with an electrolyte, the electronically insulating material needs to be porous.

Therefore, in the electrode plate assembly 10b, the third side face and the fourth side face are covered with an electronically insulating porous material 19. Also, in FIG. 22, the porous material 19 is welded to the edges of the separators. This structure can dramatically improve the reliability of the electrochemical device.

For example, the porous material and the separators can be welded together by pressing a heated jig on the side face covered with the porous material. When the edge of the separator and the porous material are welded together, it is preferred to use, as the porous material, the same material as that of the separator. The use of the same material makes it possible to easily weld the edge of the separator and the porous material together, while providing high welding strength.

As the porous material, polyolefin, polyalkylene oxide, fluoropolymer, ceramics or the like can be used. Therein, exemplary polyolefin includes polyethylene and polypropylene; exemplary polyalkylene oxide includes polyethylene oxide and polypropylene oxide; exemplary fluoropolymer includes polyvinylidene fluoride and a copolymer of vinylidene fluoride and hexafluoropropylene; and exemplary ceramics includes inorganic filler and glass fiber. These materials may be used singly or in combination of two or more of them.

Also, a film-shaped member comprising such material may be used, or a coating film of a raw material paste including such material may also be used. Such raw material paste can be used in combination with a dispersing medium in order to impart suitable fluidity. As the porous material, a polymer electrolyte conventionally used in polymer batteries may also be used. A polymer electrolyte can be prepared, for example, by mixing an electrolyte and a matrix component. As the matrix component, the above-mentioned polyalkylene oxide, fluoropolymer or the like can be used.

Figure 23:
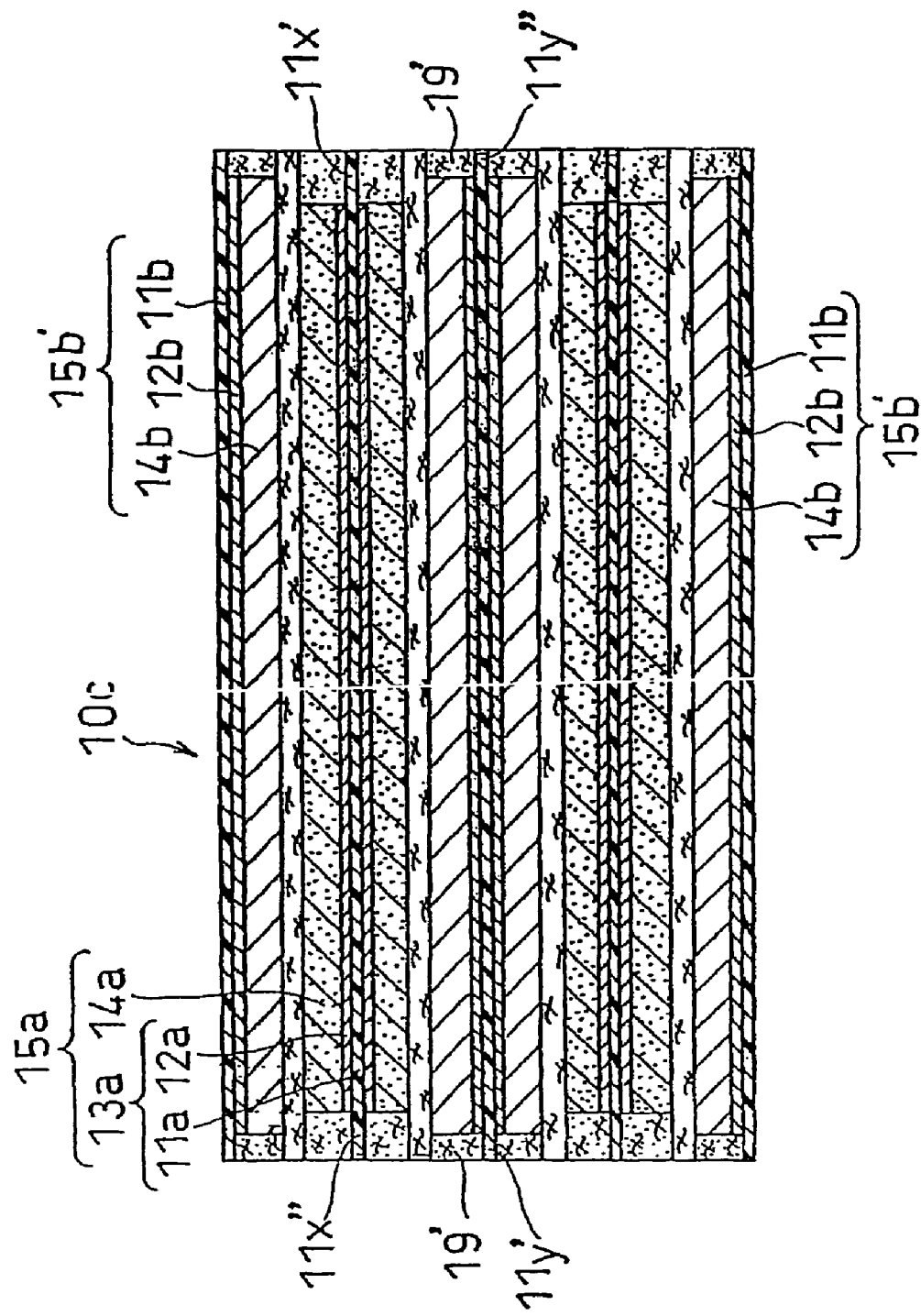
FIG. 23 is another a-a line sectional view of the electrode plate assembly of FIG. 1 according to Embodiment 7.

FIG. 23 shows still another a-a line sectional view of the layered-type electrode plate assembly 10 according to Embodiment 1.

In FIG. 23, a third side face and a fourth side face of an electrode plate assembly 10c are covered with a coating film 19' of a raw material paste of a porous material. Since a raw material paste of a porous material has fluidity, it can be easily applied onto the side faces of an electrode plate assembly, using a common application device. Also, by simply bringing a side face of an electrode plate assembly into contact with the surface of a raw material paste, the side face can be covered with the raw material paste. By volatilizing the unnecessary dispersing medium from the raw material paste covering the side face of the electrode plate assembly, a coating film closely adhering to the side face of the electrode plate assembly can be obtained.

In FIGS. 22 and 23, the edges of the first electrode mixture layers 14a and the second electrode mixture layers 14b are recessed from the third side face and the fourth side face; however, the edge of each electrode mixture layer may be provided so as to be flush with the edge of the insulating area of each current collector sheet and the edge of each separator. Even in such a structure, since the third side face and the fourth side face are covered with the electronically insulating porous material, it is possible to sufficiently prevent a short-circuit. Particularly when a porous material is welded to the edges of the separators provided on the side face of the electrode plate assembly and when a coating film of a porous material is formed so as to closely adhere to the side face of the electrode plate assembly, the risk of a short-circuit decreases significantly.

Embodiment 8

Referring now to FIGS. 24 to 33, simple packages accommodating the above-described electrode plate assembly are described.

Figure 24:
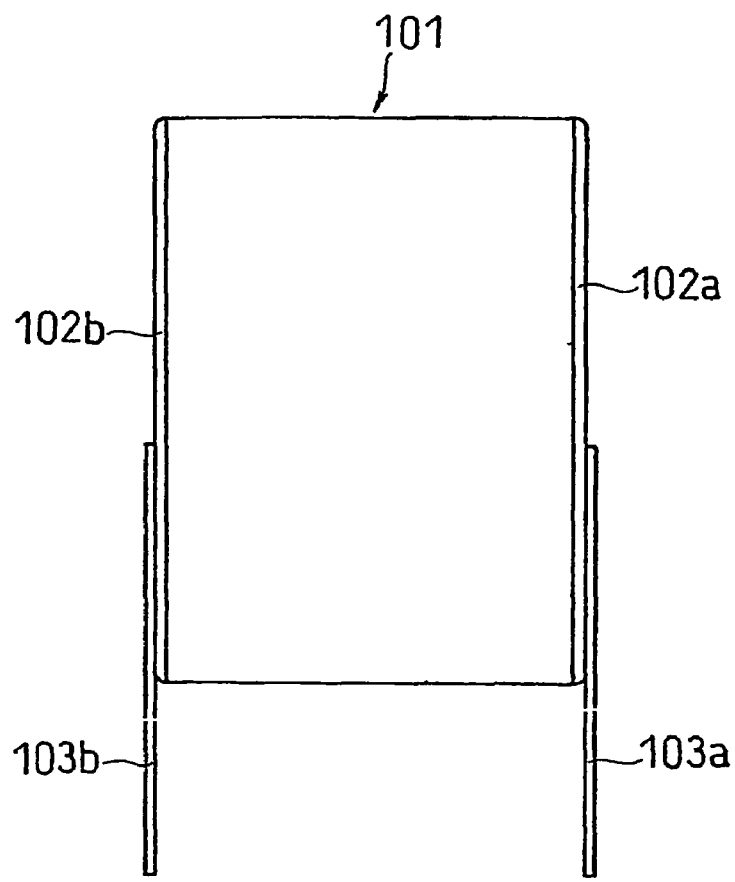
FIG. 24 is an exemplary top view of an electrode plate assembly before it is accommodated in a case.
Figure 25:
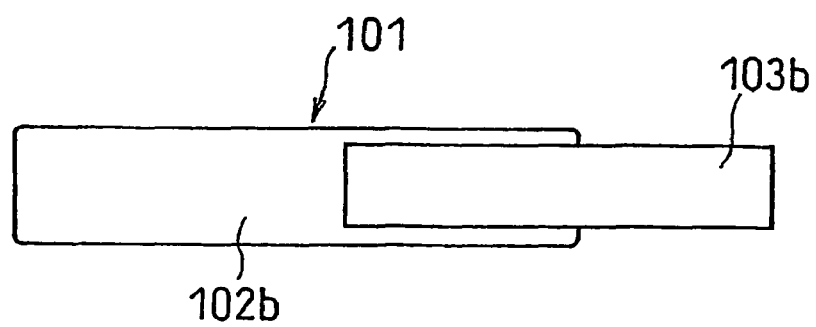
FIG. 25 is an exemplary side view of an electrode plate assembly before it is accommodated in a case.

FIG. 24 is a top view of an electrode plate assembly 101 before being accommodated in a case. FIG. 25 is a side view of the electrode plate assembly seen from the left side of FIG. 24. As illustrated in these figures, before it is accommodated in the case, a first lead piece 103a and a second lead piece 103b are connected to a first terminal 102a and a second terminal 102b of the electrode plate assembly 101, respectively. When the first terminal or the second terminal is the positive electrode terminal, the terminal is preferably connected with a lead piece made of aluminum or the like. Also, when the first terminal or the second terminal is the negative electrode terminal, the terminal is preferably connected with a lead piece made of copper, Ni or the like. Each lead piece can be joined to each terminal by various welding processes.

Figure 26:
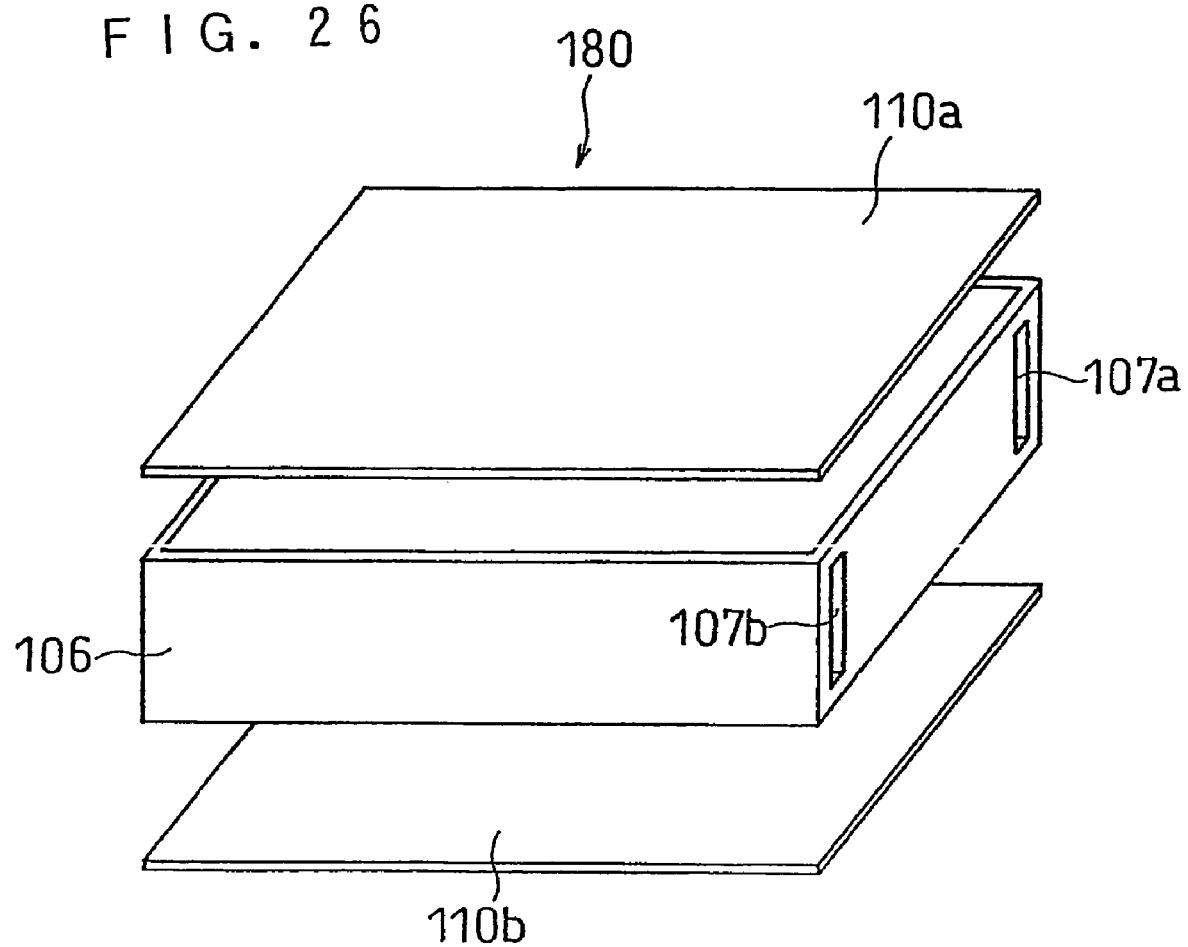
FIG. 26 is an exemplary perspective view of a case which consists of three members for accommodating an electrode plate assembly.

In a preferable first mode of the battery of the present invention, the electrode plate assembly is accommodated in a case 180 consisting of three members as illustrated in FIG. 26.

The case 180 is composed of a flame 106, a flat first sheet 110a and a flat second sheet 110b. The flame 106 surrounds the electrode plate assembly 101, being in contact with a first side face having the first terminal 102a and a second side face having the second terminal 102b. Two flat sheets cover two openings of the flame 106, being in contact with the upper face and the lower face of the electrode plate assembly.

The edges of the two sheets 110a and 110b are joined to the two opening edges of the flame 106, respectively. The joining of the flame 106 with the edges of two sheets 110a and 110b may be done by any method.

The flame 106 is provided with a first slit 107a and a second slit 107b. Through these slits, the first lead piece 103a and the second lead piece 103b are drawn out of the case. After each lead piece has been drawn out, the gap of each slit is sealed with a sealing material.

Figure 27:
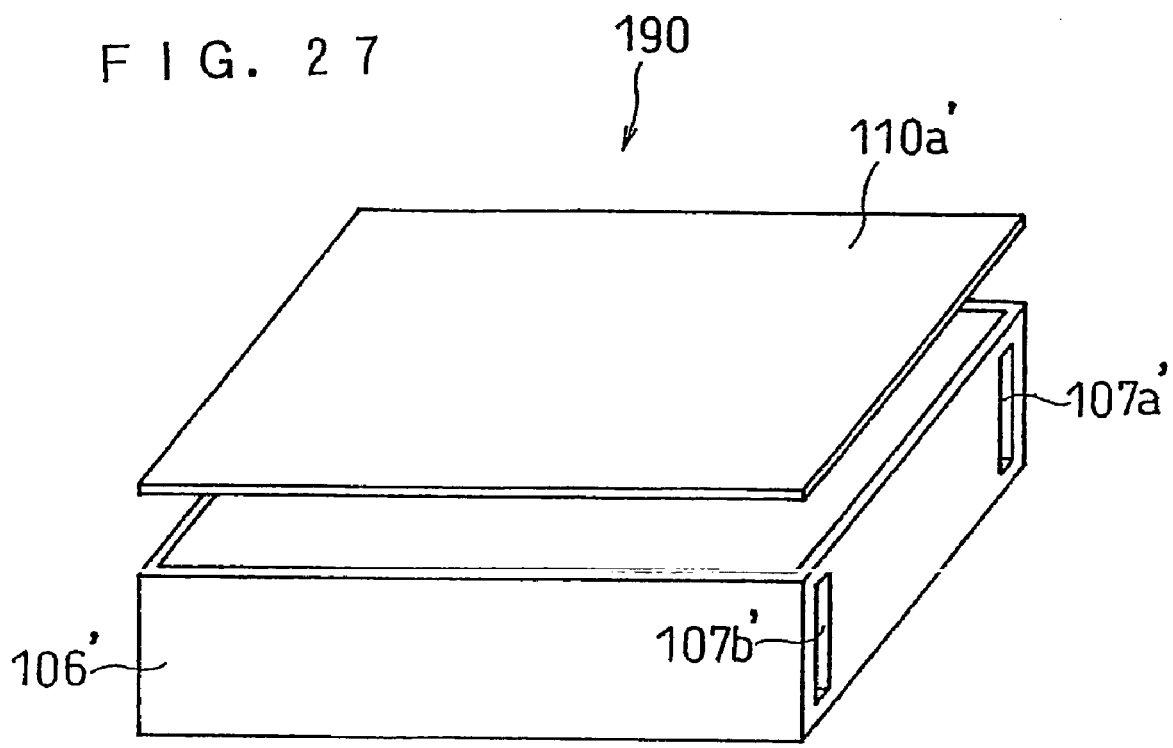
FIG. 27 is another exemplary perspective view of a case which consists of two members for accommodating an electrode plate assembly.

In a preferable second mode of the battery of the present invention, the electrode plate assembly is accommodated in a case 190 consisting of two members as illustrated in FIG. 27.

The case 190 is composed of a container 106' with a bottom, and a flat sheet 110a'. The container 106' accommodates the electrode plate assembly 101. Also, the container 106' has side walls in contact with the first side face having the first terminal 102a and the second side face having the second terminal 102b, and a bottom in contact with one of the upper face and the lower face of the electrode plate assembly 101. The flat sheet 110a' covers the opening of the container 106', being in contact with the other of the upper face and the lower face of the electrode plate assembly 101.

The edge of the sheet 110a' is joined to the opening edge of the container 106'. The joining of the container 106' with the edge of the sheet 110a' can be done by any method.

The container 106' is provided with a first slit 107a' and a second slit 107b'. Through these slits, the first lead piece 103a and the second lead piece 103b are drawn out of the case. After each lead piece has been drawn out, the gap of each slit is sealed with a sealing material.

Although the shape, material and the like of the case are not particularly limited, it is preferred that at least the inner faces of the flame 106 and the container 106' in contact with the first side face having the first terminal and the second side face having the second terminal of the electrode plate assembly have an insulating property. For example, it is preferred to use the flame 106 and container 106' made of an insulating material, such as a resin material and ceramics. However, there is a possibility that an insulating material may allow an electrolyte or moisture to pass through. Thus, it is further preferred to use the flame 106 and container 106' having a first layer made of an insulating material and a second layer made of a metal foil that does not allow an electrolyte and moisture to pass through. In this case, the first layer is disposed on the inner face of the case. It is also possible to form a third layer made of an insulating material on the outer side of the metal foil.

Although the sheets 110a, 110b, and 110a', which do not come into contact with the first side face and the second side face of the electrode plate assembly, may be made of a conductive material such as a metal foil, of course, they may be made of the same material as that of the flame 106 and the container 106'.

The first layer made of an insulating material may be a polypropylene layer or the like. The second layer made of a metal foil that does not allow an electrolyte to pass through may be made of an aluminum foil or the like. In the flame 106 and the container 106', the thickness of the first layer is preferably 1 to 1000 μm, and the thickness of the second layer is preferably 0.01 to 100 μm. Also, in the sheets 110a, 110b, and 110a', the thickness of the first layer is preferably 1 to 1000 μm, and the thickness of the second layer is preferably 0.01 to 100 μm.

Figure 28:
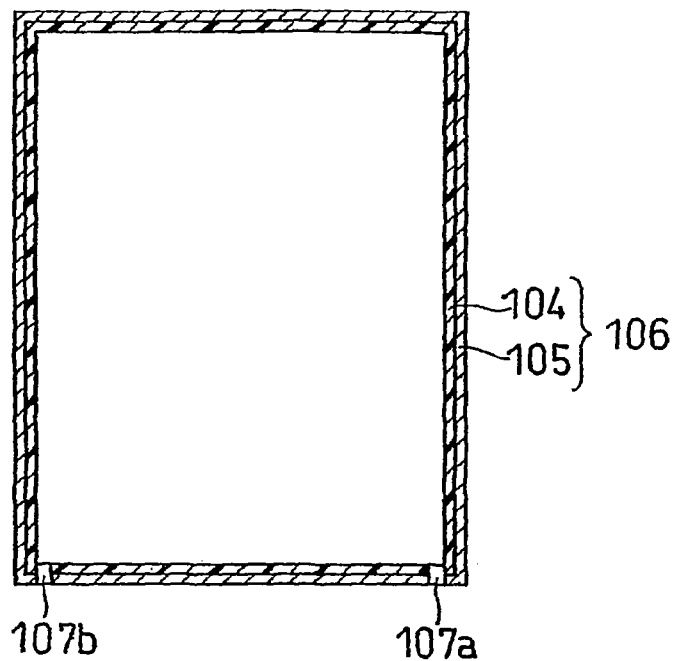
FIG. 28 is an exemplary sectional view of a flame of a case or a container seen from the direction perpendicular to the opening.
Figure 29:
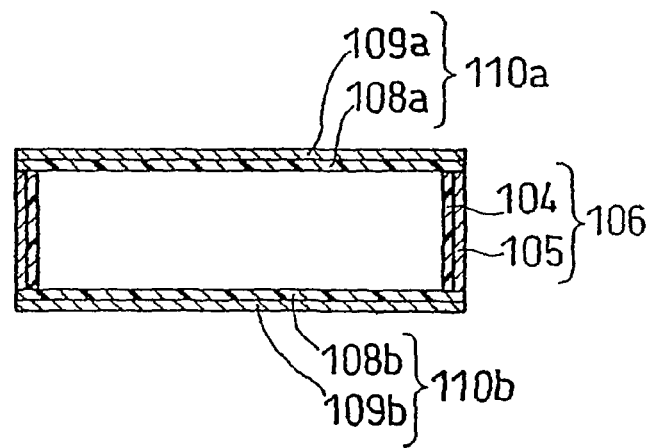
FIG. 29 is an exemplary sectional view of a case consisting of three members seen from one direction parallel to the opening.
Figure 30:
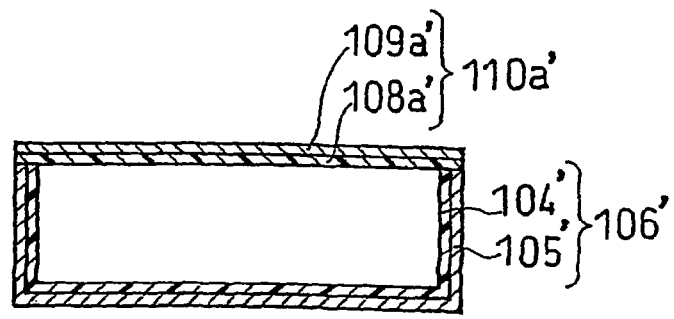
FIG. 30 is an exemplary sectional view of a case consisting of two members seen from one direction parallel to the opening.

FIG. 28 is an exemplary cross-sectional view of the flame 106 or the container 106' seen from the direction perpendicular to the opening thereof. The flame 106 or the container 106' has an inner first layer 104 or 104' made of an insulating material and an outer second layer 105 or 105' made of a metal foil. Also, FIG. 29 and FIG. 30 show exemplary cross-sectional views of the case 180 and the case 190, respectively, seen from one direction parallel to the opening thereof.

The first sheet 110a or 110a' has an inner first layer 108a or 108a' made of an insulating material and an outer second layer 109a or 109a' made of a metal foil. The second sheet 110b has an inner first layer 108b made of an insulating material and an outer second layer 109b made of a metal foil.

Figure 31:
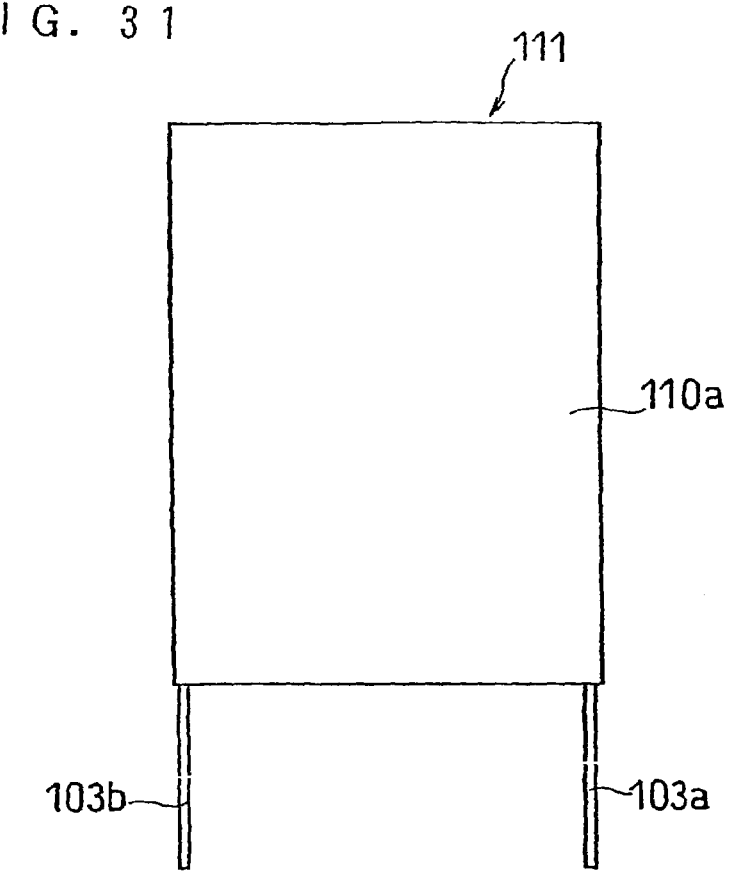
FIG. 31 is an exemplary top view of a battery in accordance with the present invention.
Figure 32:
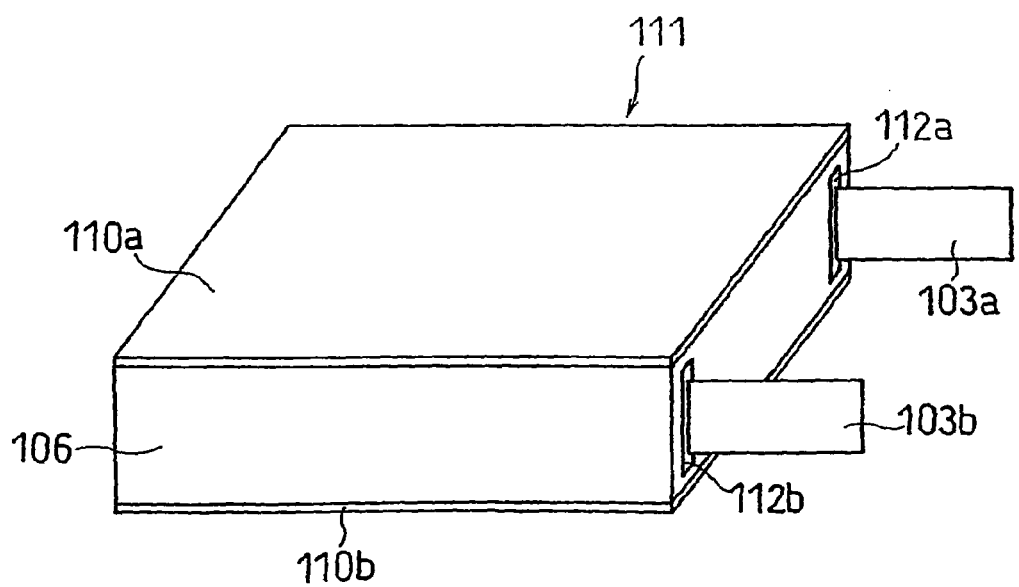
FIG. 32 is an exemplary perspective view of a battery equipped with a case consisting of three members.

FIG. 31 is a top view of a battery package that is completed by accommodating the electrode plate assembly in the case 180 or 190. Also, FIG. 32 and FIG. 33 are perspective views of battery packages that are completed by accommodating the electrode plate assembly in the cases 180 and 190, respectively.

In both packages, the first lead piece 103a and the second lead piece 103b are drawn to the outside, and the gap of each slit is sealed with a sealing material 112a, 112a', 112b or 112b'. The sealing material is composed of, for example, a resin material that is resistant to an electrolyte.

Since the above-described packages are composed of a small number of members, they can be obtained efficiently from a small number of manufacturing steps. In addition, since the electrode plate assembly itself has a simple structure, it is possible to obtain a battery with high volume efficiency and excellent reliability.

Embodiment 9

Figure 34:
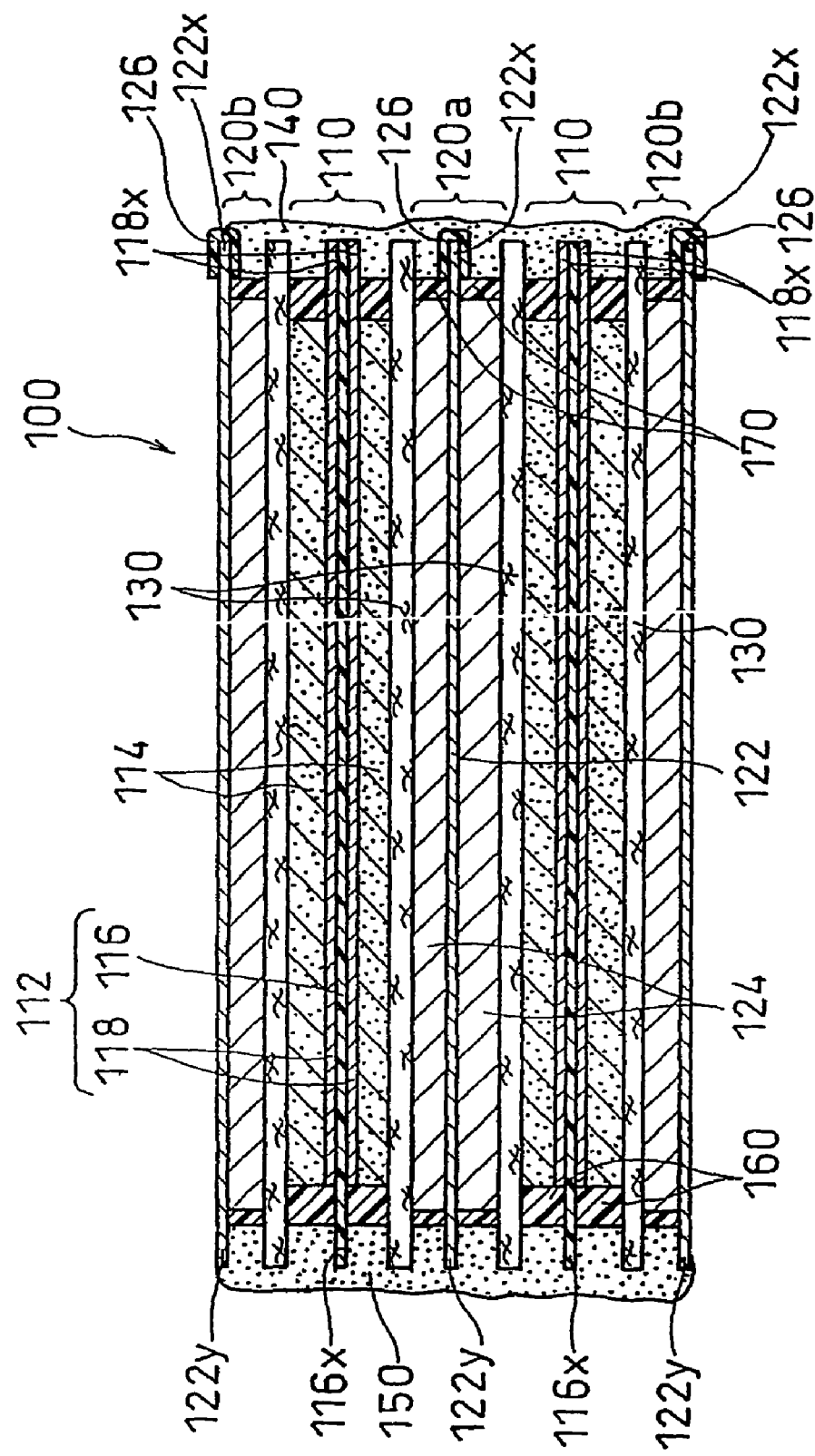
FIG. 34 is a longitudinal sectional view of a layered-type electrode plate assembly according to Embodiment 9.

FIG. 34 is a longitudinal sectional view of an electrode plate assembly 100 according to this embodiment.

The electrode plate assembly 100 includes a plurality of first electrodes 110 and a plurality of second electrodes 120 that are layered alternately, and a separator 130 is interposed between each first electrode 110 and each second electrode 120.

The first electrode 110 comprises a first current collector sheet 112 and two first electrode mixture layers 114, and the first current collector sheet 112 is composed of a resin sheet 116 and a conductive layer 118 formed on each side thereof. The first current collector sheet 112 has a conductive area and an insulating area, according to the pattern of the conductive layer.

Meanwhile, the electrode plate assembly of FIG. 1 includes two kinds of second electrodes 120a and 120b. The inner second electrode 120a, which is sandwiched between two first electrodes 110, comprises a second current collector sheet of a conductive sheet 122 and two second electrode mixture layers 124. The outermost two second electrodes 120b have the same structure as that of the inner second electrode 120a, except that the second electrode mixture layer 124 is formed only on the inner one side.

In FIG. 34, although the second electrodes constitute the outermost two electrodes, the outermost two electrodes may be first electrodes each having the first electrode mixture layer only on the inner one side of the first current collector sheet. Also, of the outermost two electrodes, one of them may be the first electrode and the other may be the second electrode.

In the first electrode 110, the conductive layer 118 is formed on the whole surface of the resin sheet except an edge 116x or on the whole surface except the edge 116x and the edges located on the back and front sides of the paper sheet of FIG. 34. The first electrode mixture layer 114 is formed on the conductive layer 118. In the first current collector sheet 112 of FIG. 34, the edge 116x of the resin sheet, or the edge 116x and the edges located on the back and front sides of the paper sheet of FIG. 34, where there is no conductive layer 118, function as insulating areas. At an edge 118x of the conductive layer located opposite the edge 116x, there is left an exposed part of the conductive layer 118.

In the second current collector sheet constituting the second electrode 120, an edge 122x of the conductive sheet 122 or the edge 122x and the edges located on the back and front sides of the paper sheet of FIG. 34 are covered with an insulating material 126. Also, an edge 122y of the conductive sheet located opposite the edge 122x, the conductive sheet 122 is exposed.

It is preferred that the thickness of the conductive sheet 122 be, for example, 0.5 to 500 μm. A common resin sheet having a flat surface may be used, and perforated material, lath, porous material, net, foamed material, woven fabric, non-woven fabric and the like may be used. Also, a conductive sheet having an uneven surface may also be used.

When the second electrode is the positive electrode, the material of the conductive sheet may be, for example, stainless steel, aluminum, aluminum alloy, titanium, carbon or the like, and particularly, aluminum, aluminum alloy and the like are preferable. Also, when the second electrode is the negative electrode, for example, stainless steel, nickel, copper, copper alloy, titanium and the like may be used, and particularly, copper, copper alloy and the like are preferable.

It is preferred that the thickness of the insulating material 126 be, for example, 0.5 to 500 μm.

The insulating material 126 may be, for example, a resin coating film. The resin coating film can be formed by applying a solution or dispersion containing an insulating resin onto the edge of the conductive sheet 122 and drying it. Although the application method is not particularly limited, for example, screen printing and die coating may be used. The solution or dispersion may be liquid or a paste, and the viscosity thereof may be controlled arbitrarily.

The resin coating film may also be formed by applying a solution or dispersion containing a polymerizable compound to the edge of the electrode mixture layer and polymerizing the polymerizable compound.

The insulating material 126 may also be formed by covering the edge of the conductive sheet 122 with a resin tape.

The insulating material can be composed of the same material as that of the insulating material portion formed along the edge of the electrode mixture layer.

The edge 118x of the conductive layer of the first current collector sheet is positioned on a first side face of the electrode plate assembly, i.e., the left side in FIG. 34. The edge 116x of the resin sheet located at the opposite end is positioned on a second side face of the electrode plate assembly, i.e., the right side in FIG. 34. Also, the edge 122y of the conductive sheet 122 is positioned on the first side face of the electrode plate assembly, and the opposite edge covered with the insulating material 126 is positioned on the second side face of the electrode plate assembly.

From the viewpoint of ensuring reliable prevention of a short-circuit, the width of the edge 116x of the resin sheet is preferably 0.001 mm or more, more preferably 0.1 mm or more. This applies to the width of the edge 122x of the conductive sheet covered with the insulating material 126.

One of the causes of safety degradation of an electrochemical device is a short-circuit between the positive electrode current collector sheet and the negative electrode mixture layer. Thus, it is preferred to use a first current collector sheet made from an insulating sheet as the positive electrode current collector sheet, and to use a second current collector sheet made from a conductive sheet as the negative electrode current collector sheet.

An example of an efficient production method of the electrode plate assembly 100 of FIG. 34 is described with reference to FIGS. 35 and 36.

First, a resin sheet large enough to provide a desired number of current collector sheets is prepared. A plurality of conductive layers of a predetermined shape are formed at the same positions on both sides of the resin sheet. At this time, an exposed part 210a of the resin sheet is left.

Next, as illustrated in FIG. 35(a), two first electrode mixture layers 310 are formed on each conductive layer. Between the two first electrode mixture layers 310 is an exposed part 220a of the conductive layer, where there is no electrode mixture layer. The exposed part 220a of the conductive layer having no electrode mixture layer serves as a part 220b to be connected to a first terminal. Also, the exposed part 210a of the resin sheet serves as an insulating area 210b to be disposed on the second side face of the electrode plate assembly.

After the formation of the first electrode mixture layers, the edges of the first electrode mixture layers to be disposed on the second side face of the electrode plate assembly may be covered with an insulating material, although it is not shown in FIG. 35.

The above-described steps may be performed in the same manner as in Embodiments 3 and 4.

Thereafter, as illustrated in FIG. 3(b), a group of current collector sheets is divided into individual columns.

Meanwhile, second electrodes are prepared in almost the same manner as the first electrodes, except for the use of a conductive sheet. Specifically, a plurality of second electrode mixture layers of a predetermined shape are formed at the same positions on both sides of a conductive sheet large enough to provide a desired number of electrodes, in the same manner as the first electrodes. Subsequently, the conductive sheet is divided into individual electrodes.

Next, the edge of the conductive sheet to be disposed on the first side face of the electrode plate assembly is covered with an insulating material. Also, the edge of the first electrode mixture layer to be disposed on the first side face of the electrode plate assembly may be covered with an insulating material.

The second electrode having the second electrode mixture layer only on one side can be prepared in the same manner as the above, except that the second electrode mixture layer is not formed on the other side.

Thereafter, as illustrated in FIG. 35(c), they are stacked with a separator 330 interposed therebetween such that the first electrode mixture layer 310 of each first electrode faces the second electrode mixture layer 320 of each second electrode. A desired number can be stacked. Also, both electrode plates are arranged such that the part 220b of the first electrode to be connected to the first terminal faces an insulating material 322 covering the edge of a conductive sheet 321 of the second electrode. Then, a pair of second electrodes, each having the second electrode mixture layer only on one side, is disposed on the outermost sides so as to sandwich the inner electrodes, and the whole is pressed.

As a result, a group of a plurality of electrode plate stacks is obtained. Lastly, the group of electrode plate stacks is divided into individual electrode plate stacks. At this time, the cut sections of the first current collector sheet are free from large metallic burrs.

Next, a wound-type electrode plate assembly is described.

In the case of a wound-type electrode plate assembly, a strip-shaped first electrode 410 and a strip-shaped second electrode 420 as illustrated in FIG. 36(a) are used. The first electrode 410 and the second electrode 420 have the same structure as that of the first electrode and the second electrode of the stacked-type electrode plate assembly except their shapes. Thus, the production method of the first electrode and the second electrode is substantially the same as that of the stacked type.

In FIG. 36(a), at one edge of the first electrode 410 along the longitudinal direction, there is a part 412 to be connected to a first terminal, which is the exposed part of the conductive layer. Also, at the opposite edge of the first electrode 410 is an insulating area 413, which is the resin sheet.

Further, at one edge of the second electrode 420 along the longitudinal direction, the edge of a conductive sheet 422 is exposed. The opposite edge of the conductive sheet 422 is covered with an insulating material 423.

Subsequently, as illustrated in FIG. 36(*b*), the first electrode 410 and the second electrode 420 are layered with a separator 430 interposed therebetween, and then wound. As a result, a wound-type electrode plate assembly 400 as illustrated in FIG. 36(*c*) is obtained.

On one bottom face (first bottom face) of the electrode plate assembly, the part 412 of the first current collector sheet to be connected to the first terminal and the insulating material 423 of the second current collector sheet alternately align concentrically. On the opposite bottom face (second bottom face), the exposed part of the conductive sheet 422 and the insulating area 413 of the first current collector sheet alternately align concentrically. Thus, the first bottom face and the second bottom face can be covered with the first terminal and the second terminal, respectively.

EXAMPLE 1

In this Example, a layered-type lithium ion secondary battery was produced in the following manner.

(a) Preparation of First Electrode

A sheet of polyethylene terephthalate (hereinafter referred to as "PET") of 198 mm in width, 282 mm in length, and 7 µm in thickness was prepared. Subsequently, using a mask with matrix-like openings, rectangular vapor-deposited films of copper (65 mm×46 mm) were formed in 3 rows and 6 columns at the same positions on both sides of the PET sheet. The thickness of the copper deposited films was made 0.1 µm.

100 parts by weight of spherical graphite (graphitized mesophase microspheres) serving as an active material and 3 parts by weight of styrene butadiene rubber serving as a binder were mixed with a suitable amount of aqueous carboxymethyl cellulose solution serving as a dispersing medium, to prepare a first electrode mixture paste. This paste was applied onto the whole surface of each deposited film excluding the middle part. As a result, two first electrode mixture layers of 32 mm×46 mm were formed on each deposited film. Between the two first electrode mixture layers was a 1 mm-wide groove-like exposed part of the copper deposited film, where there was no electrode mixture layer. Thereafter, the coating film of the paste was dried, and the dried coating film was rolled to a thickness of 70 µm with rollers.

10 parts by weight of polyvinylidene fluoride (hereinafter "PVDF") was dissolved in 90 parts by weight of N-methyl-2-pyrrolidone (hereinafter "NMP"), to prepare an NMP solution of PVDF. The NMP solution was applied by screen printing onto the part of the edge of each first electrode mixture layer opposite the part adjacent to the exposed part of the deposited film, and then dried at 80° C. As a result, a coating film of polyvinylidene fluoride of 0.3 mm in width and 70 µm in thickness was formed after drying, which served as an insulating material portion. In this way, a group of first electrodes having first electrode mixture layers in 6 rows and 6 columns on each side was obtained.

(b) Preparation of Second Electrode

Second electrodes having second electrode mixture layers on both sides were prepared.

A PET sheet of 198 mm in width, 282 mm in length, and 7 µm in thickness was prepared. Subsequently, using a mask with matrix-like openings, rectangular vapor-deposited films of aluminum (64 mm×45 mm) were formed in 3 rows and 6 columns at the same positions on both sides of the PET sheet. The thickness of the Al deposited films was made 0.1 µm.

100 parts by weight of lithium cobaltate (LiCoO$_2$) serving as an active material, 3 parts by weight of acetylene black serving as a conductive agent, and 7 parts by weight of polyvinylidene fluoride serving as a binder were mixed with a suitable amount of aqueous carboxymethyl cellulose solution serving as a dispersing medium, to prepare a second electrode mixture paste. This paste was applied onto the whole surface of each deposited film excluding the middle part. As a result, two second electrode mixture layers of 31 mm×45 mm were formed on each deposited film. Between the two second electrode mixture layers was a 2 mm-wide groove-like exposed part of the Al deposited film, where there was no mixture. Thereafter, the coating film of the paste was dried, and the dried coating film was rolled to a thickness or of 70 µm with rollers.

The NMP solution was applied by screen printing onto the part of the edge of each second electrode mixture layer opposite the part adjacent to the exposed part of the deposited film, and then dried at 80° C. As a result, a coating film of polyvinylidene fluoride of 0.3 mm in width and 70 µm in thickness was formed after drying, which served as an insulating material portion. In this way, a group of second electrodes having second electrode mixture layers in 6 rows and 6 columns on each side was obtained.

Next, second electrodes each having a second electrode mixture layer only on one side were prepared in the same manner as the above, except that the conductive layer, the second electrode mixture layer and the insulating material were not provided on the other side.

(c) Preparation of Electrode Plate-Assembly

A group of second electrodes having second electrode mixture layers on both sides was sandwiched between two groups of first electrodes having first electrode mixture layers on both sides, with a separator interposed therebetween. At this time, the first electrode mixture layers faced the second electrode mixture layers. Also, the exposed parts of the deposited films and the insulating material portions of the polyvinylidene fluoride coating films in the first electrodes faced the insulating material portions of the polyvinylidene fluoride coating films and the exposed parts of the deposited films in the second electrodes, respectively. A pair of second electrodes having second electrode mixture layers only on one side was disposed on both outermost sides, to sandwich the inner electrodes, and the whole was pressed. As a result, a group of a plurality of electrode plate stacks was obtained.

The group of a plurality of electrode plate stacks was divided into individual electrode plate stacks, with the cutting positions being at the center of the exposed parts of the deposited films of the first electrodes and the center of the exposed parts of the deposited films of the second electrodes. As a result, a series of application and stacking steps produced as many as 36 electrode plate stacks at one time. On the four side faces of each electrode plate stack thus obtained, the edges of the respective current collector sheets were flush with the edges of the separators.

On one side face (first side face), the exposed parts of the deposited films of the first current collector sheets and the exposed parts of PET of the second current collector sheets aligned alternately. On the opposite second side face, the exposed parts of the deposited films of the second current collector sheets and the exposed parts of PET of the first current collector sheets aligned alternately. On the other two side faces, the exposed pars of PET of the respective current collector sheets aligned.

Half-molten copper fine particles were sprayed on the first side face where the exposed parts of the copper deposited films of the first current collector sheets and the exposed parts of PET of the second current collector sheets aligned alternately. As a result, a 0.5 mm-thick copper film was formed on the first side face. The exposed parts of the copper deposited films were buried in the copper film to a depth of 0.2 mm. Since the edges of the second electrode mixture layers positioned on the first side face were covered with the polyvinylidene fluoride coating film, the sprayed copper film was prevented from contacting the second electrodes. This copper film was used as the negative electrode terminal as it was.

Half-molten aluminum fine particles were sprayed on the second side face where the exposed parts of the Al deposited films of the second current collector sheets and the exposed parts of PET of the first current collector sheets aligned alternately. As a result, a 0.5 mm-thick aluminum film was formed on the second side face. The exposed parts of the Al deposited films were buried in the aluminum film to a depth of 0.2 mm. Since the edges of the first electrode mixture layers positioned on the second side face were covered with the polyvinylidene fluoride coating film, the sprayed aluminum film was prevented from contacting the first electrodes. This aluminum film was used as the positive electrode terminal as it was.

[Charge/Discharge Test]

With a lead wire connected to the copper film and the aluminum film of the resultant electrode plate assembly, a charge/discharge test was performed, using an external charge/discharge device. The electrolyte used therein was prepared by dissolving $LiPF_6$ at a concentration of 1 mol/L in a solvent mixture consisting of ethylene carbonate (EC) and ethyl methyl carbonate (EMC) in a volume ratio of 30:70.

The charging and discharging were performed in an atmosphere of 20° C. The charging and discharging were performed in a current mode of 2.5 $mA/cm^2$ relative to electrode area. The end-of-charge voltage was set to 4.2 V. The end-of-discharge voltage was set to 3.0 V. The electric capacity obtained under these conditions was 900 mAh.

[Short-Circuit Incidence]

100 batteries were produced in the same manner, and these batteries were crushed around their current-collecting terminals with a metal round bar. Thereafter, the battery voltages were measured to find the number of batteries which might have developed an internal short-circuit. The number of batteries which might have developed an internal short-circuit was zero.

[Impact Resistance]

Even when a mechanical impact was applied to the electrode plate assemblies of Example 1 by dropping them, no abnormality such as voltage drop due to an internal short-circuit was observed.

COMPARATIVE EXAMPLE 1

Using conventionally-used core members of copper foil, first electrodes with first electrode mixture layers of the same composition and thickness as those of Example 1 were prepared. Using core members of aluminum foil, second electrodes with second electrode mixture layers of the same composition and thickness as those of Example 1 were prepared. They were stacked to produce a battery with the same capacity 900 as that of Example 1. The edges of the first electrodes were caused to protrude from the first side face of the electrode plate assembly, while the edges of the second electrodes were caused to protrude from the second side face located opposite the first side face. The first electrodes and the second electrodes were not provided with the insulating material portion covering the edge of the electrode mixture layer. Electrode plates of the same polarity were connected with a lead, to complete a battery. Although the capacity of the resultant battery was the same as that of Example 1, the volume of the battery was approximately 1.2 times as much as that of the battery of Example 1. 100 batteries were produced in the same manner and examined for their short-circuit incidence. As a result, it was confirmed that two batteries developed a short-circuit.

EXAMPLE 2

In this Example, a wound-type lithium ion secondary battery was produced in the following manner.

(a) Preparation of First Electrode

A sheet of polyethylene terephthalate (hereinafter referred to as "PET") of 198 mm in width, 506 mm in length, and 7 μm in thickness was prepared. Subsequently, using a mask with matrix-like openings, three strip-shaped vapor-deposited films of copper (65 mm×506 mm) were formed at the same positions on both sides of the PET sheet. The thickness of the copper deposited films was made 0.1 μm.

100 parts by weight of spherical graphite (graphitized mesophase microspheres) serving as an active material and 3 parts by weight of styrene butadiene rubber serving as a binder were mixed with a suitable amount of aqueous carboxymethyl cellulose solution serving as a dispersing medium, to prepare a first electrode mixture paste. This paste was applied onto the whole surface of each deposited film excluding the middle part, so that two strip-shaped first electrode mixture layers of 32 mm×506 mm were formed on each deposited film. Between the two strip-shaped first electrode mixture layers was a 1 mm-wide groove-like exposed part of the copper deposited film, where there was no first electrode mixture layer. Thereafter, the coating film of the paste was dried, and the dried coating film was rolled to a thickness of 70 μm with rollers.

In the same manner as in Example 1, a polyvinylidene fluoride coating film of 0.3 mm in width and 70 μm in thickness (after drying) was formed on the part of the edge of each first electrode mixture layer opposite the part adjacent to the exposed part of the deposited film, to be used as an insulating material portion. In this way, a group of first electrodes having six strip-shaped first electrode mixture layers on each side was obtained.

(b) Preparation of Second Electrode

Second electrodes having strip-shaped second electrode mixture layers on both sides were prepared.

A PET sheet of 198 mm in width, 506 mm in length, and 7 μm in thickness was prepared. Subsequently, using a mask with matrix-like openings, three strip-shaped vapor-deposited films of aluminum (64 mm×506 mm) were formed at the same positions on both sides of the PET sheet. The thickness of the Al deposited films was made 0.1 μm.

100 parts by weight of lithium cobaltate ($LiCoO_2$) serving as an active material, 3 parts by weight of acetylene black serving as a conductive agent, and 7 parts by weight of polyvinylidene fluoride serving as a binder were mixed with a suitable amount of aqueous carboxymethyl cellulose solution serving as a dispersing medium, to prepare a second electrode mixture paste. This paste was applied onto the whole surface of each deposited film excluding the middle part, so that two strip-shaped second electrode mixture layers of 31 mm×506 mm were formed on each deposited film. Between the two second electrode mixture layers was a 2 mm-wide groove-like exposed part of the Al deposited film, where there was no second electrode mixture. Thereafter, the coating film of the paste was dried, and the dried coating film was rolled to a thickness of 70 μm with rollers.

In the same manner as in Example 1, a polyvinylidene fluoride coating film of 0.3 mm in width and 70 μm in thickness (after drying) was formed on the part of the edge of each second electrode mixture layer opposite the part adjacent to the exposed part of the deposited film, to be used as an insulating material portion. In this way, a group of second electrodes having six strip-shaped second electrode mixture layers on each side was obtained.

(c) Preparation of Electrode Plate Assembly

The group of first electrodes and the group of second electrodes were layered with a separator interposed therebetween, and the resultant was wound. At this time, the first electrode mixture layers faced the second electrode mixture layers. Also, the exposed parts of the deposited films and the insulating material portions of the polyvinylidene fluoride coating films in the first electrodes faced the insulating material portions of the polyvinylidene fluoride coating films and the exposed parts of the deposited films in the second electrodes, respectively. This gave a group of a plurality of wound-type electrode plate assemblies that alternately aligned in opposite orientations, the group having a shape of a long cylinder.

The group thus obtained was divided into individual electrode plate assemblies by cutting the center of the exposed parts of the deposited films of the first electrodes and the center of the exposed parts of the deposited films of the second electrodes. As a result, a series of application and winding steps produced as many as 6 electrode plate assemblies.

Half-molten copper fine particles were sprayed on the side face (first bottom face) where the exposed part of the copper deposited film of the first current collector sheet and the PET resin part of the second current collector sheet aligned alternately. However, in order to provide an injection hole for injecting an electrolyte into the electrode plate assembly, a mask was fitted to the appropriate position. As a result, a 0.5 mm-thick copper film was formed on the first bottom face. At this time, the exposed part of the copper deposited film was buried into the copper film to a depth of 0.2 mm. Since the edge of the second electrode mixture layer positioned on the first bottom face was covered with the polyvinylidene fluoride coating film, the sprayed copper film was prevented from contacting the second electrode. This copper film was used as the negative electrode terminal as it was.

Half-molten aluminum fine particles were sprayed on the side face (second bottom face) where the exposed part of the Al deposited film of the second current collector sheet and the PET resin part of the first current collector sheet aligned alternately. However, in order to provide an injection hole for injecting an electrolyte into the electrode plate assembly, a mask was fitted to the appropriate position. As a result, a 0.5 mm-thick aluminum film was formed on the second bottom face. At this time, the exposed part of the Al deposited film was buried in the aluminum film to a depth of 0.2 mm. Since the edge of the first electrode mixture layer positioned on the second bottom face was covered with the polyvinylidene fluoride coating film, the sprayed aluminum film was prevented from contacting the first electrode. This aluminum film was used as the positive electrode terminal as it was.

The electrode plate assembly thus obtained was housed in a cylindrical battery case made of stainless steel, and the copper film on the bottom face of the electrode plate assembly was connected to the inner bottom face of the case. The aluminum film on the upper face of the electrode plate assembly was connected via an aluminum lead to the back side of a sealing plate whose periphery was fitted with an insulating gasket. Subsequently, an electrolyte was injected into the case, to impregnate the electrode plate assembly with the electrolyte. Thereafter, the opening of the case was sealed with the sealing plate, to complete a cylindrical battery. The electrolyte used therein was prepared by dissolving $LiPF_6$ at a concentration of 1 mol/L in a solvent mixture of ethylene carbonate (EC) and ethyl methyl carbonate (EMC) in a volume ratio of 30:70.

COMPARATIVE EXAMPLE 2

According to a conventional method, a wound-type lithium ion secondary battery was produced.

That is, a first electrode comprising a strip-shaped copper foil of 32×506 mm and a first electrode mixture layer of the same composition and thickness as those of Example 2 carried on each side thereof was prepared. A second electrode comprising a strip-shaped aluminum foil of 31×506 mm and a second electrode mixture layer of the same composition and thickness as those of Example 2 carried on each side thereof was prepared. Each electrode plate had a current-collecting-tab connecting part to which the electrode mixture layer had not been applied, and a current-collecting tab was connected thereto. These first and second electrodes were wound with a separator interposed therebetween, to produce an electrode plate assembly.

The electrode plate assembly thus obtained was housed in a cylindrical battery case, made of stainless steel, whose diameter was 1.2 times as large as that of Example 2. A second electrode lead was then welded to the inner bottom face of the case. Also, a first electrode lead was connected to the back side of a sealing plate whose periphery was fitted with an insulating gasket. Subsequently, the same electrolyte as that of Example 2 was injected into the case, to impregnate the electrode plate assembly with the electrolyte. Thereafter, the opening of the case was sealed with the sealing plate, to complete a cylindrical battery. It should be noted that the reason why Comparative Example 2 required a larger battery case than that of Example 2 is that the presence of the current-collecting tabs in the electrode plate assembly necessitated an increase in the diameter of the electrode plate assembly. Although the capacities of the batteries of Example 2 and Comparative Example 2 were the same, the size of the battery of Comparative Example 2 was 1.2 times as large as that of the battery of Example 2.

[Charge/Discharge Test]

The batteries of Example 2 and Comparative Example 2 were charged and discharged in an atmosphere of 20° C. The charging and discharging were performed in a current mode of 2.5 mA/cm² with respect to electrode area. The end-of-charge voltage was set to 4.2 V. The end-of-discharge voltage was set to 3.0 V. The electric capacities of the batteries of Example 2 and Comparative Example 2 obtained under these conditions were both 900 mAh.

[Rate Characteristics]

Next, the batteries of Example 2 and Comparative Example 1 were charged up to the end-of-charge voltage of 4.2 V in an atmosphere of 20° C. in a current mode of 2.5 mA/cm² relative to electrode area, and then discharged at a current value of 0.2 C (0.5 mA/cm²). Thereafter, the batteries of Example 2 and Comparative Example 1 were again charged up to the end-of-charge voltage of 4.2 V in the same current mode as the above, and then discharged at a current value of 2 C (5 mA/cm²). As a result, the capacity of the battery of Example 2 discharged at 2 C was 90% of the capacity discharged at 0.2 C, while the capacity of the battery of Comparative Example 1 discharged at 2 C was 80% of the capacity discharged at 0.2 C.

[Impact Resistance]

Even when a mechanical impact was applied to the battery of Example 2 by dropping it, no abnormality such as voltage drop due to an internal short-circuit was observed. However, a slight voltage drop was observed in the battery of Comparative Example 1.

[Short-Circuit Incidence]

100 batteries each of Example 2 and Comparative Example 2 were produced, and these batteries were crushed around their current-collecting terminals. Thereafter, the battery voltages were measured to find the number of batteries which might have developed an internal short-circuit. The number of batteries which might have developed an internal short-circuit was zero in Example 2, but it was two in Comparative Example 2.

EXAMPLE 3

(a) Preparation of Electrode Plate Assembly

A layered-type electrode plate assembly was prepared in the same manner as in Example 1. One end of a nickel negative electrode lead (thickness 100 μm, dimensions 2 mm×30 mm) was welded to the negative electrode terminal of a copper film. One end of an aluminum positive electrode lead (thickness 100 μm, dimensions 2 mm×30 mm) was welded to the positive electrode terminal of an aluminum film. The other end of each lead was allowed to protrude by approximately 5 mm from one side face of the electrode plate assembly.

(b) Case Preparation

As illustrated in FIG. 26, a case consisting of three members was produced. A flame 106 employed two layering materials: a 500 μm-thick polypropylene layer provided on the inner side of the case; and a 20 μm-thick aluminum foil provided on the outer side of the case. The outer dimensions of the flame were 34 mm×50 mm×5 mm. Two flat sheets 110a and 110b employed two layering materials: a 80 μm-thick polypropylene layer provided on the inner side of the case; and a 20 μm-thick aluminum foil provided on the outer side of the case. The outer dimensions of the flat sheets were 34×50, like the flame. Two slits 107a and 107b of 100 μm in width were provided in one side wall of the flame.

(c) Battery Assembly

The protruded parts of the positive electrode lead and the negative electrode lead connected to the electrode plate assembly were passed through the slits 107a and 107b of the flame, respectively, and the flame was placed around the electrode plate assembly. The flame and the electrode plate assembly were then sandwiched together between the two sheets 110a and 110b having the polypropylene layer on the inner side. The peripheries of the sheets 110a and 110b were heated to melt the polypropylene layer, whereby each sheet and the opening edge of the flame were welded together. An electrolyte was injected into the case, and the electrode plate assembly was sufficiently impregnated with the electrolyte. Thereafter, the gaps of the slits were sealed with pitch. The electrolyte used therein was prepared by dissolving $LiPF_6$ at a concentration of 1 mol/L in a solvent mixture consisting of ethylene carbonate (EC) and ethyl methyl carbonate (EMC) in a volume ratio of 30:70. In this way, a battery was completed.

[Charge/Discharge Test]

The resultant battery was subjected to a charge/discharge test in an atmosphere of 20° C. The charging and discharging were performed in a current mode of 2.5 mA/cm² with respect to electrode area. The end-of-charge voltage was set to 4.2 V. The end-of-discharge voltage was set to 3.0 V. The electric capacity obtained under these conditions was 900 mAh.

[Impact Resistance]

Even when a mechanical impact was applied to the battery of Example 1 by dropping it, no abnormality such as voltage drop due to an internal short-circuit was observed.

EXAMPLE 4

As illustrated in FIG. 27, a case consisting of two members was produced. A container 106' employed two layering materials: a polypropylene layer provided on the inner side of the case; and a 20 μm-thick aluminum foil provided on the outer side of the case. The thickness of the polypropylene layer was 500 μm on the side walls of the container, while the thickness of the polypropylene layer was 80 μm on the bottom of the container. The outer dimensions of the container were 34 mm×50 mm×5 mm. A flat sheet 110a' employed two layering materials: a 80 μm-thick polypropylene layer provided on the inner side of the case; and a 20 μm-thick aluminum foil provided on the outer side of the case. The outer dimensions of the flat sheet were also 34×50, like the outer dimensions of opening of the container. Two slits 107a' and 107b' of 100 μm in width were provided in one side wall of the container.

A battery was produced in the same manner as in Example 3 except for the use of this case. Specifically, the protruded parts of the positive electrode lead and negative electrode lead connected to the electrode plate assembly were passed through the slits 107a' and 107b' of the container, respectively, and the electrode plate assembly was placed in the container. The sheet 110a' having the polypropylene layer on the inner side was fitted to the opening of the container so as to cover the electrode plate assembly. The periphery of the sheet 110a' was heated to melt the polypropylene layer, whereby the sheet and the opening edge of the container were welded together. An electrolyte of the same composition as the above was injected into the case, and the electrode plate assembly was sufficiently impregnated with the electrolyte. Thereafter, the gaps of the slits were sealed with pitch.

The capacity and volume of the resultant battery were the same as those of Example 3. Also, even when the battery of Example 4 was dropped to apply a mechanical impact thereto, a voltage drop due to an internal short-circuit was not observed.

COMPARATIVE EXAMPLE 3

Using conventionally-used core members of copper foil, first electrodes with first electrode mixture layers of the same composition and thickness as those of Example 3 were prepared. Using core members of aluminum foil, second electrodes with second electrode mixture layers of the same composition and thickness as those of Example 1 were prepared. They were stacked to produce a battery with the same capacity 900 mAh as that of Example 3. The edges of the first electrodes were caused to protrude from the first side face of the electrode plate assembly, while the edges of the second electrodes were caused to protrude from the second side face located opposite the first side face. A current collector plate was welded to the edges of the electrode plates protruding from each side face, and the current collector plate was connected with a lead, to complete an electrode plate assembly. This electrode plate assembly was covered with a separator, and was then housed in a conventionally-used rectangular case made of aluminum, to complete a battery.

Although the capacity of the resultant battery was the same as that of Example 3, the volume of the battery was approximately 1.2 times as much as that of the battery of Example 3. Also, when the battery of Comparative Example 3 was dropped to apply a mechanical impact thereto, a slight voltage drop due to an internal short-circuit was observed.

EXAMPLE 5

An electrode plate assembly was produced in the same manner as in Example 1, and a nickel negative electrode lead and an aluminum positive electrode lead were welded to the first terminal and the second terminal of the electrode plate assembly, respectively, by ultrasonic welding. The joint area of each terminal and each lead was 0.5 cm². The electrode plate assembly with the leads connected thereto was immersed in a predetermined electrolyte, and the electrode plate assembly was sufficiently impregnated with the electrolyte. The electrolyte used therein was prepared by dissolving $LiPF_6$ at a concentration of 1 mol/L in a solvent mixture of ethylene carbonate (EC) and ethyl methyl carbonate (EMC) in a volume ratio of 30:70. In this way, a lithium ion secondary battery X was completed.

EXAMPLE 6

An electrode plate stack was produced in the same manner as in Example 1. Also, a conductive paste A composed of 30 parts by weight of polyamide imide resin and 70 parts by weight of copper powder of conductive fine particles (mean particle size 20 μm) was prepared. The conductive paste A was then applied onto the first side face where the exposed parts of the copper deposited films of the first current collector sheets and the exposed parts of PET of the second current collector sheets aligned alternately, and the electrode plate stack was heated at 70° C. to cure the resin. As a result, a 0.5 mm-thick first terminal was formed on the first side face. The exposed parts of the copper deposited films were buried in the first terminal to a depth of 0.5 mm. Also, the exposed parts of the copper deposited films were exposed to the outside by penetrating the first terminal. The first terminal was used as the negative electrode terminal.

A conductive paste B composed of 30 parts by weight of polyamide imide resin and 70 parts by weight of aluminum powder of conductive fine particles (mean particle size 20 μm) was produced. The conductive paste B was then applied onto the second side face where the exposed parts of the Al deposited films of the second current collector sheets and the exposed parts of PET of the first current collector sheets aligned alternately, and the electrode plate stack was heated at 70° C. to cure the resin. As a result, a 0.5 mm-thick second terminal was formed on the second side face. The exposed parts of the Al deposited films were buried in the second terminal to a depth of 0.5 mm. Also, the exposed parts of the Al deposited films were exposed to the outside by penetrating the second terminal. The first terminal was used as the positive electrode terminal.

A nickel negative electrode lead and an aluminum positive electrode lead were welded to the first terminal where the exposed parts of the copper deposited films were exposed and the second terminal where the exposed parts of the Al deposited films were exposed, respectively, of the resultant electrode plate assembly by laser welding. The joint area of each terminal and each lead was 0.5 cm². The electrode plate assembly connected with the lead wires was immersed in a predetermined electrolyte, and the electrode plate assembly was sufficiently impregnated with the electrolyte. The electrolyte used therein was the same as that of Example 5. In this way, a lithium ion secondary battery Y was completed.

EXAMPLE 7

An electrode plate stack was produced in the same manner as in Example 1. Also, a solder of a Pb—Sn—Bi system alloy (melting point 100° C.) was prepared and then melted in a bath. The first side face, where the exposed parts of the copper deposited films of the first current collector sheets and the exposed parts of PET of the second current collector sheets aligned alternately, was brought into contact with the surface of the molten solder and pulled up immediately. As a result, a 0.5 mm-thick first terminal was formed on the first side face. The exposed parts of the copper deposited films were buried in the first terminal to a depth of 0.2 mm. The first terminal was used as the negative electrode terminal.

The second side face, where the exposed parts of the Al deposited films of the second current collector sheets and the exposed parts of PET of the first current collector sheets aligned alternately, was brought into contact with the surface of the above-mentioned molten solder and pulled up immediately. As a result, a 0.5 mm-thick second terminal was formed on the second side face. The exposed parts of the Al deposited films were buried in the second terminal to a depth of 0.2 mm. The second terminal was used as the positive electrode terminal.

A nickel negative electrode lead and an aluminum positive electrode lead were welded to the first terminal and the second terminal of the resultant electrode plate assembly, respectively, by resistance welding. The joint area of each terminal and each lead was 0.5 cm². The electrode plate assembly connected with the lead wires was immersed in a predetermined electrolyte, and the electrode plate assembly was sufficiently impregnated with the electrolyte. The electrolyte used therein was the same as that of Example 5. In this way, a lithium ion secondary battery Z was completed.

[Charge/Discharge Test]

The lithium ion secondary batteries X, Y and Z were subjected to a charge/discharge test, using an external charge/discharge device. The charging and discharging were performed in an atmosphere of 20° C. The charging and discharging were performed in a current mode of 2.5 mA/cm² with respect to electrode area. The end-of-charge voltage was set to 4.2 V. The end-of-discharge voltage was set to 3.0 V. The electric capacities of the batteries X, Y and Z obtained under these conditions were 900 mAh.

[Impact Resistance]

Even when a mechanical impact was applied to the batteries X, Y and Z by dropping them, no abnormality such as voltage drop due to an internal short-circuit was observed.

[Rate Characteristics]

Next, the batteries X, Y and Z were charged up to an end-of-charge voltage of 4.2 V in an atmosphere of 20° C. in a current mode of 2.5 mA/cm² relative to electrode area, and then discharged at a current value of 0.2 C (0.5 mA/cm$^2$). Thereafter, X, Y and Z were again charged up to the end-of-charge voltage of 4.2 V in the same current mode as the above, and then discharged at a current value of 2 C (5 mA/cm$^2$). As a result, the capacity of the battery X discharged at 2 C was 90% of the capacity discharged at 0.2 C, the capacity of the battery Y discharged at 2 C was 90% of the capacity discharged at 0.2 C, and the capacity of the battery Z discharged at 2 C was 89% of the capacity discharged at 0.2 C

EXAMPLE 8

A layered-type electrode plate assembly was produced in the same manner as in Example 1, except that the second electrode having the second electrode mixture layer only on one side is an electrode in which only the conductive layer is formed on the other side (see FIG. 19). On the other side, the second electrode mixture layer and the insulating material were not provided.

[Charge/Discharge Test]

A lead wire was connected to each of the copper film and the aluminum film of the resultant electrode plate assembly, to produce a battery. Using an external charge/discharge device, a charge/discharge test was conducted. The electrolyte used therein was prepared by dissolving LiPF$_6$ at a concentration of 1 mol/L in a solvent mixture consisting of ethylene carbonate (EC) and ethyl methyl carbonate (EMC) in a volume ratio of 30:70. The charging and discharging were performed in an atmosphere of 20° C. The charging and discharging were performed in a current mode of 2.5 mA/cm$^2$ with respect to electrode area. The end-of-charge voltage was set to 4.2 V. The end-of-discharge voltage was set to 3.0 V. The electric capacity obtained under these conditions was 900 mAh.

[Rate Characteristics]

The battery was charged up to an end-of-charge voltage of 4.2 V in an atmosphere of 20° C. in a current mode of 2.5 mA/cm$^2$ relative to electrode area, and then discharged at a current value of 0.2 C (0.5 mA/cm$^2$). Thereafter, the battery was again charged up to the end-of-charge voltage of 4.2 V in the same current mode as the above, and then discharged at a current value of 2 C (5 mA/cm$^2$). As a result, the capacity discharged at 2 C was 90% of the capacity discharged at 0.2 C.

[Impact Resistance]

Even when a mechanical impact was applied to the battery of the same constitution by dropping it, no abnormality such as voltage drop due to an internal short-circuit was observed.

EXAMPLE 9

A layered-type electrode plate assembly was produced in the same manner as in Example 1. The third side face and the fourth side face, where the exposed parts of PET of the respective current collector sheets and the edges of the separators aligned, were completely covered with the same porous material as that of the separators. The separators and the porous material were made of a polyethylene microporous film of 50 μm in thickness. Subsequently, a flat surface of a jig heated to 100° C. was pressed against the porous material covering the third side face and the fourth side face from the outside, to weld the edges of the separators and the porous material together. Thereafter, an electrolyte was caused to sufficiently permeate the electrode plate assembly through the porous material. The electrolyte used therein was prepared by dissolving LiPF$_6$ at a concentration of 1 mol/L in a solvent mixture consisting of ethylene carbonate (EC) and ethyl methyl carbonate (EMC) in a volume ratio of 30:70.

[Charge/Discharge Test]

A lead wire was connected to each of the copper film and the aluminum film of the resultant electrode plate assembly, to produce a battery. Using an external charge/discharge device, a charge/discharge test was conducted. The charging and discharging were performed in an atmosphere of 20° C. The charging and discharging were performed in a current mode of 2.5 mA/cm$^2$ with respect to electrode area. The end-of-charge voltage was set to 4.2 V. The end-of-discharge voltage was set to 3.0 V. The electric capacity obtained under these conditions was 900 mAh.

[Short-Circuit Incidence]

100 batteries were produced in the same manner, and these batteries were crushed around their third and fourth side faces. Thereafter, the battery voltages were measured to find the number of batteries which might have developed an internal short-circuit. The number of batteries which might have developed an internal short-circuit was zero.

EXAMPLE 10

An electrode plate assembly was produced in the same manner as in Example 9, except that the third side face and the fourth side face, where the exposed parts of PET of the respective current collector sheets and the edges of the separators aligned, were coated with a paste for forming a porous film. Specifically, the third side face and the fourth side face of the electrode plate assembly were completely covered with the material paste, followed by drying, whereby each side face was coated with a 50 μm-thick porous material. The material paste used was prepared by mixing 10 parts by weight of alumina, 10 parts by weight of polyvinylidene fluoride, and 80 parts by weight of methyl ethyl ketone.

[Short-Circuit Incidence]

The capacity and volume of the resultant battery were the same as those of Example 9. 100 batteries were produced in the same manner and examined for their short-circuit incidence. The number of batteries which might have developed an internal short-circuit was zero.

EXAMPLE 11

0.1 part by weight of benzyldimethylketal was dissolved in 100 parts by weight of polyethylene oxide diacrylate, to prepare an acrylate solution which will start polymerizing by radiation of ultraviolet rays.

In place of the NMP solution of PVDF, this acrylate solution was applied in a width of 0.3 mm onto the predetermined edges of the first electrode mixture layers and the second electrode mixture layers by screen printing. Thereafter, using a high pressure mercury lamp with a maximum output wavelength of 365 nm, the coating film was radiated with ultraviolet rays for 1 minute, to cure the coating film. The thickness of the coating film after curing was 70 μm. Except that insulating material portions were formed as described above, an electrode plate assembly was produced in the same manner as in Example 1.

EXAMPLE 12

An electrode plate assembly was produced in the same manner as in Example 1, except that a resin tape of 0.3 mm in width and 70 μm in thickness was affixed to the predetermined edges of the first electrode mixture layers and the second electrode mixture layers in place of the polyvinylidene fluoride coating film. The resin tape used therein was composed of a 60 μm-thick polypropylene base material and a 5 μm-thick adhesive layer carried on each side thereof. As the adhesive, an acrylic resin was used.

[Charge/Discharge Test]

The batteries of Examples 11 and 12 were charged and discharged in an atmosphere of 20° C. in the same manner as in Example 1. Specifically, The charging and discharging were performed in a current mode of 2.5 mA/cm$^2$ relative to electrode area. The end-of-charge voltage was set to 4.2 V. The end-of-discharge voltage was set to 3.0 V. The electric capacities of the batteries of Examples 11 and 12 obtained in these conditions were 900 mAh.

[Short-Circuit Incidence]

100 batteries each of Examples 11 and 12 were produced, and these batteries were crushed around their current-collecting terminals. Thereafter, the battery voltages were measured to find the number of batteries which might have developed an internal short-circuit. The number of batteries which might have developed an internal short-circuit was zero in all the Examples.

EXAMPLE 13

In this example, a layered-type lithium ion secondary battery was produced as follows.

(a) Preparation of Positive Electrode

A group of positive electrodes having positive electrode mixture layers in 6 rows and 6 columns on both sides was obtained in the same manner as in Example 1. This group of positive electrodes was divided into individual columns. At one end of each divided group of positive electrodes along the longitudinal direction was the edge of the PET sheet with a 1 mm-wide Al deposited film. At the other end was the edge of the PET sheet that did not have a 1 mm-wide Al deposited film.

(b) Preparation of Negative Electrode

A copper foil of 198 mm in width, 282 mm in length, and 7 μm in thickness was prepared.

Next, 100 parts by weight of spherical graphite (graphitized mesophase microspheres) serving as an active material was mixed with 3 parts by weight of styrene butadiene rubber serving as a binder and a suitable amount of aqueous carboxymethyl cellulose solution serving as a dispersing medium, to form a negative electrode mixture paste. This paste was applied onto both sides of the copper foil in the same pattern as that of the positive electrode, and it was then dried to form a plurality of negative electrode mixture layers of 32 mm×46 mm. Thereafter, the negative electrode mixture layers were rolled to a thickness of 70 μm.

Next, the edges of the negative electrode mixture layers to be disposed so as to be adjacent to the positive electrode terminal were covered with a 0.3 mm-wide PVDF coating film. In this way, a group of negative electrodes having the negative electrode mixture layers in 6 rows and 6 columns was obtained. This group of negative electrodes was divided into individual columns. At both ends of each divided group of negative electrodes along the longitudinal direction was a 0.5 mm-wide exposed part of the copper film.

Thereafter, the 0.5 mm-wide part at one end of the copper foil to be disposed on the positive electrode terminal side was covered with a 25 μm-thick PVDF.

Also, negative electrodes each having a negative electrode mixture layer only on one side were produced in the same manner as the above, except that the negative electrode mixture layer and the like were not provided on the other side.

(c) Preparation of Electrode Plate Assembly

A group of positive electrodes was sandwiched between two groups of negative electrodes having negative electrode mixture layers on both sides, with a separator interposed therebetween. At this time, the positive electrode mixture layers faced the negative electrode mixture layers. Also, the edge of the positive electrode PET sheet with the Al deposited film and the edge of the negative electrode copper foil covered with the PVDF coating film were disposed on the same side. A pair of negative electrodes having negative electrode mixture layers only on one side was disposed on both outermost sides to sandwich the inner electrodes, and the whole was pressed. As a result, a group of a plurality of electrode plate stacks was obtained. This group was divided into individual electrode plate stacks. As a result, a series of application and stacking steps produced as many as 6 electrode plate stacks.

Half-molten Al fine particles were sprayed on the side face where the edge of the positive electrode PET sheet with the Al deposited film and the edges of the negative electrode copper foils covered with the PVDF coating film aligned alternately, to form a 0.5 mm-thick Al film. At this time, the Al deposited film was buried in the Al film to a depth of 0.2 mm. This Al film served as the positive electrode terminal.

Half-molten copper fine particles were sprayed on the side face where the edge of the PET sheet without the Al deposited film and the edges of the negative electrode copper foils not covered with the PVDF coating film aligned alternately, to form a 0.5 mm-thick Cu film. At this time, the edge of the copper foil was buried in the Cu film to a depth of 0.2 mm. This Cu film served as the positive electrode terminal.

COMPARATIVE EXAMPLE 4

Using a conventionally-used Al foil core member of 7 μm in thickness, a positive electrode was produced. A lithium ion secondary battery was produced in the same manner as in Example 13, except for the use of this positive electrode. However, in order to prevent a short-circuit between the Al foil core member and the negative electrode terminal, the edge of the Al foil other than the part to be connected with the positive electrode terminal was covered with a PVDF coating film.

[Charge/Discharge Test]

A lead wire was connected to each of the Al film and the Cu film of each battery. Using an external charge/discharge device, a charge/discharge test was conducted in an atmosphere of 20° C. The electrolyte used therein was prepared by dissolving LiPF$_6$ at a concentration of 1 mol/L in a solvent mixture consisting of ethylene carbonate (EC) and ethyl methyl carbonate (EMC) in a volume ratio of 30:70.

The charging and discharging were performed in a current mode of 2.5 mA/cm$^2$ relative to electrode area. The end-of-charge voltage was set to 4.2 V. The end-of-discharge voltage was set to 3.0 V. The electric capacity obtained under these conditions was 900 mAh.

[Safety]

The batteries of Example 13 and Comparative Example 4 were further evaluated as follows.

(i) 100 batteries each were prepared, and they were charged at 900 mA until the battery voltage reached 4.2 V.

(ii) Subsequently, a nail was caused to penetrate the charged batteries perpendicularly to the electrode plate surface.

(iii) After the nail penetration, the highest temperatures of the batteries due to their heat generation were measured.

The results are shown below.

The highest temperatures of the batteries of Example 13 were all 42° C. or lower.

The highest temperatures of some of the batteries of Comparative Example 4 were as high as 110° C.

INDUSTRIAL APPLICABILITY

As described above, according to the present invention, the structure of the positive electrode terminal and the negative electrode terminal is simple, and there is no need to use current collecting tabs or current collecting leads. Therefore, it is possible to provide an electrochemical device that is small but has a high electrical capacity and a high reliability. According to the present invention, a plurality of electrochemical devices can be efficiently manufactured at the same time. The use of non-aqueous electrolyte secondary batteries including such an electrochemical device makes it possible to provide highly reliable devices, such as cellular phones, portable information devices, camcorders, personal computers, PDAs, portable audio devices, electric vehicles, and power sources for load leveling.

The invention claimed is:

1. An electrochemical device comprising an electrode plate assembly, said electrode plate assembly comprising,
(a) at least one first electrode,
(b) at least one second electrode, and
(c) a separator interposed between the first electrode and the second electrode,
said first electrode comprising a first current collector sheet and at least one first electrode mixture layer carried thereon,
said second electrode comprising a second current collector sheet and at least one second electrode mixture layer carried thereon,
wherein said electrochemical device further comprises a first terminal electrically connected to said first current collector sheet and a second terminal electrically connected to said second current collector sheet,
said electrode plate assembly has a first side face on which said first terminal is provided and a second side face on which said second terminal is provided,
at least one of said first current collector sheet and said second current collector sheet has a conductive area and an insulating area,
when said first current collector sheet has a conductive area and an insulating area, the conductive area of said first current collector sheet is connected to said first terminal on said first side face, and the insulating area of said first current collector sheet is positioned on said second side face,
when said second current collector sheet has a conductive area and an insulating area, the conductive area of said second current collector sheet is connected to said second terminal on said second side face, and the insulating area of said second current collector sheet is positioned on said first side face,
said first side face has a first insulating material portion for insulating said first terminal from said second electrode, and said second side face has a second insulating material portion for insulating said second terminal from said first electrode, said first insulating material portion is in contact with said first side face of said second electrode mixture layer, and said second insulating material portion is in contact with said second side face of said first electrode mixture layer, and said first insulating material portion and said second insulating material portion include at least one selected from the group consisting of resin, glass compositions, and ceramics.

2. The electrochemical device in accordance with claim 1, wherein said first side face and said second side face are positioned on opposite sides of said electrode plate assembly.

3. The electrochemical device in accordance with claim 1, wherein the current collector sheet with said conductive area and said insulating area has a first edge that comprises a part of said conductive area and that does not carry said electrode mixture layer, said conductive area is connected to said first terminal or said second terminal at said first edge, and at least a part of said first edge is buried in said first terminal or said second terminal.

4. The electrochemical device in accordance with claim 1, wherein the current collector sheet with said conductive area and said insulating area has a second edge that comprises a part of said insulating area and that does not carry said electrode mixture layer, said second edge is positioned on said first side face or said second side face, and at least a part of said second edge is buried in said first terminal or said second terminal.

5. The electrochemical device in accordance with claim 1, wherein said electrode plate assembly further comprises a third side face and a fourth side face, and
an edge of said first current collector sheet, an edge of said second current collector sheet, and an edge of said separator are substantially flush with one another on each of said first side face, said second side face, said third side face, and said fourth side face.

6. The electrochemical device in accordance with claim 1, wherein an area $S(1)$ per one side of said first current collector sheet, an area $S(2)$ per one side of said second current collector sheet, and an area $S(s)$ per one side of said separator satisfy the following relations:

$$S(1) \leq S(s) \leq S(1) \times 1.05, \text{ and}$$

$$S(2) \leq S(s) \leq S(2) \times 1.05.$$

7. An electrochemical device comprising an electrode plate assembly, said electrode plate assembly comprising,
(a) at least one first electrode,
(b) at least one second electrode, and
(c) a separator interposed between the first electrode and the second electrode,
said first electrode comprising a first current collector sheet and at least one first electrode mixture layer carried thereon,
said second electrode comprising a second current collector sheet and at least one second electrode mixture layer carried thereon,
wherein said electrochemical device further comprises a first terminal electrically connected to said first current collector sheet and a second terminal electrically connected to said second current collector sheet,
said electrode plate assembly has a first side face on which said first terminal is provided and a second side face on which said second terminal is provided,
at least one of said first current collector sheet and said second current collector sheet has a conductive area and an insulating area, when said first current collector sheet has a conductive area and an insulating area, the conductive area of said first current collector sheet is connected to said first terminal on said first side face, and the insulating area of said first current collector sheet is positioned on said second side face, when said second current collector sheet has a conductive area and an insulating area, the conductive area of said second current collector sheet is connected to said second terminal on said second side face, and the insulating area of said second current collector sheet is positioned on said first side face, said first electrode mixture layer and said second electrode mixture layer each have an edge covered with an insulating material, said first side face has a first insulating material portion for insulating said first terminal from said second electrode, and said second side face has a second insulating material portion for insulating said second terminal from said first electrode, said first insulating material portion is in contact with said first side face of said second electrode mixture layer, and said second insulating material portion is in contact with said second side face of said first electrode mixture layer, and said first insulating material portion and said second insulating material portion include at least one selected from the group consisting of resin, glass compositions, and ceramics.

8. The electrochemical device in accordance with claim 7, wherein said edge of the first electrode mixture layer covered with the insulating material is positioned on said second side face, and said edge of the second electrode mixture layer covered with the insulating material is positioned on said first side face.

9. The electrochemical device in accordance with claim 7, wherein when said first current collector sheet has a conductive area and an insulating area, the insulating area of said first current collector sheet is adjacent to said edge of the first electrode mixture layer covered with said insulating material, and when said second current collector sheet has a conductive area and an insulating area, the insulating area of said second current collector sheet is adjacent to said edge of the second electrode mixture layer covered with said insulating material.

10. An electrochemical device comprising an electrode plate assembly, said electrode plate assembly comprising,
(a) at least one first electrode,
(b) at least one second electrode, and
(c) a separator interposed between the first electrode and the second electrode, said first electrode comprising a first current collector sheet and at least one first electrode mixture layer carried thereon, said second electrode comprising a second current collector sheet and at least one second electrode mixture layer carried thereon, wherein said electrochemical device further comprises a first terminal electrically connected to said first current collector sheet, a second terminal electrically connected to said second current collector sheet, and a case accommodating said electrode plate assembly, said electrode plate assembly has a first side face on which said first terminal is provided and a second side face on which said second terminal is provided, at least one of said first current collector sheet and said second current collector sheet has a conductive area and an insulating area, when said first current collector sheet has a conductive area and an insulating area, the conductive area of said first current collector sheet is connected to said first terminal on said first side face, and the insulating area of said first current collector sheet is positioned on said second side face, when said second current collector sheet has a conductive area and an insulating area, the conductive area of said second current collector sheet is connected to said second terminal on said second side face, and the insulating area of said second current collector sheet is positioned on said first side face, an inner face of said case is in contact with said first side face and said second side face, said first side face has a first insulating material portion for insulating said first terminal from said second electrode, and said second side face has a second insulating material portion for insulating said second terminal from said first electrode, said first insulating material portion is in contact with said first side face of said second electrode mixture layer, and said second insulating material portion is in contact with said second side face of said first electrode mixture layer, and said first insulating material portion and said second insulating material portion include at least one selected from the group consisting of resin, glass compositions, and ceramics.

11. The electrochemical device in accordance with claim 10, wherein said case comprises a frame and two flat sheets, said frame surrounds said electrode plate assembly and is in contact with said first side face and said second side face, and said two flat sheets cover two openings of said frame and are in contact with an upper face and a lower face of said electrode plate assembly.

12. The electrochemical device in accordance with claim 10, wherein said case comprises: a container with a bottom; and a flat sheet, said container accommodates said electrode plate assembly and has side walls in contact with said first side face and said second side face and a bottom in contact with one of an upper face and a lower face of said electrode plate assembly, and said flat sheet covers an opening of said container and is in contact with the other of the upper face and the lower face of said electrode plate assembly.

13. The electrochemical device in accordance with claim 10, wherein a lead piece is connected to at least one of said first terminal and said second terminal, and said lead piece is drawn out of said case.

14. The electrochemical device in accordance with claim 11, wherein a lead piece is connected to at least one of said first terminal and said second terminal, and said lead piece is drawn out of said case through a slit provided in said frame.

15. The electrochemical device in accordance with claim 12, wherein a lead piece is connected to at least one of said first terminal and said second terminal, and said lead piece is drawn out of said case through a slit provided in said side walls.

16. The electrochemical device in accordance with claim 1, wherein at least one of said first terminal and said second terminal comprises a porous metal film comprising metal particles joined continuously.

17. The electrochemical device in accordance with claim 1, wherein at least one of said first terminal and said second terminal comprises a conductive paste, said conductive paste comprises a resin and a conductive material dispersed in said resin, and said conductive material is in the form of fine particles and/or fiber.

18. The electrochemical device in accordance with claim 1, wherein at least one of said first terminal and said second terminal comprises a low melting-point metal having a melting point of 250° C. or lower.

19. The electrochemical device in accordance with claim 3, wherein a metal lead is welded to said first terminal or said second terminal in which at least a part of said first edge is buried, and said first edge is in contact with said metal lead.

20. The electrochemical device in accordance with claim 1, wherein at least one of the current collector sheets of outermost two electrodes has a conductive area on both sides and has an electrode mixture layer only on one side facing the inner electrode, and the conductive area on the other side is electrically connected to said first terminal or said second terminal and serves as an extended part of said terminal.

21. The electrochemical device in accordance with claim 5, wherein at least one of said third side face and fourth side face is covered with an electronically insulating porous material.

22. The electrochemical device in accordance with claim 21, wherein said porous material comprises at least one selected from the group consisting of polyolefin, polyalkylene oxide, fluoropolymer and ceramics.

23. The electrochemical device in accordance with claim 21, wherein said porous material comprises a film-shaped member or a coating film of paste.

24. The electrochemical device in accordance with claim 21, wherein the edge of said separator is joined to said porous material on the side face of the electrode plate assembly covered with said porous material.

25. The electrochemical device in accordance with claim 24, wherein said porous material and said separator comprise the same material.

26. The electrochemical device in accordance with claim 7, wherein said insulating material comprises at least one selected from the group consisting of a resin coating film and a resin tape.

27. The electrochemical device in accordance with claim 26, wherein said resin coating film is formed by applying a solution or dispersion containing an insulating resin onto an edge of said electrode mixture layer and drying it.

28. The electrochemical device in accordance with claim 27, wherein said insulating resin comprises at least one selected from the group consisting of polyethylene oxide, polypropylene oxide, polyacrylonitrile, polyvinylidene fluoride, polymethyl methacrylate, and a copolymer, polymer alloy or polymer blend including at least one of these.

29. The electrochemical device in accordance with claim 26, wherein said resin coating film is formed by applying a solution or dispersion containing a polymerizable compound onto an edge of said electrode mixture layer and polymerizing said polymerizable compound.

30. The electrochemical device in accordance with claim 29, wherein said polymerizable compound has at least one functional group selected from the group consisting of an acrylate group and a methacrylate group.

31. The electrochemical device in accordance with claim 26, wherein said resin tape comprises an insulating base material and an insulating adhesive carried on said insulating base material.

32. The electrochemical device in accordance with claim 31, wherein said insulating base material comprises at least one selected from the group consisting of polyethylene, polypropylene, polyethylene terephthalate, polyethylene naphthalate, polyphenylene sulfide, polyimide, aramid resin, and a copolymer, polymer alloy or polymer blend including at least one of these.

\* \* \* \* \*